United States Patent [19]
Nicklos

[11] Patent Number: 6,002,547
[45] Date of Patent: Dec. 14, 1999

[54] DISK DRIVE WITH A ROTATABLY MOUNTED DISK DRIVE MOTOR

[75] Inventor: Carl F. Nicklos, Ogden, Utah

[73] Assignee: Iomega Corporation, Roy, Utah

[21] Appl. No.: 08/866,177

[22] Filed: May 30, 1997

[51] Int. Cl.[6] .................................................. G11B 17/04
[52] U.S. Cl. ...................................... 360/99.04; 360/99.05
[58] Field of Search .............................. 360/97.01, 99.04, 360/99.08, 99.05, 99.12, 99.02, 99.06

[56] References Cited

U.S. PATENT DOCUMENTS

| | | | |
|---|---|---|---|
| 3,975,768 | 8/1976 | Jacques et al. | 360/99 |
| 4,419,703 | 12/1983 | Gruczelak et al. | 360/99.06 |
| 4,445,157 | 4/1984 | Takahashi | 360/133 |
| 4,482,993 | 11/1984 | Agostini | 369/263 |
| 4,504,979 | 3/1985 | Toldi et al. | 360/105 |
| 4,535,374 | 8/1985 | Anderson et al. | 360/103 |
| 4,571,646 | 2/1986 | Bauck et al. | 360/99.09 |
| 4,581,669 | 4/1986 | Tsuji et al. | 360/97 |
| 4,644,521 | 2/1987 | Davis et al. | 369/291 |
| 4,656,542 | 4/1987 | Shibata | 360/99.02 |
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,717,981 | 1/1988 | Nigam et al. | 360/133 |
| 4,722,012 | 1/1988 | Toldi et al. | 360/97 |
| 4,723,185 | 2/1988 | Maeda | 360/97 |
| 4,740,851 | 4/1988 | Jones et al. | 360/97 |
| 4,745,500 | 5/1988 | Davis | 360/97.01 |
| 4,787,000 | 11/1988 | Schulze | 360/105 |
| 4,811,143 | 3/1989 | Ohashi et al. | 360/105 |
| 4,823,214 | 4/1989 | Davis | 360/97.01 |
| 4,870,518 | 9/1989 | Thompson et al. | 360/97.01 |
| 4,901,173 | 2/1990 | Jones et al. | 360/99.04 |
| 4,933,785 | 6/1990 | Morehouse et al. | 360/99.12 |
| 4,953,042 | 8/1990 | Yoshikawa | 360/96.5 |
| 4,965,685 | 10/1990 | Thompson et al. | 360/97.01 |
| 5,005,093 | 4/1991 | Inoue et al. | 360/99.06 |

(List continued on next page.)

FOREIGN PATENT DOCUMENTS

| | | |
|---|---|---|
| 5-93833 | 4/1993 | Japan . |
| 5-290532 | 11/1993 | Japan . |
| WO 93/18507 | 9/1993 | WIPO . |

OTHER PUBLICATIONS

Godwin, J., "An Introduction to the Insite 325 FLOPTI-CAL® Disk Drive", Optical Data Storage Topical Meeting, SPIE, 1989, vol. 1078, 71–79.

*Primary Examiner*—Brian E. Miller
*Attorney, Agent, or Firm*—Woodcock Washburn Kurtz Mackiewicz & Norris LLP

[57] ABSTRACT

An improved disk drive includes an improved operating system, an improved eject system, an improved head retract system and an improved motor loading system. In a preferred embodiment of the operating system it includes a motor, an eject crank, a head crank and an actuator. The output of the motor can be selectively controlled by the actuator to power either the eject crank or the head crank. Powering the head crank, causes the disk drive heads to move, and powering the eject crank causes a disk cartridge to be ejected from the disk drive. The motor loading system may have a disk drive motor having a threaded exterior and a member extending from the exterior to interface with the eject system. Additionally, this motor loading system may include an aperture in the chassis of the disk drive that has a threaded ring running around the circumference of the aperture and a spring extending from the threaded ring. The disk drive motor can be inserted into the aperture in the chassis with the member depressing the spring. The disk drive motor can then be rotated to mate the threads of the disk drive motor with the threaded ring. When rotated, the slotted member releases the spring. The spring prevents rotation of the disk drive motor past a predetermined point and thereby prevents the motor from becoming dislodged from the chassis. When inserted into the disk drive, the motor can be moved between a loaded and an unloaded position.

20 Claims, 35 Drawing Sheets

U.S. PATENT DOCUMENTS

| | | | |
|---|---|---|---|
| 5,025,436 | 6/1991 | Crain et al. | 369/77.2 |
| 5,056,078 | 10/1991 | Carey et al. | 369/77.2 |
| 5,107,484 | 4/1992 | Kawamura et al. | 369/244 |
| 5,204,793 | 4/1993 | Plonczak | 360/97.01 |
| 5,262,918 | 11/1993 | Tannert | 360/133 |
| 5,280,403 | 1/1994 | Martin | 360/133 |
| 5,291,359 | 3/1994 | Wolter | 360/104 |
| 5,317,464 | 5/1994 | Witt et al. | 360/99.08 |
| 5,398,141 | 3/1995 | Tannert | 360/133 |
| 5,416,762 | 5/1995 | Ohmori et al. | 369/75.2 |
| 5,422,775 | 6/1995 | Martin | 360/133 |
| 5,440,436 | 8/1995 | Iftikar et al. | 360/97.01 |
| 5,444,586 | 8/1995 | Iftikar et al. | 360/99.12 |
| 5,467,338 | 11/1995 | Song | 369/270 |
| 5,508,864 | 4/1996 | Briggs et al. | 360/106 |
| 5,530,607 | 6/1996 | Spendlove | 360/105 |
| 5,583,710 | 12/1996 | Nicklos et al. | 360/71 |
| 5,617,397 | 4/1997 | Jones et al. | 369/77.2 |

DISK DRIVE WITH A ROTATABLY MOUNTED DISK DRIVE MOTOR

FIELD OF THE INVENTION

The present invention relates to disk drives of the type that accept removable disk cartridges. More particularly, this invention relates to an improved disk drive that has an improved system for and method of ejecting a disk cartridge from a disk drive, an improved system for and method of retracting and holding the read/write heads of a disk drive in a parked position, an improved system of and method for operating an eject system and a retraction system of a disk drive and an improved system for and method of loading a motor for engaging a hub of a disk cartridge.

BACKGROUND OF THE INVENTION

Disk drives for storing electronic information are found in a wide variety of computer systems, including workstations, personal computers, and laptop and notebook computers. Such disk drives can be stand-alone units that are connected to a computer system by a cable, or they can be internal units that occupy a slot, or bay, in a computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems. The present invention addresses and overcomes some of the problems presented in designing a disk drive to these specifications.

A disk drive typically includes an actuator that has heads for interfacing with a disk cartridge, a head retraction system for moving these heads to a retraced position, an eject system for ejecting a disk cartridge from the disk drive and an operating system for powering the head retraction system and the eject system. By way of background a general overview of the operation of a disk drive employing these features is provided.

A disk cartridge is inserted into the disk drive. In order to remove the disk cartridge from the drive, an eject button disposed on the periphery of the drive is typically depressed. This button causes the operating system to power the head retraction system. When powered, the head retraction system causes the heads to move away from the disk cartridge and into a retracted position. After the heads have been retracted the operating system powers the eject system and ejects the disk cartridge from the disk drive.

Due to the limited length and height of a disk drive designed to be incorporated into a lap top computer, each of these systems must operate in a relatively small volume. Furthermore, many of the known prior art systems cannot be integrated into a disk drive having these limitations. While the eject system, head retraction system, operating system and motor loading system are advantageous for their intended applications, there is a need for improved systems that can be implemented in lower profile disk drives, such as that described above. The present invention satisfies these needs.

SUMMARY OF THE INVENTION

An improved disk drive includes an improved operating system, an improved eject system, an improved head retraction system and an improved motor loading system.

An improved operating system for a disk drive includes a motor, a head crank, an eject crank and an actuator. The actuator selectively links the output of the motor to either the head crank or the eject crank. When powered, the head crank causes the heads to be retracted from the disk cartridge and move to a retracted position. In the retracted position the likelihood of damage to the heads is decreased. Similarly, the eject crank can be powered by the output of the motor to eject a disk cartridge from the disk drive.

The actuator selectively controls the output of the motor by moving between a first position and a second position. In a first position, the output of the motor is linked to the eject crank. When activated, the actuator functions to direct the output of the motor to a second position where it is linked to the head crank. In this position, the motor will cause rotation of the head crank and operation of the heads. After the heads have been retracted, the activator functions to couple the output of the motor back to the first position and to power the eject crank. When powered, the eject crank functions to eject a disk cartridge from the disk drive.

In a preferred embodiment of this invention, the output of the motor is linked to a gear train that can be selectively controlled by the actuator to be directed to either the eject crank or the head crank. Included within this gear train may be an output gear to which either an eject gear disposed on the eject crank or a head gear disposed on the head crank may be selectively connected. This gear train provides a gear reduction so that the proper torque and speed of the eject crank and the head crank can be achieved.

The actuator may be an electo-mechanical device that responds to signals from a typical central processing unit to selectively direct the output of the motor to either the eject crank or the head crank. Alternatively, the actuator may be a purely mechanical device that provides forces that operate with the force exerted by the rotation of the motor to switch the output of the motor between the eject crank and the head crank.

An improved head retraction system includes a drive link and a trolley that operate in conjunction with a spring and a head crank to retract the heads from a disk cartridge. The heads are preferably mounted on a carriage assembly that rides in a groove of a retainer. In a preferred embodiment the trolley engages a post extending from the carriage assembly to hold the carriage assembly to the retracted position. The head crank is preferably operated by the improved operating system described above to move the trolley to a spring loaded position. Power from the head crank is then removed and the trolley is driven by spring pressure to contact the post of the carriage assembly and hold it in the retracted position.

In a preferred embodiment, the head crank has a capture feature that captures a wire that links the head crank to a drive link. The drive link is coupled to the trolley to link the head crank to the trolley. The capture feature includes a groove disposed around a portion of the periphery of the head crank and a recess in the head crank. The wire preferably has a shaped end that can mate with the recess. As the head crank rotates, the wire acts as a cam because it is attached to the periphery of the head crank.

An improved eject system preferably includes a specially shaped eject lever, a drag link and an eject crank. The eject lever is rotatably mounted to the disk drive and spring biased to an unloaded position. The drag link may be translatably mounted to the disk drive and it interfaces with the eject lever. The drag link is also spring biased. The drag link interfaces with the eject crank to transmit movement of the eject crank to movement of the eject lever.

In particular, the eject lever is rotated by a spring to an unloaded position when a disk cartridge is not inserted. In this position, the eject lever holds the drag link against spring pressure in a spring loaded position. Upon inserting a disk cartridge into the disk drive, the disk cartridge drives the eject lever to rotate against spring pressure. When it rotates, the eject lever releases the drag link, which then moves due to the force of the spring pressure. After the drag link has been moved, it holds the eject lever in its rotated position against spring pressure.

When an eject button disposed on the disk drive or similar input device is depressed, the microprocessor operates to power the operating system and rotate the eject crank. When the eject crank rotates, it engages the drag link and moves it against spring pressure. As the drag link rotates, it releases the eject lever which rotates due to spring pressure. The rotation of the eject lever drives the disk cartridge from the disk drive. As the eject lever rotates, it engages the drag link and holds it in its spring loaded position.

The eject lever may have a specific shape. For instance, it may be mounted so that it has a portion above the chassis of the disk drive and a portion below the chassis. A single piece is used to allow for the efficient transmission of torque between the two surfaces. In a preferred embodiment, the eject lever is inserted through an aperture in the chassis and it has a pair of sealing flanges to prevent dust or contaminants from being transmitted through the aperture. One of the sealing flanges is disposed above the chassis and the other is disposed below the chassis. As the eject lever is rotated, the sealing flanges operate in conjunction to prevent the aperture from becoming uncovered, and they thereby seal the aperture from dust and other contaminants.

According to another aspect of this invention, it employs a motor loading system. This motor loading system permits the moving of a disk drive motor between an unloaded and a loaded position. In the loaded position the disk drive motor engages a disk cartridge to rotate a storage medium disposed in the cartridge for retrieving from and storing information on the storage medium.

The disk drive motor of this motor loading system may have a threaded exterior. The threaded exterior may be a threaded ring running around the circumference of the disk drive motor. Additionally, this motor loading system may include an aperture in the chassis of the disk drive that has a threaded ring running around the circumference of the aperture. The disk drive motor can be inserted into this aperture. Upon insertion, the threads disposed on the disk drive motor can be mated with those disposed on the threaded motor ring to cause the disk drive motor to be driven towards the chassis.

The chassis may have a spring extending from the threaded ring, and the disk drive motor may have a member extending from its periphery for interfacing with the eject system. This member couples the disk drive motor to the eject system so that the disk drive motor can be moved between an unloaded and a loaded position when a disk cartridge is respectively ejected and inserted into the disk drive.

When inserting the disk drive motor into the aperture, the member can engage a component of the eject system. This component may be a post extending from the drag link. Upon inserting the disk drive motor, the member may depress the spring. The disk drive motor can then be rotated to mate the threads of the disk drive motor with the threaded ring. When rotated, the member releases the spring.

The spring functions to prevent rotation of the disk drive motor past a predetermined point and thereby prevents the motor from becoming dislodged from the chassis due to mechanical shock or other forces.

DETAILED DESCRIPTION OF THE PREFERRED EMBODIMENTS

INTRODUCTION

Figure 1:
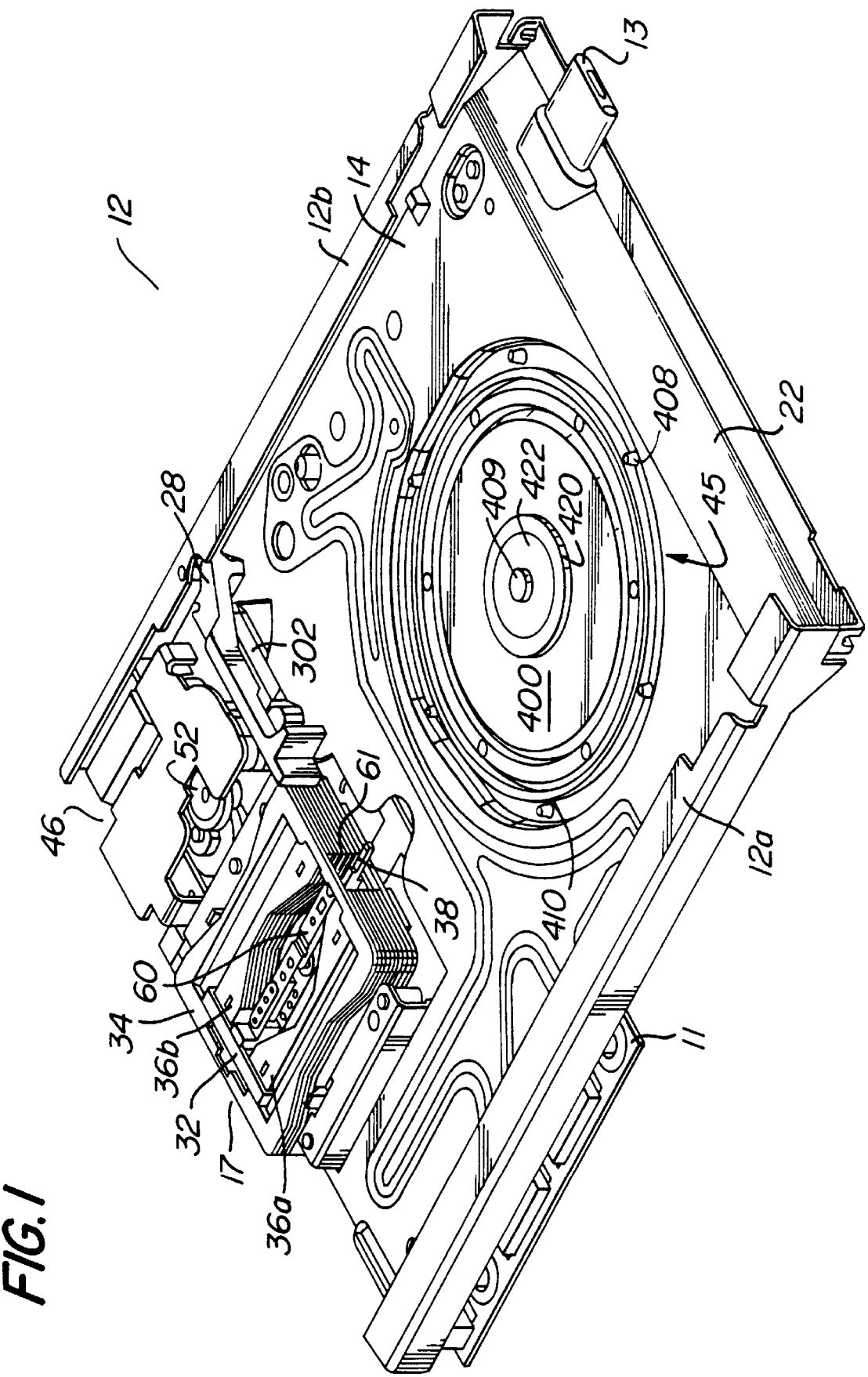
FIG. 1 is an isometric view of a top of a disk drive according to a preferred embodiment of this invention.
Figure 2:
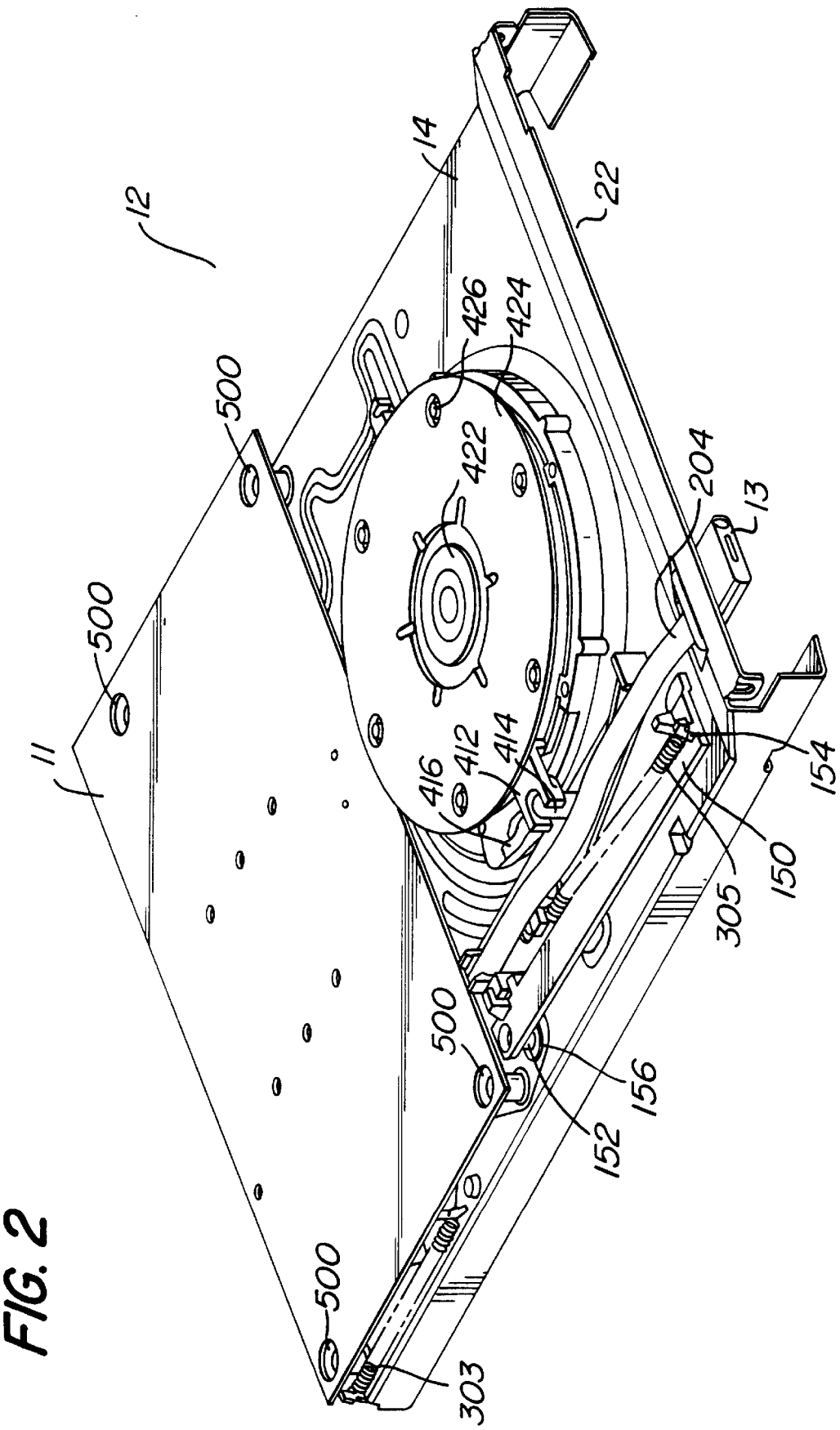
FIG. 2 is an isometric view of the bottom of the disk drive of FIG. 1 with a circuit board installed.
Figure 3:
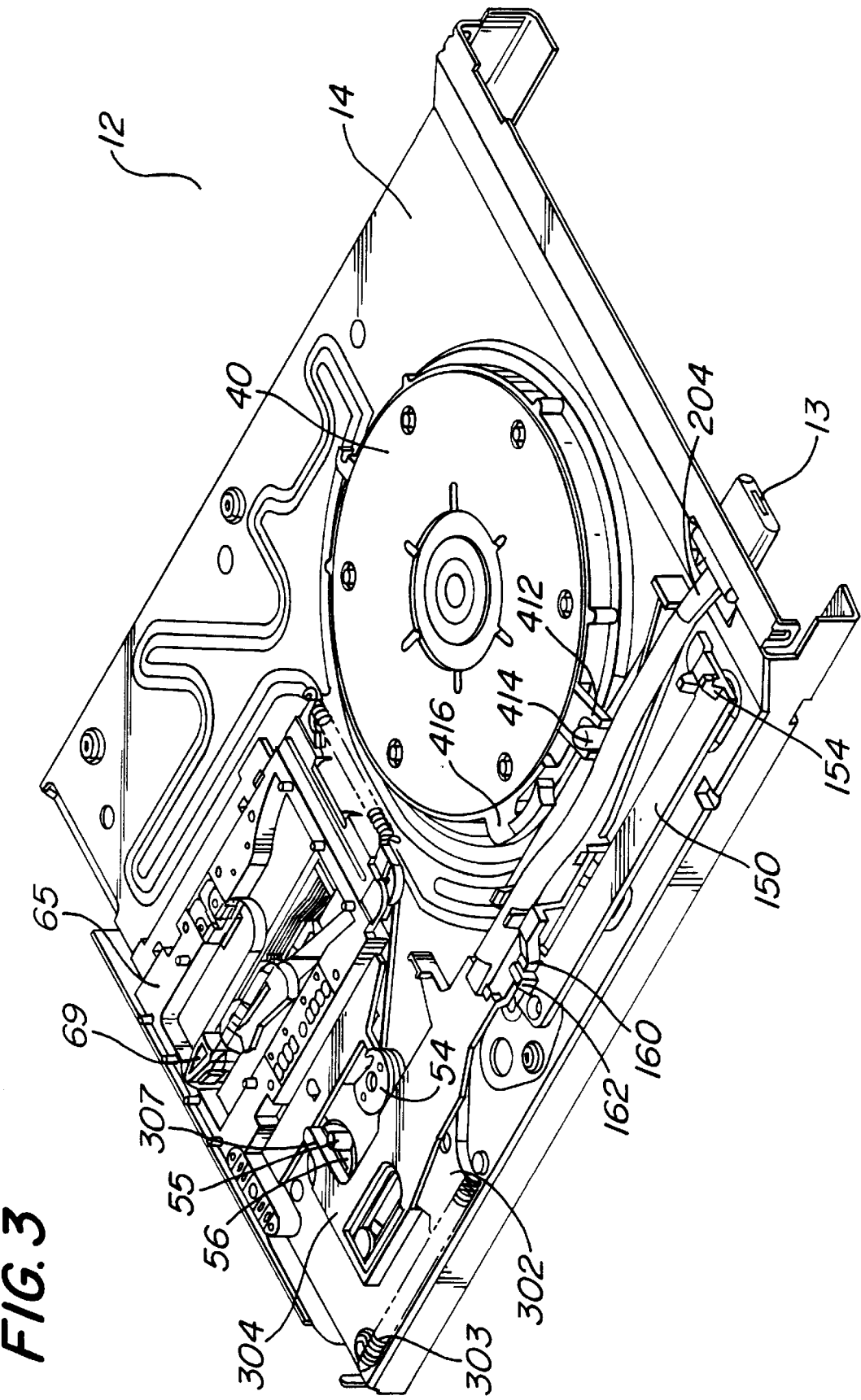
FIG. 3 is an isometric view of the bottom of the disk drive of FIG. 1 with the circuit board removed.

FIGS. 1–3 depict an exemplary disk drive 12 of the present invention. This disk drive 12 can be employed with a microprocessor in either a stationary personal computer or a portable personal computer, such as a laptop computer. FIG. 1 is a top isometric view of the disk drive 12 with the cover (not shown) of the disk drive removed. FIG. 2 is a bottom isometric view with the circuit board installed, and FIG. 3 is a bottom isometric view of the disk drive 12 with the circuit board removed. The disk drive 12 comprises a chassis 14 having unshaped outer edges that form opposed guide rails 12a, 12b that guide a removable disk cartridge into the disk drive 12 through an opening 22. In the present embodiment, the chassis 14 is metallic.

A cartridge shutter lever 28 and an eject lever 302 are rotatably mounted on the chassis 14. Both of the levers 28, 302 are shown in FIG. 1 in the positions that they occupy when a disk cartridge is fully inserted into the disk drive 12. During cartridge insertion, the shutter lever 28 and the eject lever 302 swing from a forward position to the position shown in FIG. 1. During this movement, an abutment surface on the shutter lever 28 engages a shutter 18 of the disk cartridge 10, depicted in FIGS. 4 and 5, and moves the shutter 18 to the side, exposing a head access opening 30 in the front peripheral edge of the cartridge 10.

As mentioned above, the eject lever 302 also moves from a forward position to the position shown in FIG. 1, when a disk cartridge 10 is inserted. In the position shown in FIG. 1, the eject lever 302 is held in a cocked position against spring tension. When it is desired to eject a disk cartridge 10 from the drive 12, an eject button 13 is pushed. Among other things, this causes the eject lever 302 to be released from its cocked position, so that it springs forward to force the disk cartridge 10 to eject out of the disk drive 12.

The disk drive 12 also has a linear actuator 17 disposed at the rear of the chassis 14. The linear actuator 17 comprises a carriage assembly 32, an outer magnet return path assembly 34, and two inner return paths 36a, 36b disposed on opposite sides of the carriage assembly 32. After a disk cartridge 10 is inserted into the disk drive 12, the carriage assembly 32 carries a pair of read/write heads 38 over the recording surfaces of a disk-shaped storage medium within the cartridge. A spindle motor 40 is provided on the floor of the chassis 14. During cartridge insertion, the spindle motor 40 is translated vertically into engagement with a hub 16 of the disk cartridge 10, in order to rotate the disk-shaped storage medium at a relatively high speed. A circuit board 11 is attached to the chassis 14 via a plurality of standoffs (not shown). The circuit board 11 carries the drive circuitry. A gear train 52 controls movement of the eject lever 302 and movement of a head retraction system 42 that moves the carriage assembly 32 to a parked position to prevent damage to the read/write heads 38, when the disk drive is not in use.

Figure 4:
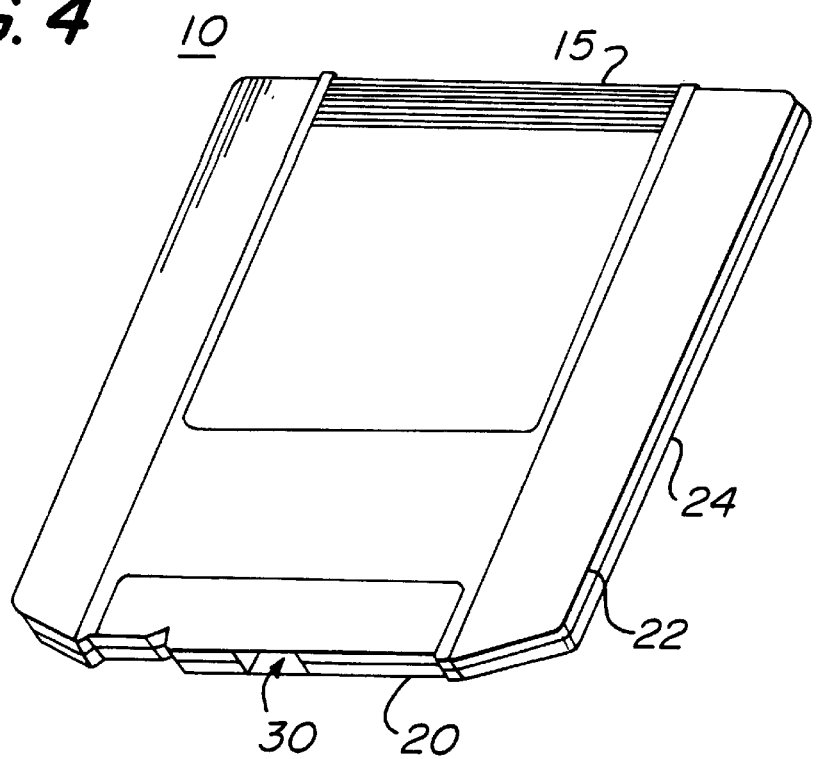
FIG. 4 depicts a disk cartridge adapted for use with a preferred embodiment of this invention illustrated in FIG. 1.
Figure 5:
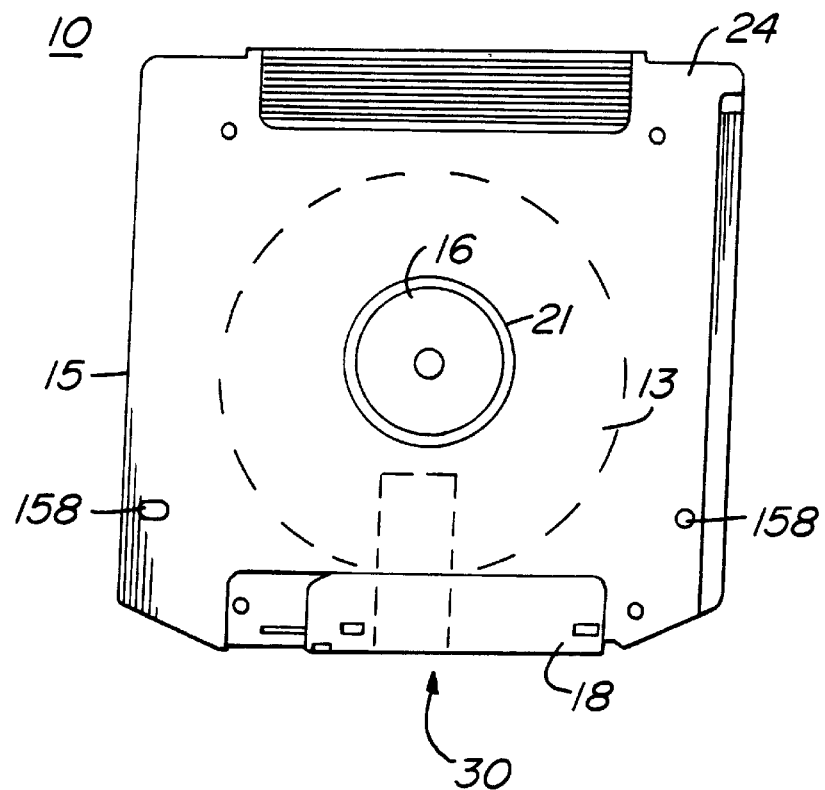
FIG. 5 is a bottom view of the disk cartridge of FIG. 4.

FIGS. 4 and 5 depict an exemplary disk cartridge 10 adapted for use in the disk drive 12 of this invention. In a preferred embodiment, the disk cartridge 10 may be a ZIP™ disk cartridge produced by Iomega Corporation. However, the disk drive 12 of this invention is not limited to these disk cartridges and a variety of other standard disk cartridges may be employed with various features of the disk drive of this invention. As shown, the exemplary disk cartridge 10 has an upper and a lower shell 22, 24 that mate to form an outer casing 15. In a preferred embodiment, the shells 22, 24 are plastic. Rotatably mounted in the casing 15 is a hub 16. A disk shaped information storage medium 13 is affixed to the hub 16. In a preferred embodiment, the storage medium 13 is a flexible magnetic storage medium. However, in other embodiments, the storage medium may be a rigid magnetic disk, a magneto-optical disk or an optical storage medium. An opening 21 in the lower shell 22 of the casing 15 provides access to the disk hub 16. A head opening 30 in the front peripheral edge of the disk cartridge 10 provides access to the surfaces of the storage medium 13 for the read/write heads 38 of the disk drive 12.

As depicted in FIG. 2, a shutter 18 is also provided on the front peripheral edge of the disk cartridge 10 to cover the head access opening 30 when the cartridge 10 is not in use. When a disk cartridge 10 is inserted into the disk drive 12, the shutter 18 moves to the side and exposes the head access opening 30. This provides access for the read/write heads 60 to the storage medium 13.

As is known in the art, a typical disk drive has an eject system for ejecting a disk cartridge from a disk drive. A typical disk drive also contains a head retraction system for holding the disk drive heads in a retracted position with respect to a disk cartridge. In this retracted position, the heads are typically disposed in the rear of a disk drive to minimize the likelihood of damage to the heads through accidental contact. In addition to having an eject system and a head retract system, a typical disk drive has an operating system for controlling the operation of the eject system and the head retraction system. Moreover, a conventional disk drive may have a motor system for engaging the disk drive motor with the disk cartridge hub. The disk drive of this invention includes an improved head retraction system 42, an improved eject system 44, an improved operating system 46 and an improved motor loading system.

STANDOFF ASSEMBLY

As mentioned above, FIG. 2 is a bottom view of the disk drive 12. The printed circuit board 11 and chassis 14 are mechanically coupled in accordance with the present invention. At least one standoff 500 is shown coupled between the printed circuit board 11 and chassis 14 . The method of coupling the standoff is discussed below.

Figure 40:
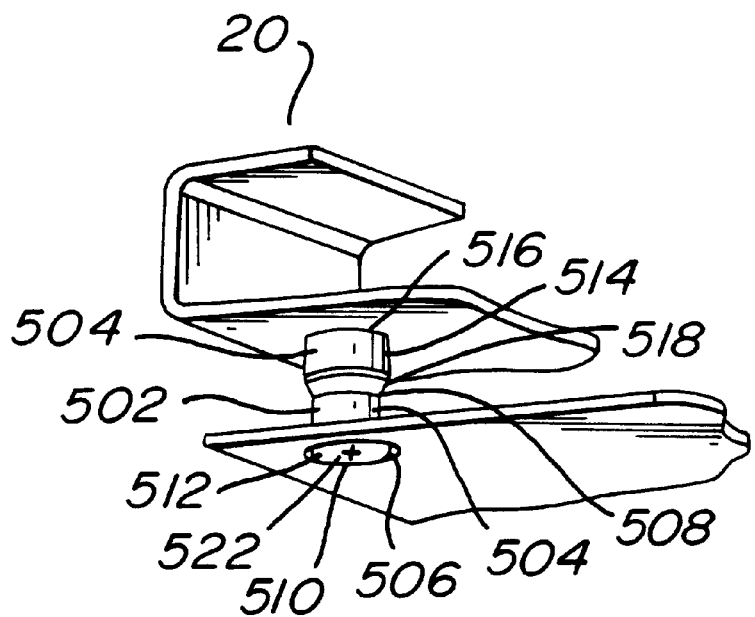
FIGS. 40 and 40A are enlarged views of a standoff assembly depicted in FIG. 2.
Figure 40A:
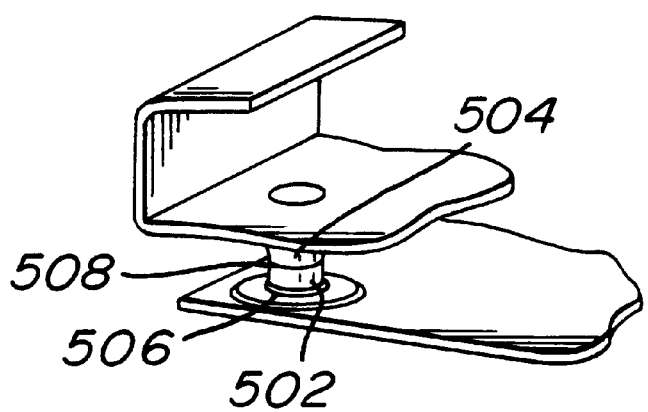

FIGS. 40 and 40A illustrate the preferred embodiment of the standoff assembly 500 and how it is coupled between the printed circuit board 11 and chassis 14. The standoff assembly 500 comprises an printed circuit board receptacle 502 and a chassis receptacle 504. The printed circuit board receptacle 502 and chassis receptacle 504 are adapted to be coaxially aligned and coupled thereto.

The printed circuit board receptacle 502 has a first sidewall 504 with a first open end 506 and a second open end 508 with a bore 510 extending therebetween. The first open end 506 is adapted to be soldered to a pad on the printed circuit board 11 adjacent to a receiving hole 510 formed in the circuit board 11 to enable a fastening member 512 to pass therethrough. Preferably, the circuit board 11 receptacle is made of a cooper material.

The chassis receptacle 504 comprises a second sidewall 514 with a proximal open end 516 and a distal open end 518 with a second bore 520 extending therebetween. Preferably, the second bore 520 is threaded and adapted to receive a screw having a screw head 522. The proximal end 516 of the chassis receptacle 504 is coupled or integrally formed to the chassis 14 such that the circuit board receptacle second end 508 can coaxially cooperate with the distal end 518 of the chassis receptacle 504. In this position, the screw 520 can be threaded through the second bore 520 such that the printed circuit board and chassis are coupled together. Preferably, the first end 506 of the circuit board receptacle is formed such that the screw head 522 is relatively flush or below the printed circuit board when the screw is threaded through each bore such that the screw head does not substantially extend out and away from the circuit board.

It is noted that the standoffs can be adapted to receive other types of fasteners without threads can be employed such that the head is relatively flush with the printed circuit board. Additionally, although four standoff assemblies are shown to attach the circuit board to the chassis. It is noted that the number of standoffs employed may depend on the size and shape of the circuit board and chassis.

AN IMPROVED OPERATING SYSTEM FOR AN EJECT SYSTEM AND A HEAD RETRACTION SYSTEM OF A DISK DRIVE

Figure 27:
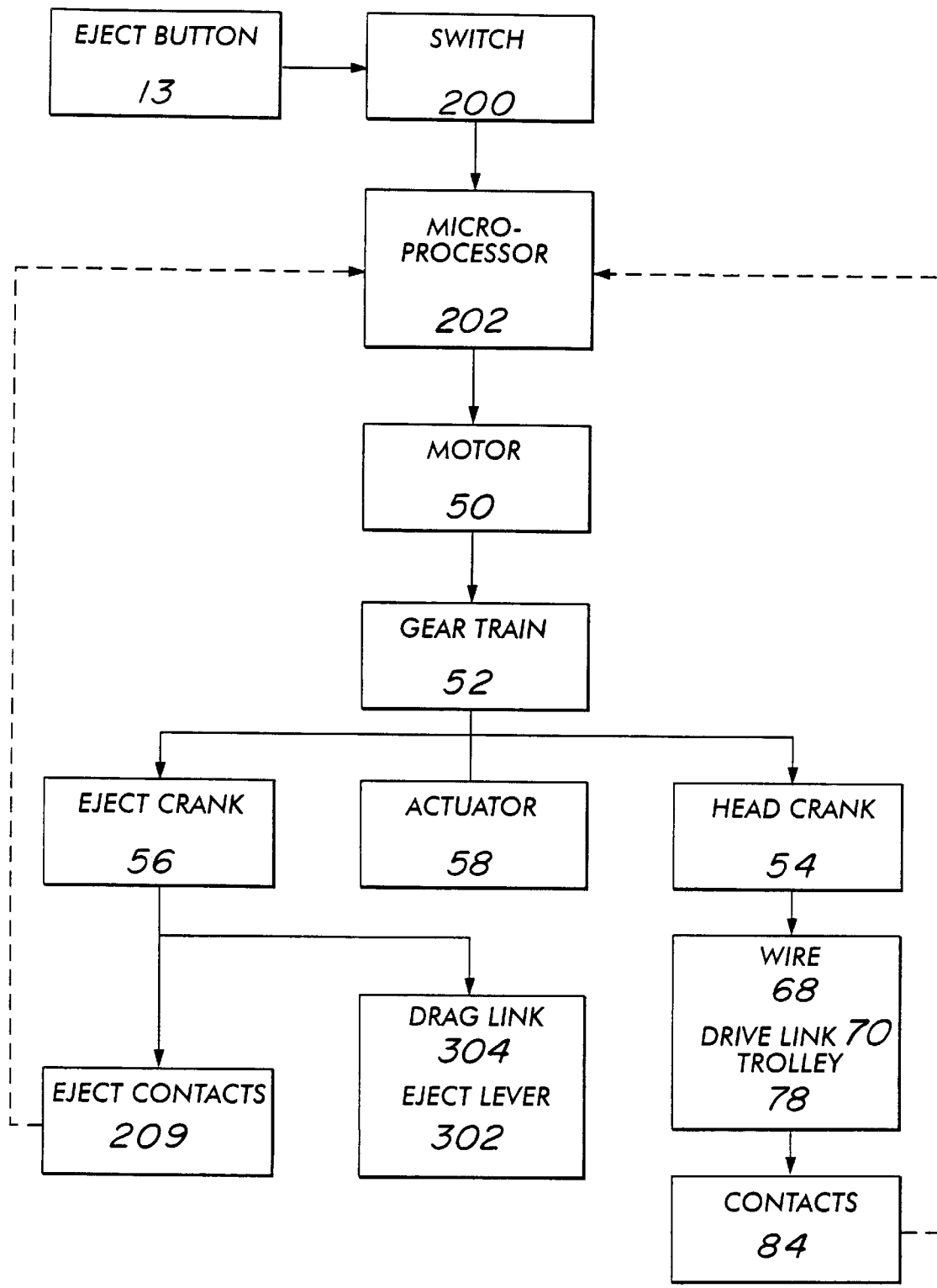
FIG. 27 is a schematic diagram of an operating system according to a preferred embodiment of this invention.

Depicted schematically in FIG. 27 is an improved operating system 46 for an eject system 44 and a head retraction system 42. This operating system 46 may include an eject button 13, an electrical switch 200, a microprocessor 202, a motor 50, a gear train 52, an eject crank 56 and a head crank 54. The eject button 13 may be disposed on the front of the disk drive 12, as depicted in FIGS. 1–3. Extending from the eject button 1–3 may be a member 204 that interfaces with an electrical switch 200. The electrical switch 200 is of a conventional type and is mated and unmated in response to operation of the eject button 13. Preferably, this electrical switch 200 is disposed on the circuit board 11 within the disk drive 12 depicted in FIG. 2. The microprocessor 202 is also of a conventional type and is in electrical communication with the electrical switch 200. The motor 50, the gear train 52, the eject crank 56 and the head crank 54 are disposed within the disk drive 12. The motor 50 is in electrical communication with the microprocessor 202 and operates in response to signals received from the microprocessor 202. The motor 50 powers the gear train 52 and can selectively power either the eject crank 56 or the head crank 54.

By way of overview, when a disk cartridge 10 is inserted into the disk drive 12 and the eject button 13 is depressed, the member 204 translates to close the electrical switch 200. With the switch 200 closed, the microprocessor 202 sends an electrical signal to the motor 50, which causes the motor 50 to rotate. Rotation of the motor 50 drives the gear train 52. The motor 50 is then selected to power either the eject crank 56 or the head crank 54 and thereby eject a disk cartridge 10 from the disk drive 12 and move the head retraction system 42. Although an eject button 13, a member 204 and an electrical switch 200 may be used to communicate a signal to retract the heads 38 and to eject a disk cartridge 10 a variety of other systems may be employed to communicate such a signal to the microprocessor 202.

Figure 19:
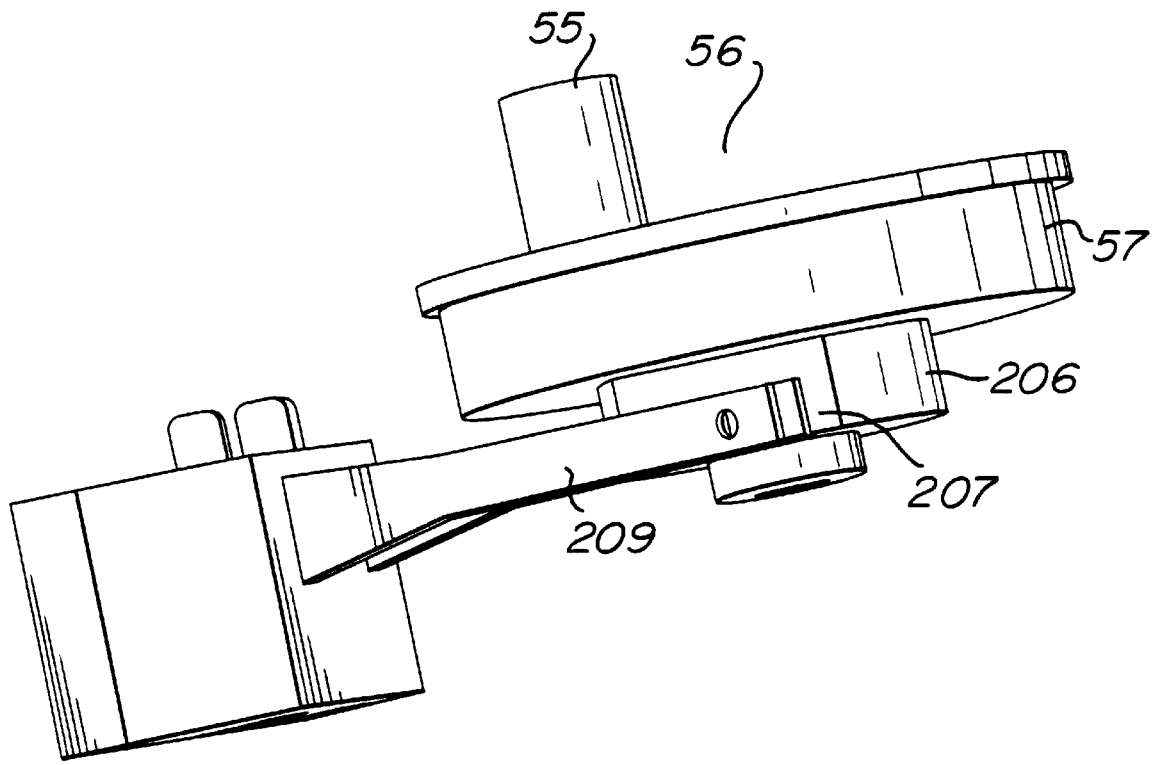
FIG. 19 is an isometric view of a component of the disk drive of FIG. 1.
Figure 20:
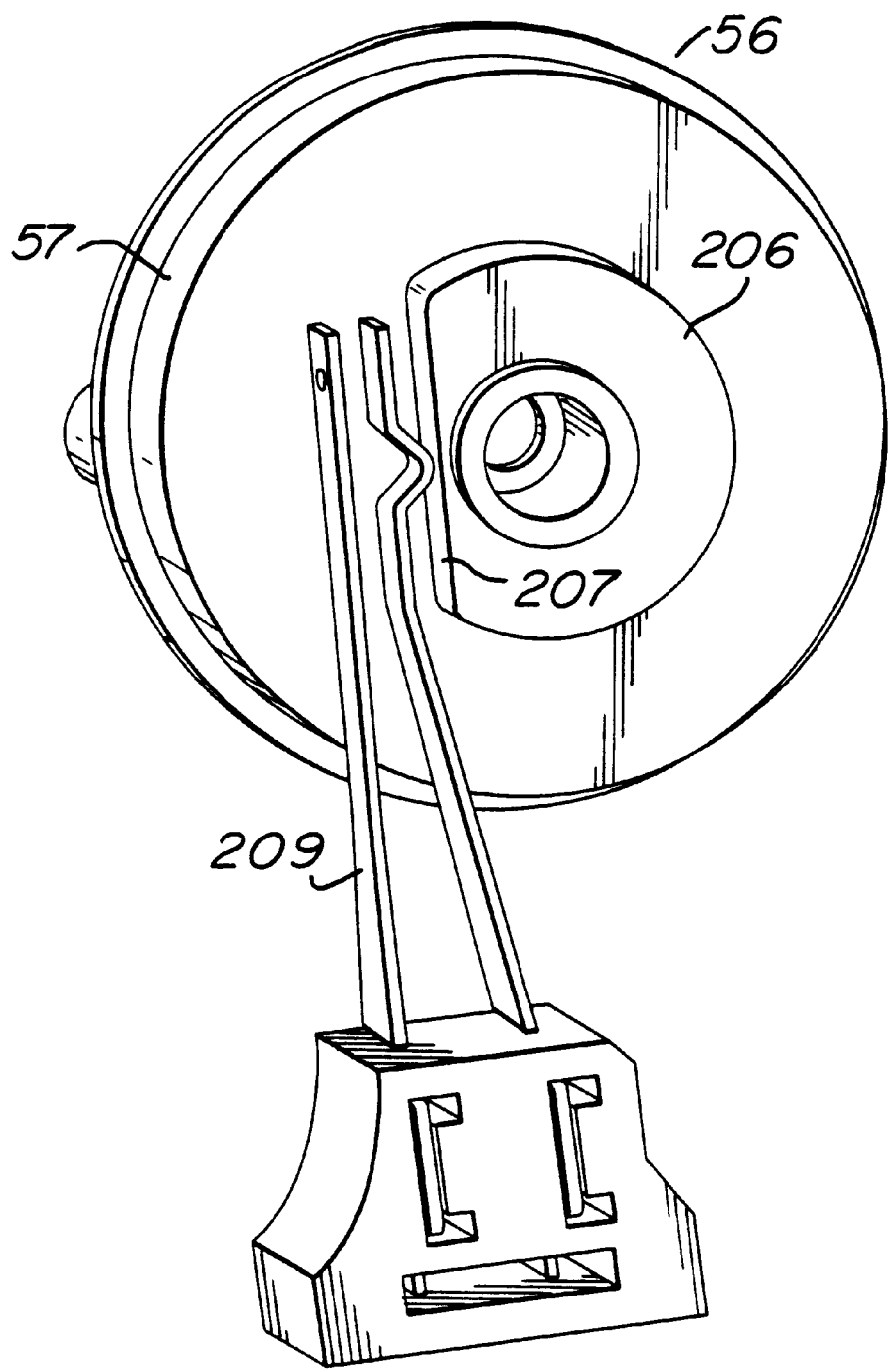
FIG. 20 is another isometric view of the component of FIG. 19.

As is illustrated in FIGS. 19 and 20, the eject crank 56 has a collar 206 disposed around its axis. The periphery of the collar 206 is generally circular, but a portion of the periphery is flat 207 and engageable with a pair of contacts 209 mounted to the disk drive 12 and extending in a plane parallel to the chassis 14, as viewed in FIGS. 21–23. The contacts 209 are spring loaded so that they are in an unmated position. When the contacts 209 are engaged with the circular portion of the collar 206, they are pushed together in a mated position. As the eject crank 56 rotates, the flat portion 207 engages the contacts 209 and they spring apart and become unmated. These contacts 209 interface with the microprocessor 202 to control the operation of the eject crank 56. The eject crank 56 may also have a finger 55 extending from a top surface for engaging the eject system 44. This eject finger 55 is preferably disposed off the center of the eject crank 56, so that it can function as a cam when engaged with the eject system 44.

As mentioned above, the operating system 46 also includes a motor 50, which drives the gear train 52 to operate either the head crank 54 or the eject crank 56. This motor 50 may be a fractional horse power motor 50 and in a preferred embodiment it is rated at about 300 g-cm at 30 revolutions per minute (rpm) and about 100 g-cm at 10 rpm. The motor 50 rotates an output shaft to which a worm gear 51 is preferably attached. The worm gear 51 engages the gear train 52, as is described in further detail below, to drive either the head crank 54 or the eject crank 56. Although a worm gear 51 is employed as the drive gear in a most preferred embodiment, other gearing systems may be employed to convert the rotation of the motor output shaft to rotation of the gear train 52.

A variety of gear trains 52 may be employed with this invention to link the motor 50 to either the eject crank 56 or the head crank 54. In a preferred embodiment the gear train 52 includes a first gear 210 that is driven by the worm gear 51. A second gear 212 is rotatably mounted on the same shaft as the first gear 210 and therefore, it will rotate in response to rotation of the worm gear 51. A third gear 214 is rotatably mounted to the disk drive 12 and is engaged with the second gear 212. The diameter of the second gear 212 is smaller than that of the first gear 210, and therefore they provide a speed reduction when engaged with the third gear 214. A pair of output gears, the fourth 216 and fifth 218 gears, are rotatably mounted about a common shaft. The fourth gear 216 has a larger diameter than the fifth gear 218. Moreover, the fourth gear 216 is engageable with the head gears 220 to drive the head crank 54, while the fifth gear 218 is engageable with the eject gear 57 to drive the eject crank 56. The fourth gear 216 is also engageable with the third gear 214.

Figure 32:
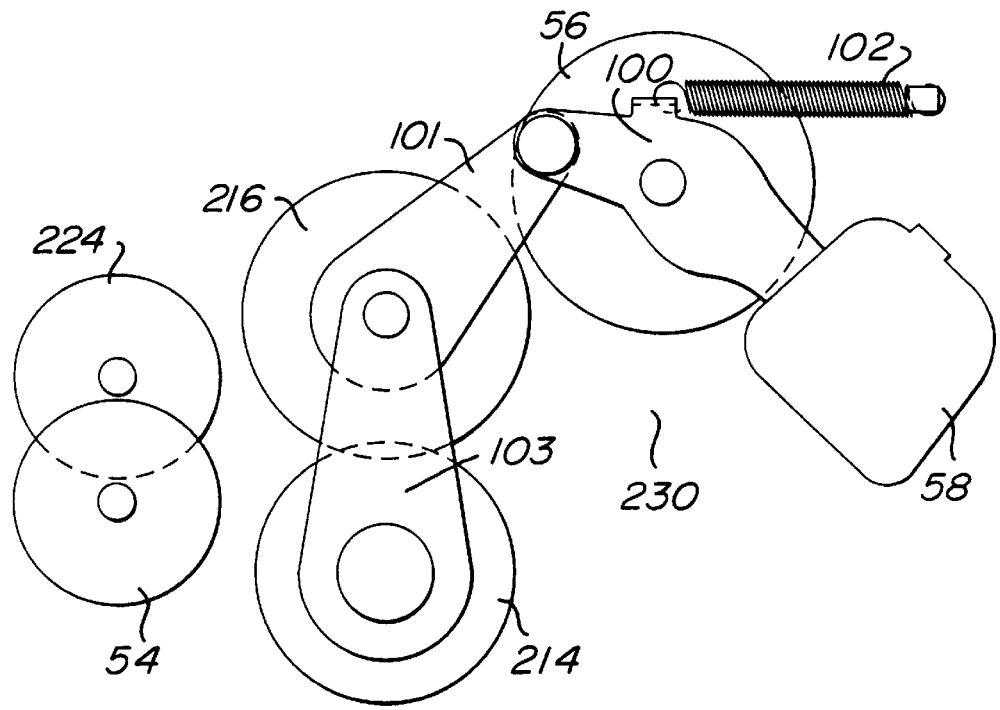
FIG. 32 is a diagrammatical view of a portion of the operating system of FIG. 21 in a first position.
Figure 33:
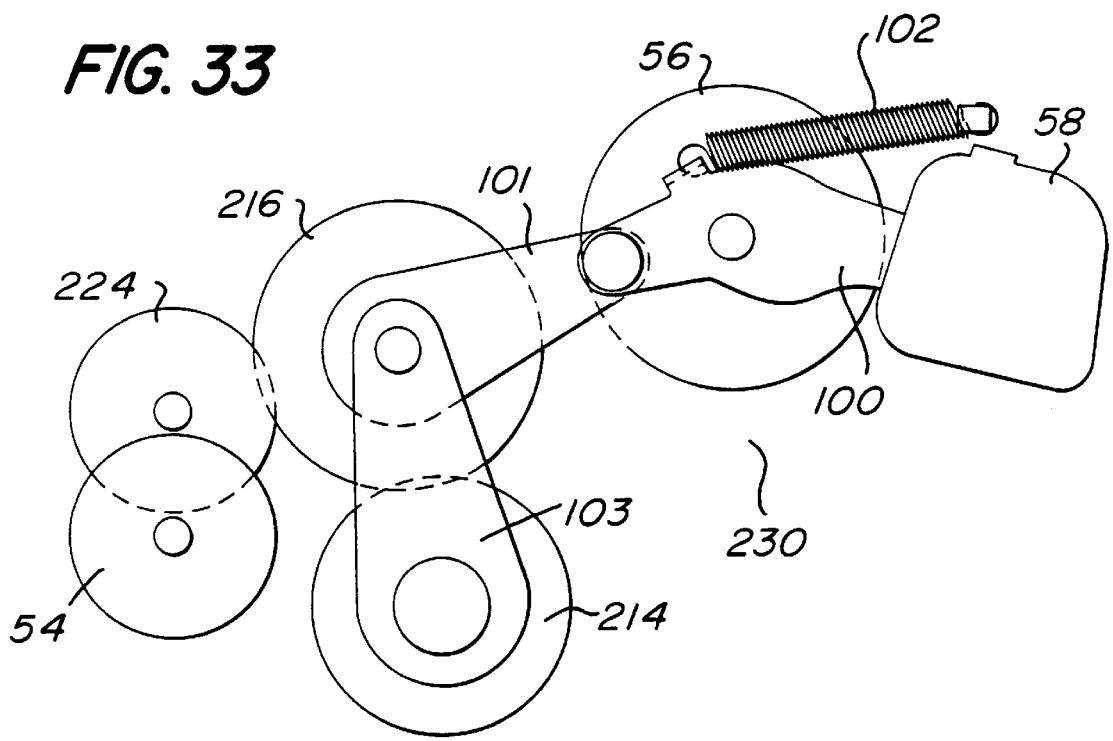
FIG. 33 is a diagrammatical view of a portion of the operating system of FIG. 21 in a second position.

In addition to be rotational about their shaft, the fourth 216 and the fifth gear 218 are also mounted on an end of a shift arm 103, as depicted in FIGS. 32 and 33. This shift arm 103 is rotatably mounted about the axis of the third gear 214. Thus, the fourth 216 and the fifth 218 gears have freedom of movement in two degrees. They can rotate about their own shaft, and they can rotate on the shift arm 103 about the center of the shaft of the third gear 214.

An eject gear 57 is mounted about the axis of the eject crank 56. This eject gear 57 is engageable with the fifth gear 218. In contrast, the head crank 54 has a first 224 and a second head gear 226 mounted about a common shaft and a third head gear 62 mounted on the head crank 54. The first head gear 224 is engageable with the fourth gear 216 and the second head gear 226 drives the third head gear 62 and the head crank 54 to rotate. The gearing is different for the head crank 54 and the eject crank 56 so that the proper torque and speed can be applied to each and rotate the respective cranks at their rated speed.

Also included within this operating system 46 is a switching mechanism 230 for switching the output of the motor 50 to either the head crank 54 or the eject crank 56. In the preferred embodiment illustrated in FIGS. 32 and 33, the switching mechanism 230 includes an electrical mechanical actuator 58 and a pair of toggle members 100, 101. This electrical mechanical actuator 58 may be a voice coil motor, solenoid or similar electrical mechanical device. In a preferred embodiment, the actuator 58 is a voice coil motor rated at about 4.5 volts and 80 milliamperes. The actuator 58 is mechanically linked to the fourth 216 and fifth gears 218 to direct the output of the motor 50 to either the head crank 54 or the eject crank 56.

In a preferred embodiment, this mechanical linkage includes two toggle members 100, 101 that are spring biased by a biasing spring 102. The first toggle member 100 is preferably rotatably mounted about the axis of the eject crank 56 and is attached to the actuator 58. Since the actuator 58 is mechanically coupled to the first toggle member 100, the actuator 58 is also rotatably mounted about the axis of the eject crank 56. The method of attaching the first toggle member 100 to the actuator 58 may be welding, fasteners, adhesives or other known fastening techniques. The second toggle member 101 is rotatably mounted about the axis of the third and fourth gears 214, 216. In addition, the toggle members 100,101 are connected at a movable pivot point, so that they can rotate relative to each other. This connection between the first and the second toggle members may be rivets or the like. Since the second toggle member 101 is rotatably mounted to the axis of the third and fourth gears 214, 216, it can move with the shift arm 103.

A biasing spring 102 is also provided which biases the toggle members 100, 101. More particularly, this spring 102 is mounted to the disk drive 12 and is connected to the first toggle member 100 to bias the first toggle member 100 to rotate in the clockwise direction. In contrast, the second toggle member 101 is biased to rotate in the counter clockwise direction.

In operation the operating system 46 functions to selectively power both the head crank 54 and the eject crank 56 from a single motor 50. When the eject button 13 is depressed, it causes the electrical switch 200 to mate, as described above. In response to the mating of the electrical switch 200, the microprocessor 202 sends a signal to the motor 51 and the motor 51 is powered. Initially, in response to an electrical signal, the actuator 58 rotates in the counter clockwise direction about the axis of the eject crank 56 from its initial state depicted in FIG. 32. This rotation occurs against spring pressure provided by the biasing spring 102. As the actuator 58 rotates, so does the mechanically linked first toggle member 100. The first toggle member 100 rotates counter clockwise, and the connected second toggle member 101 rotates in a clockwise direction. When the toggle members 100, 101 rotate, they move into a more obtuse angular relationship with respect to each other.

As mentioned above, the fourth 216 and fifth gears 218 are free to move and are not fixed to the disk drive 12. Since the fourth 216 and fifth 218 gears are connected by the shift arm 103 to third gear 214, they rotate about the axis of the third gear 214 as the second toggle member 101 is rotated. Thus, when the second toggle 101 begins to rotate and the toggles 100, 101 move into a more obtuse angular relationship the fourth and fifth gears 206 move away from the eject crank and towards the head crank 54. Eventually, the fifth gear 218 disengages from the eject gear 57, and the fourth gear 216 engages the first head gear 224, as depicted in FIG. 33. Thus, through operation of the actuator 58, the fourth gear 216 can be mechanically linked to the head crank 54 and, thereby mechanically linking the output of the motor 50 to the head crank 54.

In addition to providing electrical power to the actuator 58, electrical power is also provided from the microprocessor 202 to the motor 50. As the motor 50 is powered it drives a gear, which is preferably the worm gear 51 described above. This worm gear 51 then engages the gear train 52 and through the gear train 52 described above rotates the fourth gear 216. Since the fourth gear 216 is engaged with the first head gear 224, it causes rotation of the head crank 54 about its axis. Preferably, the motor 50 rotates in a direction which causes the head crank 54 to rotate in a clockwise direction as viewed in FIGS. 3, 6 and 21. Rotation of the head crank 54 together with the head retraction system 42 described below causes the head retraction system 42 to move to a retracted position.

As described below, though contacts, a sensor or a similar device the microprocessor 202 will determine that the head crank 54 has been rotated and power should be removed from the head crank 54. Upon determining this, the microprocessor 202 will cause the motor 50 to rotate in the opposite direction and remove power from the actuator 58. When electrical power is removed from the actuator 58, the biasing spring 102 will cause the actuator 58 to return to its original position. This occurs because as described above when power from the actuator 58 is removed, the force it applies decreases and eventually the force from the biasing spring 102 overcomes the decreasing force applied from the actuator 58. When this occurs, the biasing spring 102 causes the first toggle member 100 to rotate in a clockwise direction about the eject crank axis. This causes the second toggle member 101 to rotate in a counter clockwise direction and the first and second toggle members 100, 101 to move into a more obtuse angular relationship with one another. As this occurs, the fourth gear 216 becomes disengaged from the first head gear 224 and the fourth 216 and fifth 218 gears rotate towards the eject gear 57, as depicted in FIG. 32. Eventually, the fifth gear 218 engages the eject crank gear 57.

Since electrical power is still being provided to the motor 50, the motor 50 is still driving the worm gear 51 and the gear train 52. Thus, with the gear train 52 now mechanically linked to the eject crank 56, the motor 50 will now drive the eject crank 56 to rotate in a counter clockwise direction as viewed in FIGS. 3 and 6.

As the eject crank 56 rotates, two functions occur. First, the eject crank 56 interacts with several of the components of the eject system 42 to eject a disk cartridge from the disk drive. In addition, the operation of the contacts 209 is controlled by the rotation of the eject crank 56. As the eject crank 56 rotates and reaches about the 8 o'clock position as viewed in FIG. 22 and about the 4 o'clock position as viewed in FIG. 3, the rounded surface of the collar 206 of the eject crank 56 engages the contacts 209 and drives them together. This position is about where the finger 55 engages the drag link 304. Upon mating, the microprocessor 202 receives a signal informing it that the eject crank 56 is rotating and has begun to drive the drag link 304. The eject crank 56 will continue to rotate with the rounded surface of the eject crank 56 engaging the contacts 209. At about the 12 o'clock position as viewed in FIG. 3 (3 o'clock as viewed in FIG. 22) the eject crank 56 will have driven the drag link 304 to its rear most position and further rotation of the eject crank 56 will no longer drive the drag link 304. At about the 7 o'clock position as viewed in FIG. 3 (10 o'clock as viewed in FIG. 22), the flat surface 207 of the collar 206 will again engage the contacts 209. Spring pressure will allow the contacts to unmate. In the unmated position the contacts 209 send a signal to the microprocessor 202 indicating that the eject crank 56 has driven the drag link 304 and has rotated enough so that the finger 55 is clear of the path of the drive link 304 so that the drive link 304 can translate forward when a disk cartridge 10 is inserted into the disk drive 12.

Thus, in summary through a single motor 50, an actuator 58 and a gear train 52 two functions are achieved. The eject crank 56 is rotated to eject a disk cartridge 10 from the disk drive 12 and a head crank 54 is operated to hold the heads 38 in a retracted position.

Figure 24:
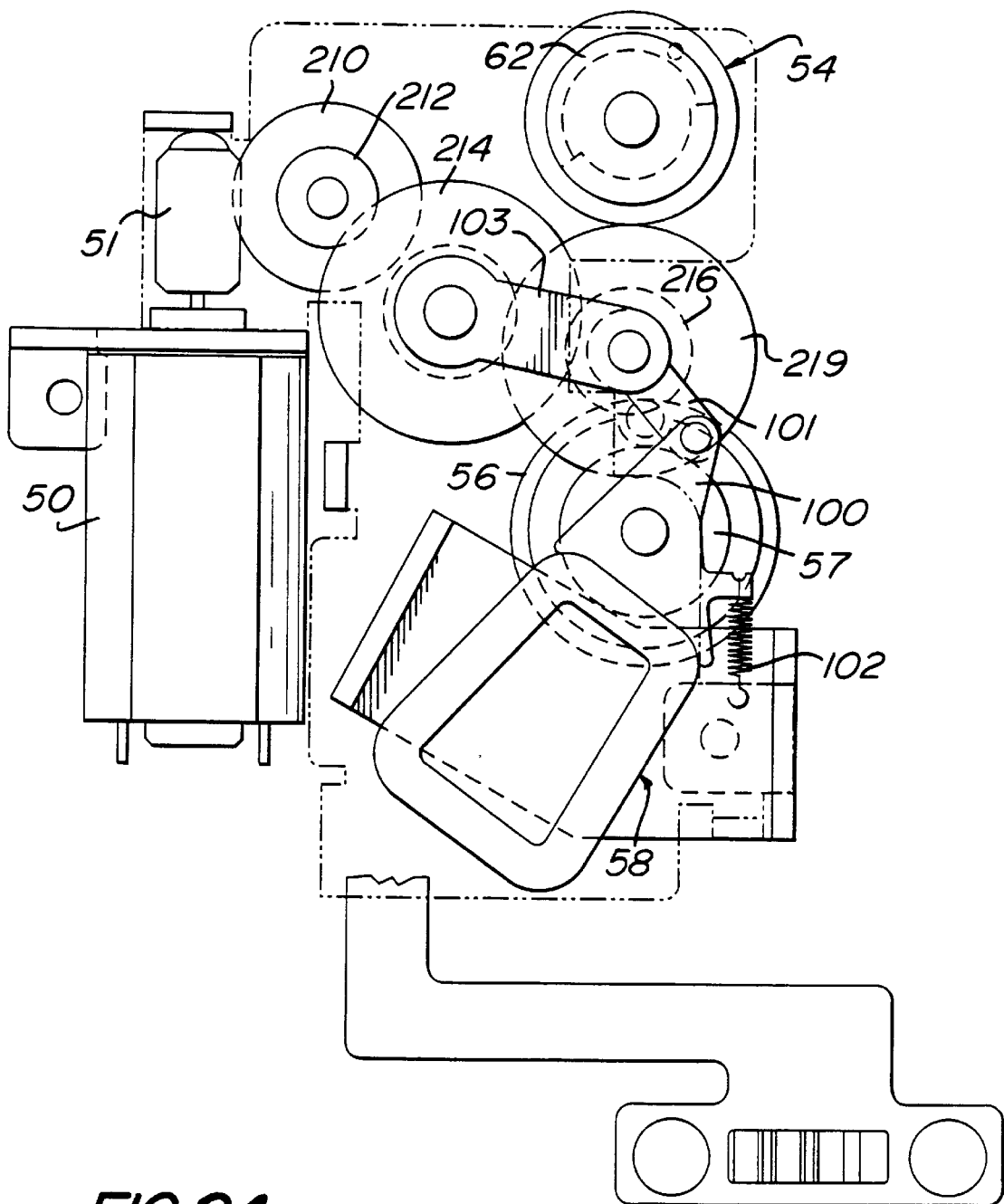
FIG. 24 is a diagrammatical view of an operating system of this invention according to another preferred embodiment.
Figure 25:
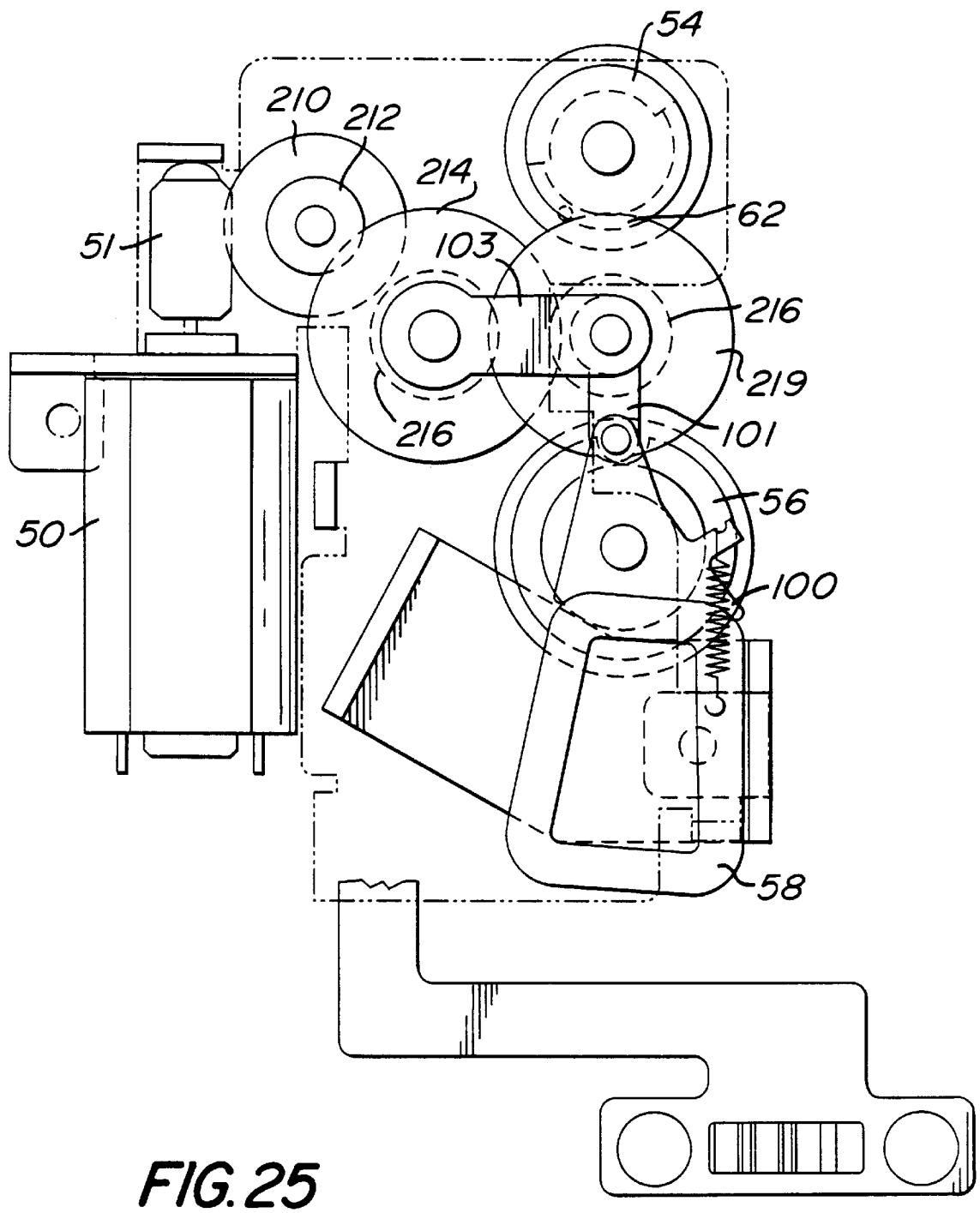
FIG. 25 is another diagrammatical view of the operating system of FIG. 24.
Figure 26:
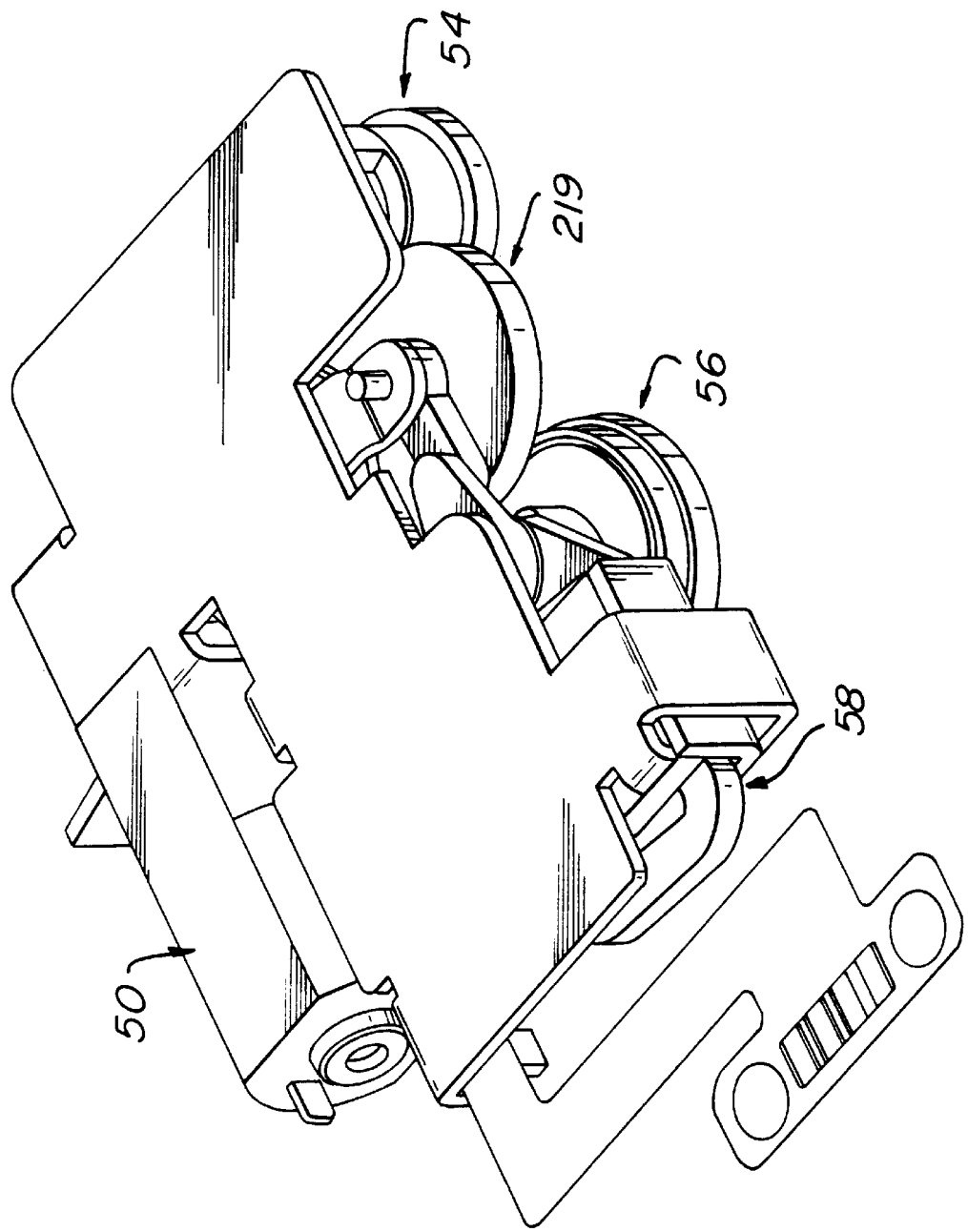
FIG. 26 is a third diagrammatical view of the operating system of FIG. 24.

In another preferred embodiment of this invention, the gear train 52 is varied slightly. Preferably, this gear train 52 provides a gear reduction between the motor and the eject crank 56 or the head crank 54. In a preferred embodiment, the gear train 52 includes, as shown in FIGS. 24 and 25, two sets of gears between the worm gear 51 and the output gears. The first set of gears includes a first gear 210 and a second gear 212. The first gear 210 is of larger diameter then the second gear 212, and they rotate about the same axis. The first gear 210 interfaces with the worm gear 51 driven by the motor 50. A third gear 214 is mounted to the disk drive and driven by the second gear 212. A fourth gear 216 and an output gear 219 are mounted on a common shaft, and the output gear 219 has a larger diameter than the fourth gear 216. The fourth gear 216 mates with the third gear 214, while the output gear 219 mates with either the eject gear 57 or the head gear 62. The fourth gear 216 and the output gear 219 may also be mounted on a shift arm 103 that is pivotally mounted about the axis of the third gear 214. Thus, in this embodiment the output gear 219 has freedom of movement in two degrees, rotationally about its own axis and rotationally about the axis of the third gear 214. Disposed on the eject crank 56 is an eject gear 57 and disposed on the head crank 54 is a head gear 62. The importance of using a gear train 52 of this type because it allows for the proper speed reduction between the output of the motor and each of the cranks.

In this preferred embodiment, the electrical mechanical actuator 58 is similar to that described above and may be a voice coil motor. Instead of being rigidly attached, in this embodiment, the first toggle member 100 mates with the actuator 58 in a cam and follower arrangement, as depicted in FIGS. 24 and 25. The actuator 58 acts as the cam and the first toggle member 100 as the follower. In a preferred embodiment, the actuator 58 has a cammed mating surface that mates with a follower surface of the first toggle member 100. The follower surface is constructed so that when the cammed surface contacts it, a portion of the follower surface will remain in contact with the cam surface as the actuator 58 drives the first toggle member 100. Similar to the embodiment described above, the first toggle member 100 is pivotally mounted about the axis of the eject crank 56. In this embodiment, the second toggle member 101 is again pivotally connected to the first toggle member 100 and rotatably connected to the shaft of the output gear 219.

In its initial state, the output gear 219 is linked to the eject gear 57 to drive the eject crank 56, as depicted in FIG. 24. When the eject button 13 is depressed, it causes the electrical switch 200 to mate, as described above. In response to the mating of the electrical switch 200, the microprocessor 202 sends a signal to the motor 51 and the motor 51 is powered. Initially, in response to an electrical signal, the cammed surface of the actuator 58 engages the follower surface of the first toggle member 100 and causes it to rotate in a counter clockwise direction about the axis of the eject crank 56. This rotation occurs against spring pressure provided by the biasing spring 102. As the first toggle member 100 rotates counter clockwise, the second toggle member 101 rotates in a clockwise direction. When the toggle members 100, 101 rotate, they move into a more obtuse angular relationship with respect to each other.

As the toggle members 100, 101 rotate, they cause the output gear 219 to rotate on the shift arm 103 about the axis of the third gear 214. The output gear 219 rotates on the shift arm 103 until it engages the head gear 62 disposed on the head crank 54, as depicted in FIG. 25. While engaged, the motor 50 powers the head crank 54. Upon receiving an electrical signal indicating that the head crank 54 no longer needs to be rotated, the power is removed from the actuator 58 and the biasing spring 102 causes the output gear 219 to rotate on the shift arm 103 away from the head crank 54 and to the eject crank 56. Upon engagement with the eject gear 57, the output gear 219 drives the eject crank 56 to rotate. Although not shown in this embodiment, contacts 209 may be disposed to operate in conjunction with a collar 206 disposed on the eject crank 56 as described above to control the motor 50. Alternatively, a timer or similar device may be employed.

Another preferred embodiment of the operating system 46 is depicted in FIGS. 28–31. In this embodiment, the operating system 46 of the disk drive 12 also includes a motor 50, a gear train 52, an eject crank 56 and a head crank 54. Although the motor 50 in this embodiment selectively powers both the eject crank 56 and the head crank 54, an electrical mechanical actuator is not needed in this embodiment. Rather, the switching device in this embodiment is purely a mechanical actuator 58 that operates similar to a brake and clutch to switch the output of the motor 50 between the eject crank 56 and the head crank 54. In a preferred embodiment the actuator 58 is a clip.

The gear train 52 in this embodiment includes a first 210 and a second gear 212 rotatably mounted about a common shaft with the first gear 210 having a larger diameter than the second gear 212. The first gear 210 mates with the worm gear 51 driven by the motor 50. A third 214 and a fourth gear 216 are also mounted about a common shaft. The third 214 and fourth gears 216 are not fixed to the disk drive 12. Rather, they are mounted on a shift arm 103 that is rotatably mounted about the axis of the first and second gears 210, 212. Thus, the third 214 and fourth 216 gears have freedom of movement in two degrees. They can rotate about their own axis and they can also revolve around the shaft of the first and the second gears 210, 212.

The third gear 214 has a larger diameter than the fourth gear 216, and the third gear 214 mates with the second gear 212. The fourth gear 216 is selectively engaged with either the eject gears 222 or the head gears 220. The eject gears 222 include a first 223, a second 225 and a third 57 eject gear. The first 223 and the second 225 eject gears are mounted about a common shaft with the first eject gear 223 having a larger diameter than the second eject gear 225. The third eject gear 57 is disposed about the periphery of the eject crank 56. The first eject gear 223 is engageable with the fourth gear 216 and the second eject gear 225 engages the third eject gear 57 to drive the eject crank 56. The head gears 220 include a first head gear 224 that is engageable with the fourth gear 216, and a second head gear 62 disposed on the periphery of the head crank 54 that is engageable with the first head gear 224.

Figure 31:
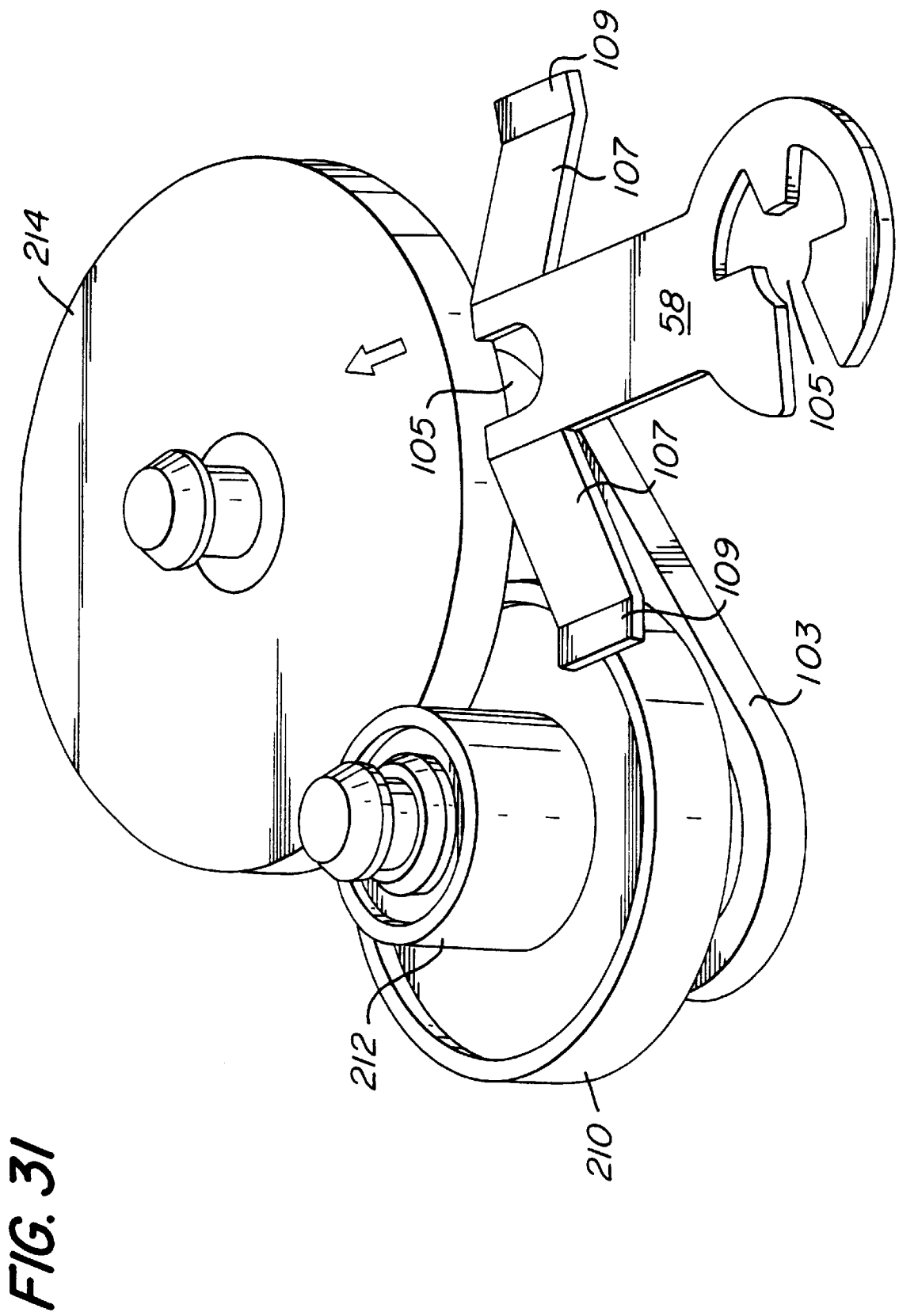
FIG. 31 is an isometric view of a portion of the operating system of FIG. 28.

As alluded to above, the actuator 58 in this embodiment is a clip, as is best seen in FIG. 31. The clip is affixed to the shaft of the first and second gears 210, 212 and the shaft of the third and fourth gears 214, 216. This clip may have two openings 105 disposed along its longitudinal axis for affixing the clip to these shafts. Although clipping is the preferred method of attachment, other forms of fastening, including but not limited to, are an interference fit and a threaded connection. The clip may also have a first and a second spring member 107 extending at an angle from its longitudinal axis at the end of the clip disposed on the shaft of the third and fourth gears 214, 216. At the end of both spring members 107 is a bar 109 that rests upon the surface of the output gear 219. The clip is preferably attached so that it pushes down, as viewed in FIG. 28, with a normal force upon the surface of the third gear 214. This force is applied by the bars 109.

The clip functions to engage the fourth gear 216 with either the eject crank 56 or the head crank 54 as follows.

Figure 30:
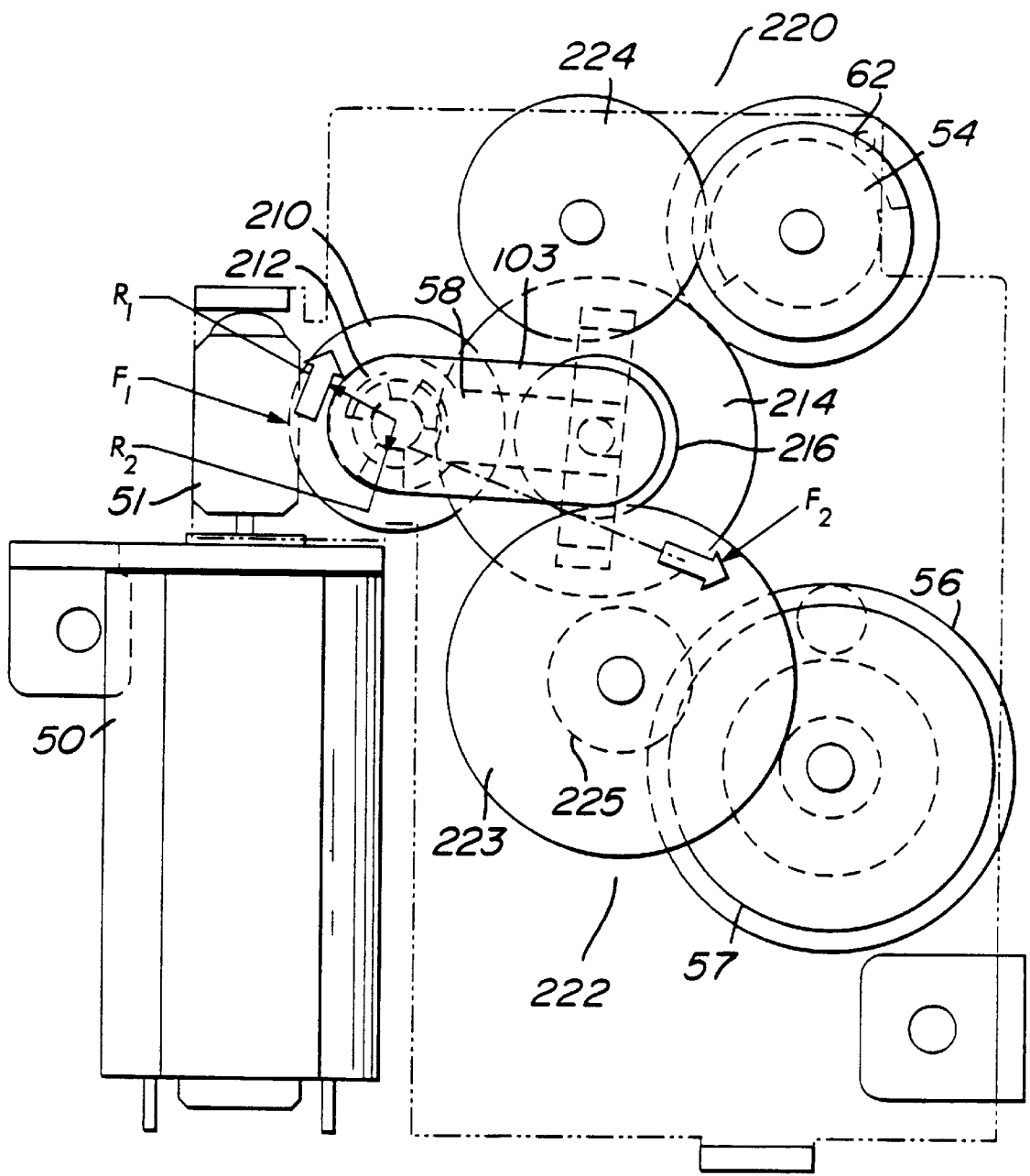
FIG. 30 is another diagrammatical view of the operating system of FIG. 28.

With a disk cartridge 10 inserted into the disk drive 12, the fourth gear 216 is engaged with the first eject gear 223 as shown in FIG. 30. Rotation of the motor 50 causes, the worm gear 51 to drive the first gear 210 to rotate. As the first gear 210 is powered by the worm gear 51, a torque is generated that is equal to the product of the radius $R_1$ and the force $F_1$ exerted by the worm gear 51 on the first gear 210.

As mentioned above, the clip 58 is exerting a normal force $F_n$ downward on the third 214 and fourth 216 gears. Because this normal force $F_n$ pushes down with a force great enough to compress the third 214 and fourth 216 gears between the clip and the disk drive 12, the third and fourth gears 214, 216 resist rotating. Alternatively stated, the clip operates similar to a break in that it creates a frictional force by compressing the third 214 and fourth 216 gears so that they resist rotating. The resistance to rotation can be expressed as a force $F_2$ that is tangential to the second gear 212 in a plane perpendicular to the normal force $F_n$. This force $F_2$ creates a torque $T_2$ equal to the product of $F_2$ and the radius $R_2$ of the second gear 214 that resists rotation of the second gear 214.

Figure 28:
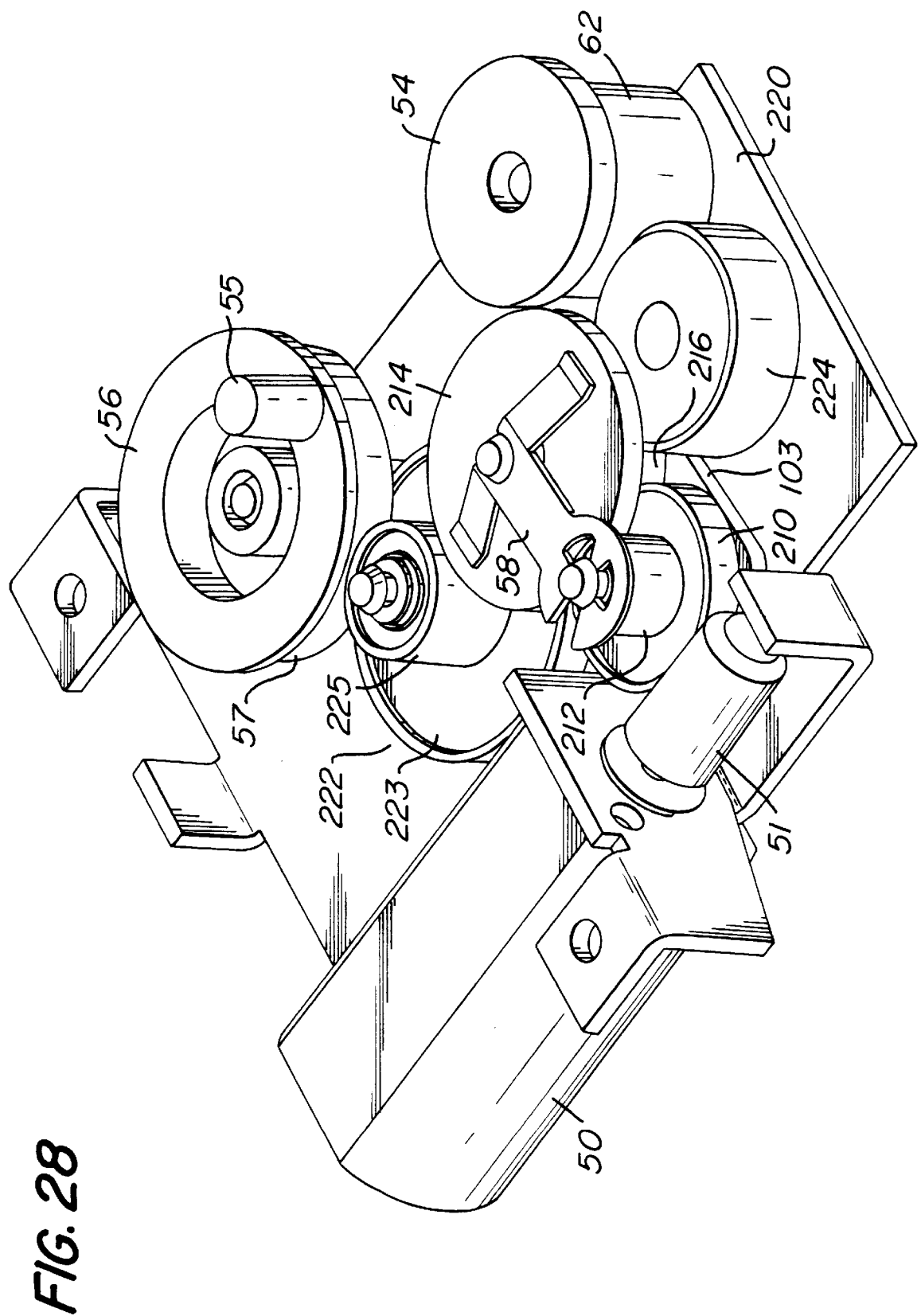
FIG. 28 is an isometric view of an operating system of this invention according to a third preferred embodiment.
Figure 29:
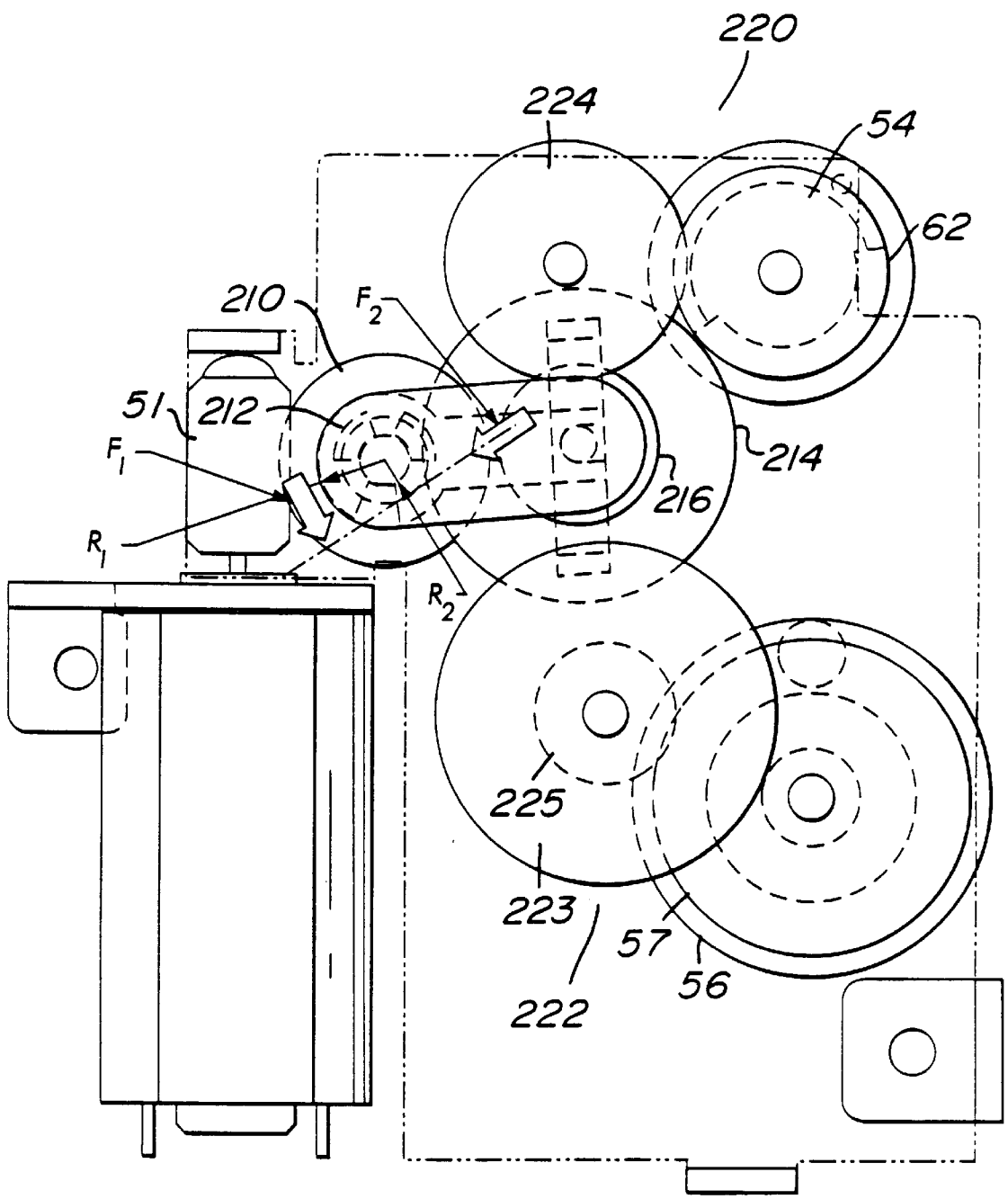
FIG. 29 is a diagrammatical view of the operating system of FIG. 28.

Initially, the worm gear 51 drives the first and second gears 210, 212 to rotate in a counter clockwise direction as viewed in FIGS. 28 and 29. When the first gear 210 is powered with the driving torque $T_1$ equal to the product of $F_1$ and $R_1$, the torque $T_2$ generated by the normal force of the clip opposes the driving torque, as viewed in FIG. 29. As long as the torque $T_1$ is greater than the torque $T_2$, the third 214 and fourth 216 gears are driven to rotate about the axis of the first 210 and second 212 gears on the shift arm 103. As they rotate, the fourth gear 216 moves away from the first eject gear 223 and engages the first head gear 224, as shown in FIG. 29. When engaged with the first head gear 224, the torque $T_2$ increases due to engagement with the head gears 220 greater than the magnitude of $T_1$. With $T_2$ greater than $T_1$, the third 214 and fourth 218 gears no longer rotate about the axis of the first 210 and second 212 gears, and they now rotate about their own axis. As they rotate about their own axis, the head gears 220 are driven to rotate and the head crank 54 is powered. When powered, the head crank 54 operates in conjunction with the head retraction system 42 described below.

In this embodiment, the motor 50 is reversible and when the head retraction system 42 sends a signal indicating that power should be removed from the head crank 54, the microprocessor 202 sends a signal to the motor 50 to cause it to reverse its direction of rotation. As the motor 50 rotates in the opposing direction, the torques $T_1$ and $T_2$ change direction. In this direction, the torque $T_2$ is greater than the torque $T_1$ and therefore, the third and fourth gears 214, 216 are driven to rotate on the shift arm 103 away from the head gears 220. As they rotate on the shift arm 103, the third and fourth gears 214, 216 stop rotating about their own axis. The shift arm 103 eventually rotates the third and fourth gears 214, 216 so that the fourth gear 216 engages the first eject gear 223, as shown in FIG. 30. Upon engaging the first eject gear 223, the torque $T_2$ increases and the third and fourth gears 214, 216 are prevented from rotating on the shift arm 103. In this position, the third and fourth gears 214, 216 rotate about their own axis, and the fourth gear 216 powers the eject gears 222 to rotate the eject crank 56 and thereby eject a disk cartridge 10 from the disk drive 12 as described above.

It is important to appreciate the selection of the proper spring and force to be exerted by the actuator 58. If the force is not great enough in magnitude, friction between the shift arm 103 and the disk drive 12 will prevent the third and fourth gears 214, 216 from rotating the entire distance from the head gears 220 to the eject gears 222. More particularly, the shift arm 103 would stop midway between the head gears 220 and the eject gears 222 and begin spinning idly without engaging either the eject gears 222 or the head gears 220.

For several reasons (including disconnecting the source of electrical power) electrical power to the motor 50 can be removed during operation of the gears 52. If the output of the motor 50 is linked to the head gears 220, it is important to disengage the head gears 220 to release the components of the head retraction system 42 that the head crank 54 drives. In order to disengage the head gears 220 from the motor 50, a sensor and a capacitor are provided on the circuit board 11. The sensor detects a loss of electrical power to the motor 50 and the capacitor has sufficient power to operate the motor 50 for several turns. If electrical power is lost while the motor 50 is linked to the eject gears 220, the capacitor will drive the motor 50 to rotate in the reverse direction. Upon reversing its direction of rotation, the change in direction of the torque $T_1$ causes the third and fourth gears 214, 216 to rotate on the shift arm 103 and to disengage the motor 50 from the head gears 220.

In this embodiment, a single motor 50 can power either the eject system 44 or the head retraction system 42. By reducing the need for an electrical mechanical actuator 58, additional cost savings are achieved. Furthermore, the size of the operating system 46 can be reduced and the electrical power needed to operate the operating system 46 may be reduced.

AN IMPROVED HEAD RETRACTION SYSTEM OF A DISK DRIVE

Figure 6:
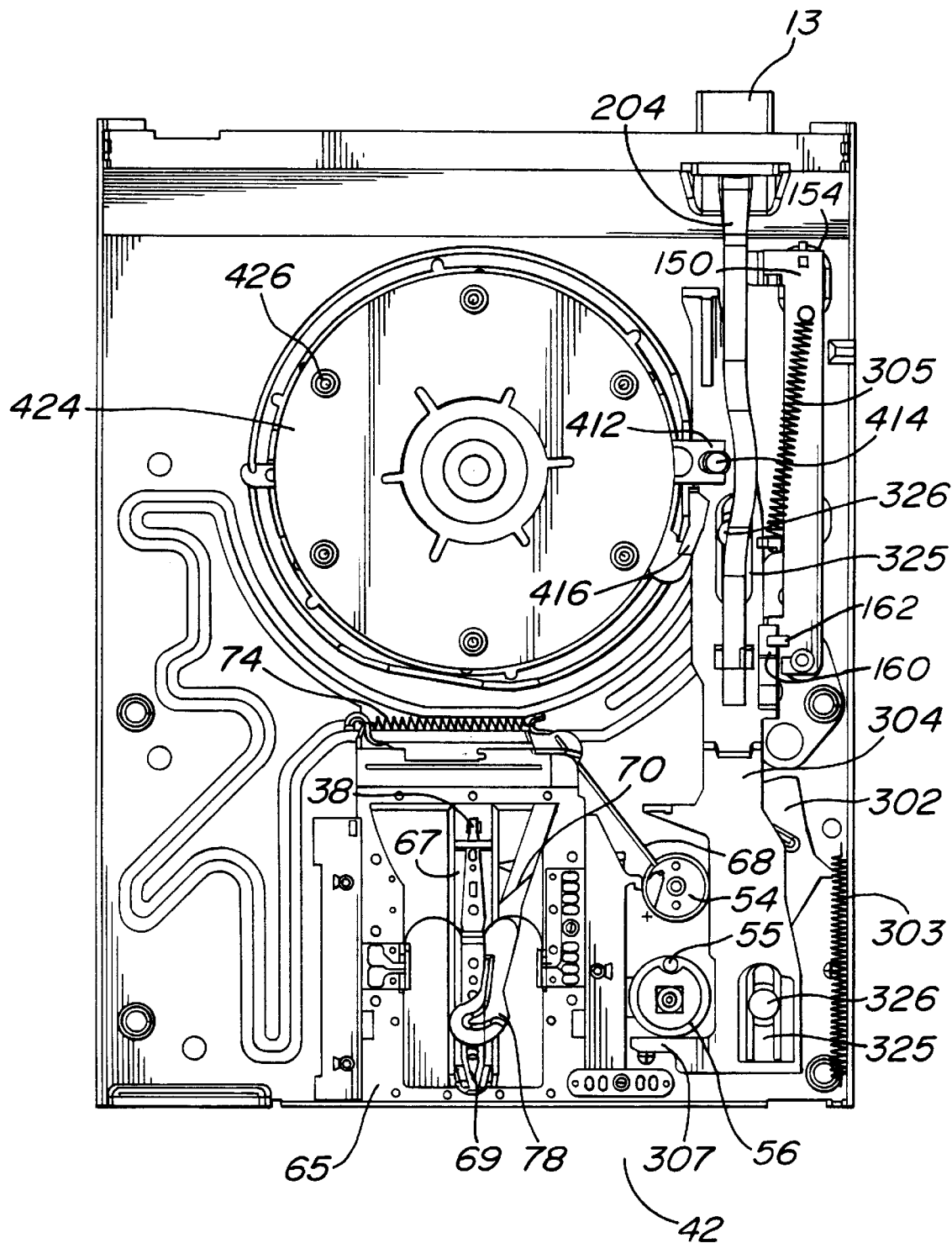
FIG. 6 is a bottom view of the disk drive of FIG. 1.

According to a preferred embodiment of this invention, an improved head retraction system 42 includes a head crank 54, a drive link 70, a trolley 78 and a linear actuator 16, as illustrated in FIGS. 1 and 6. These components operate in conjunction to hold the heads in a retracted position when a disk cartridge 10 is ejected from the disk drive 12.

By way of overview, the linear actuator 16 is mounted within the disk drive 12 so that it can move linearly or approximately parallel to the chassis as shown in FIG. 1. Although the actuator 16 moves substantially parallel to the chassis, the actuator 16 may move in either of the planes perpendicular to the chassis. The linear actuator 16 includes a carriage assembly 32, a load beam 60, a head gimbel assembly 61 and heads 38 The load beam 60 is preferably welded to the head gimbel assembly 61, and the heads 38 are mounted on an end of the head gimbel assembly 61. The load beam 60, the head gimbel assembly 61 and the heads 63 are all mounted on the carriage assembly 32. As can be seen in FIG. 1, the carriage assembly 32 is translatably mounted in the disk drive 12. In particular, the carriage assembly 32 is free to translate toward the front and the back of the disk drive 12. Preferably, the carriage assembly 32 has a rod (not shown) mounted through the assembly 32 upon which the carriage assembly 32 translates.

The head retraction system 42 preferably has a retainer 65 mounted to the underside of the chassis 14, as depicted in FIGS. 3 and 6–9. The retainer 65 may be affixed to the chassis 14 with a variety of known fastening techniques, including threaded fasteners. In a preferred embodiment, the retainer 65 is constructed from transparent plastic so that different portions of the retraction system 42 are visible for maintenance and other purposes. Disposed within the retainer 65 is a groove 67 running from the front of the retainer to the back of the retainer. The carriage assembly 32 translates in this groove. More particularly, the carriage assembly 32 has a post 69 extending from the assembly 32 above the groove 67, down through the groove 67 and below the groove 67. In a preferred embodiment, this post 69 has a triangular cross section and a flat portion running perpendicular to the groove 67 for engagement with the trolley 78.

Figure 9:
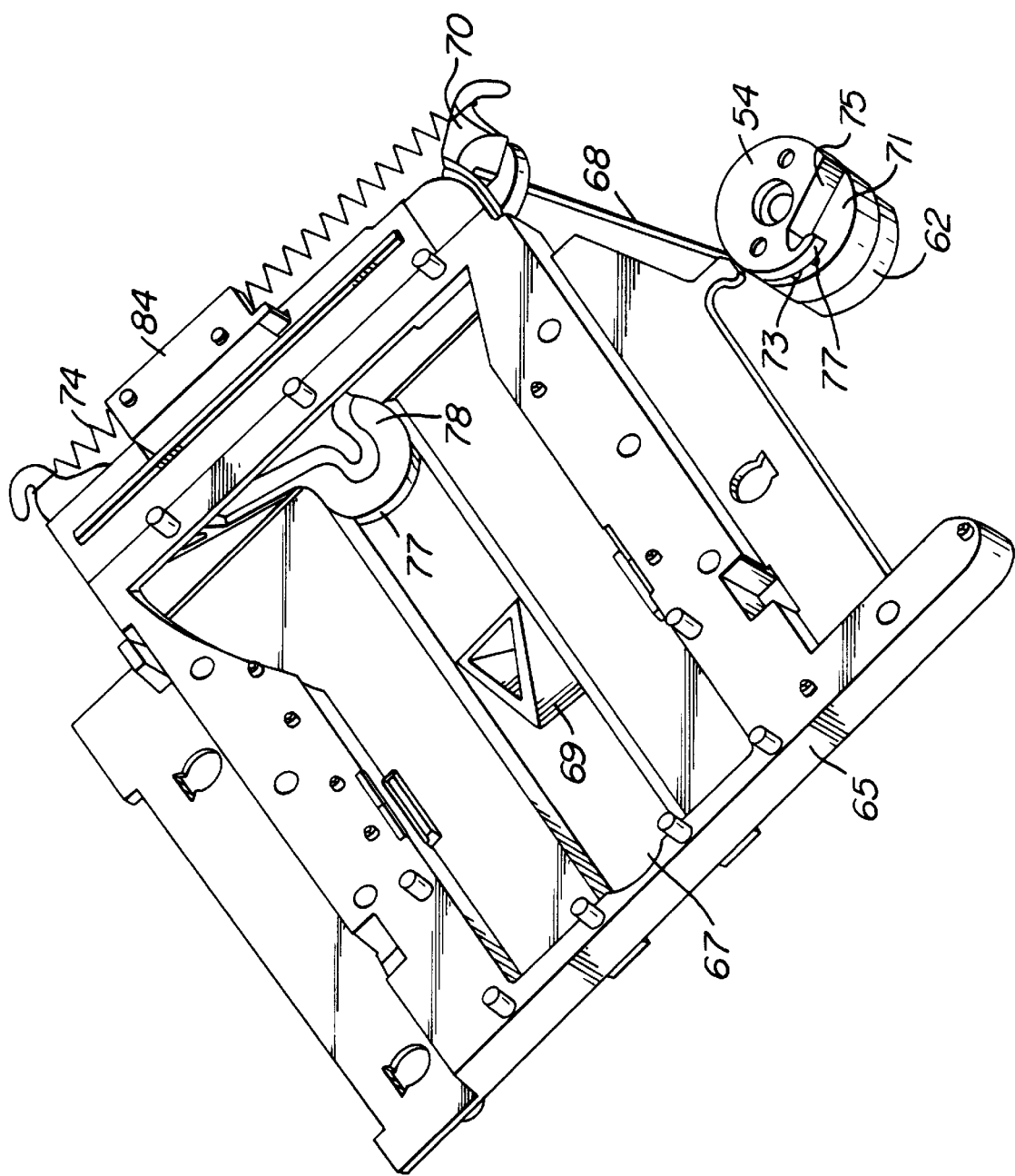
FIG. 9 is an isometric view of the head retraction system of FIG. 7 in a third position.
Figure 10:
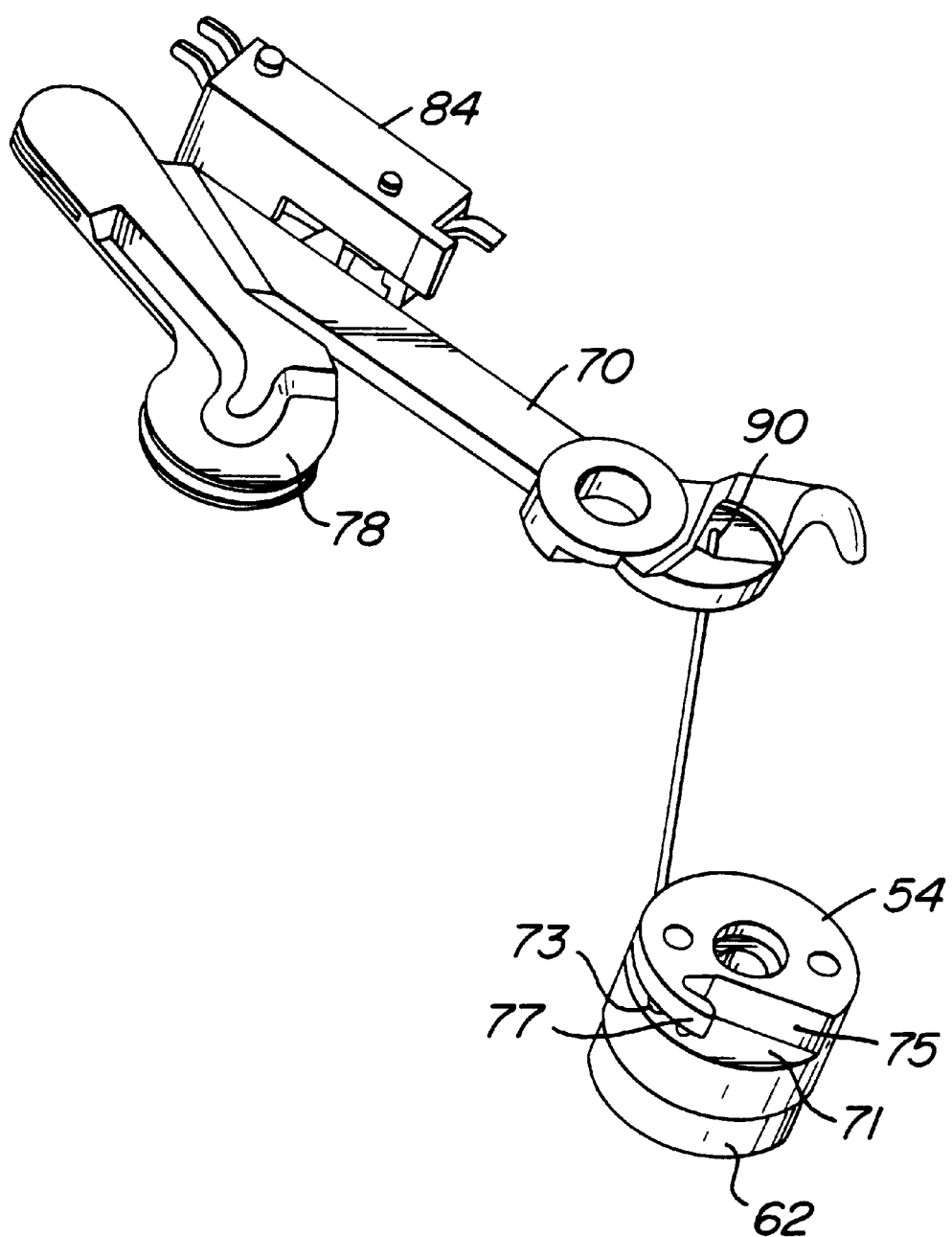
FIG. 10 is an isometric view of a portion of the head retraction system of FIG. 7.
Figure 21:
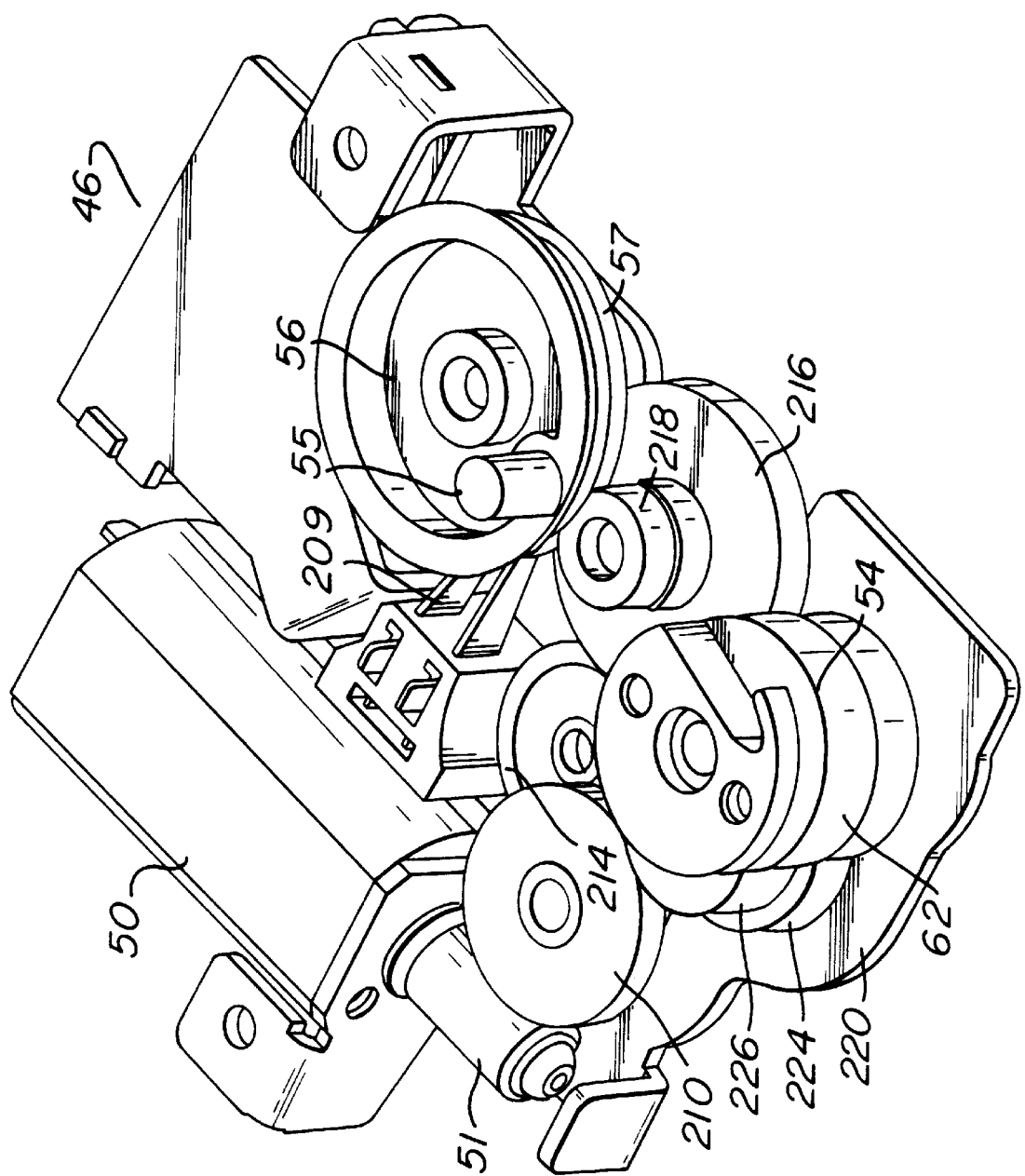
FIG. 21 is an isometric view of an operating system of the disk drive of FIG. 1 according to a preferred embodiment of this invention.
Figure 22:
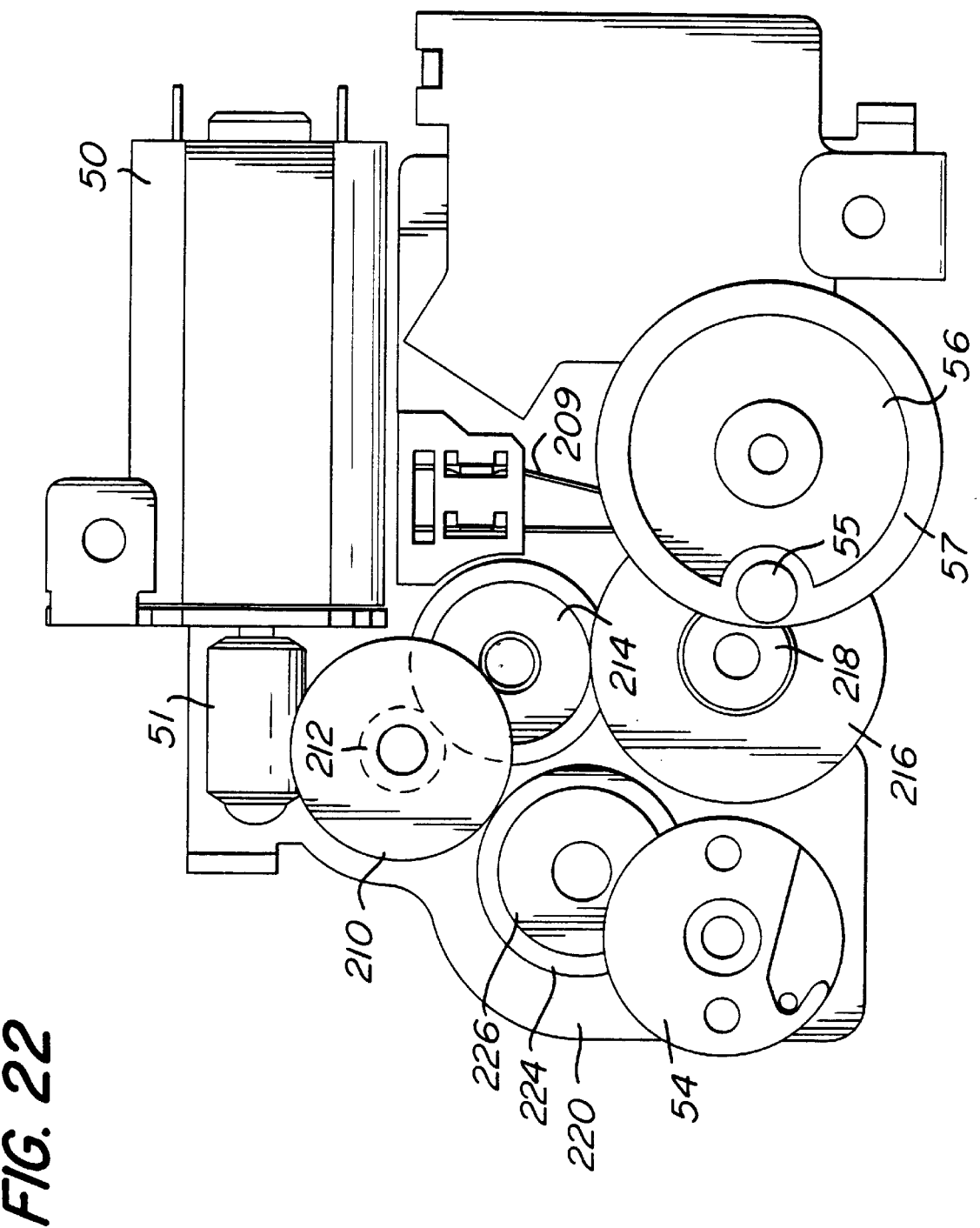
FIG. 22 is a diagrammatical view of the operating system of FIG. 21.
Figure 23:
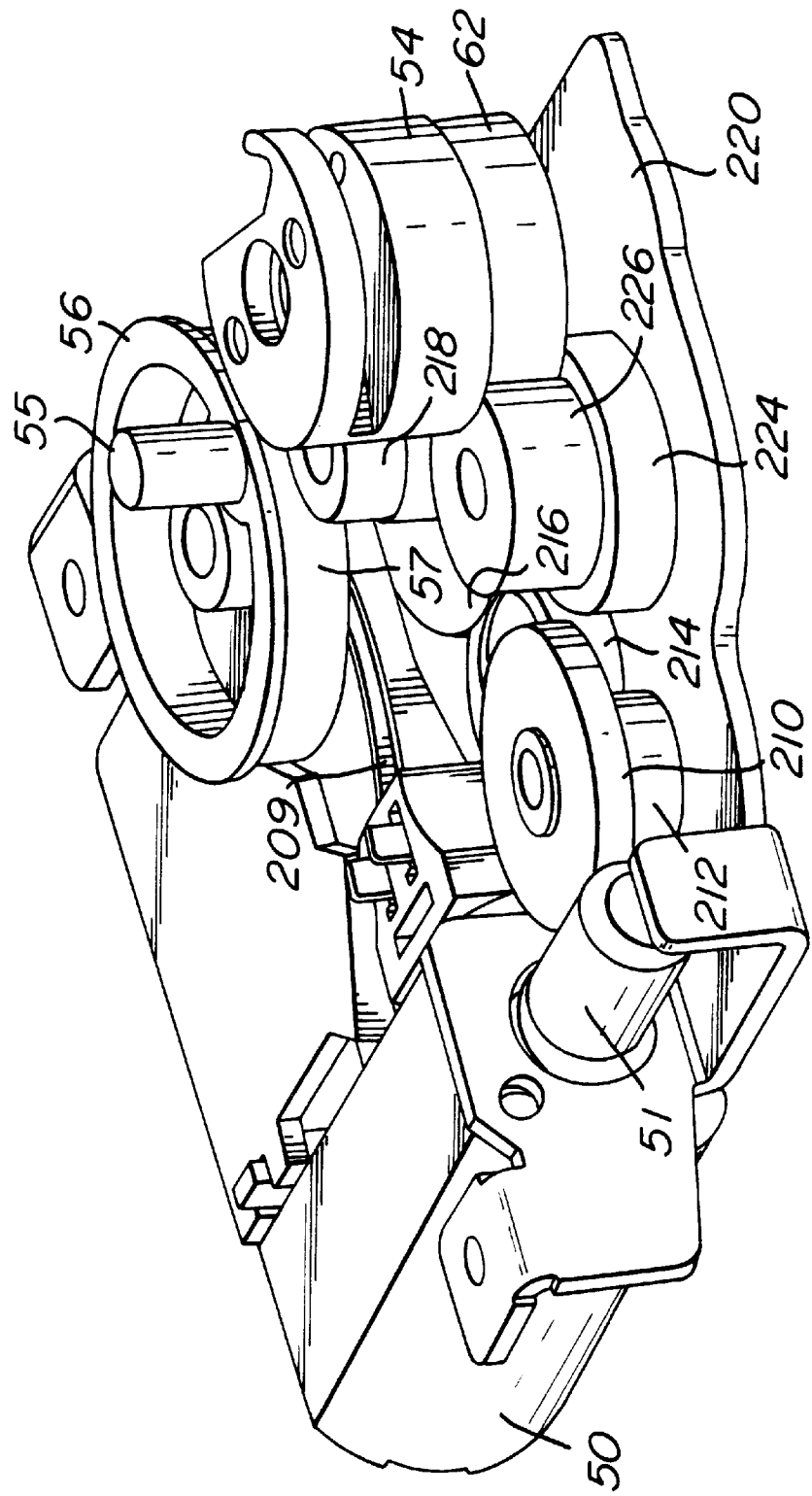
FIG. 23 is an isometric view of the operating system of FIG. 21.

As shown in FIGS. 9 and 10, the head crank 54 includes a head gear 62 and a cylindrical member 64 both mounted around a center of the head crank 54. The head gear 62 transmits power from the operating system 46, as described above, to power the head crank 54. In addition, the head crank 54 has a circumferential groove 71. In a preferred embodiment this groove 71 extends around a portion of the periphery of the head crank 54, and in the preferred embodiment depicted, the groove 71 extends about 270° around the periphery of the head crank 54. As is depicted in FIGS. 21 and 23, a recess 73 used in conjunction with the wire 68 described below is disposed within the groove 71. The recess 73 is preferably disposed away from the center of the head crank 54, so that the wire 68 can act as a cam, as is discussed below in further detail, when the head crank 54 rotates.

The bottom portion of the head crank 54 may have the shape depicted in FIGS. 7–10, 21 and 23. This shape includes a sold circular section 75 and a head finger 77. This shape allows for mounting the wire 68 in the recess 73 and permitting the wire 68 to rotate about the periphery of the head crank 54.

Figure 7:
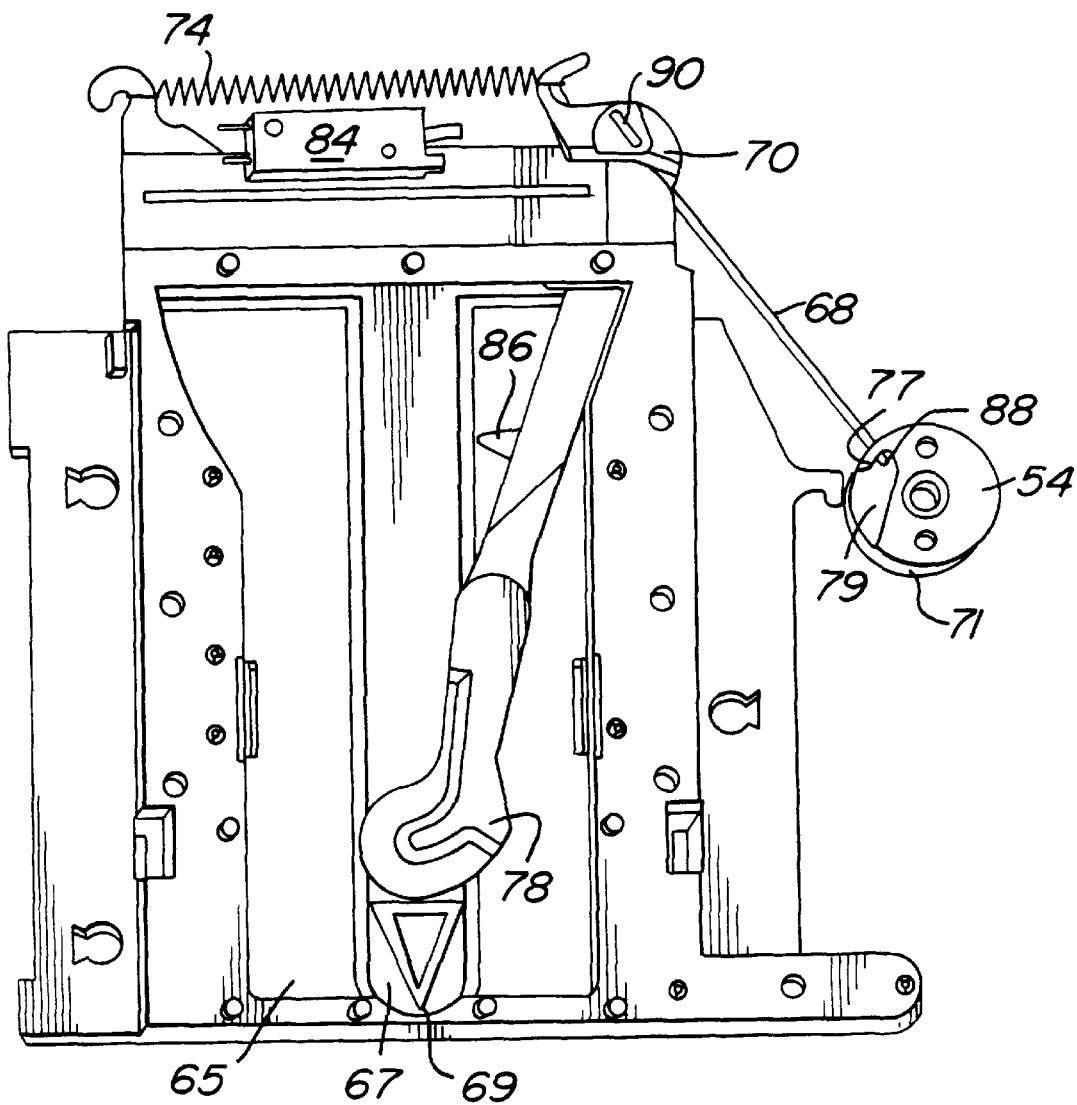
FIG. 7 is an isometric view of a portion of the head retraction system employed in the disk drive of FIG. 1 in a first position.

A wire 68 or similar device is attached to the head crank 54 at the groove 71. More particularly, one of the longitudinal ends of the wire 68 has a hook shaped end 88, as is best seen in FIG. 7. This hook shaped 88 end can be fitted through the circumferential groove 71 and set into the recess 73. Because the other longitudinal end of the wire is connected to the drive link 70, the wire 68 connects the head crank 54 to the drive link 70. As shown in FIGS. 7–10, the wire 68 preferably extends through a cavity 81 in the drive link 70. The wire 68 is affixed to the drive link 70 by a profiled end. In a preferred embodiment, this profiled end 90 approximates the shape of an "s." Other known methods of attachment may be employed.

As is best shown in FIGS. 7–10, the drive link 70 is rotatable mounted to the disk drive 12 between its longitudinal ends. A finger 72 is disposed on one axial end of the drive link 70. Connected to the finger 72 is a head spring 74, which is fixed at its other end to the disk drive 12. Although in a preferred embodiment, the drive link 70 is attached to the head spring 74 with a finger 72, a variety of other attachment means may be employed. Since the head spring 74 is fixed to the disk drive 12, it biases the drive link 70 to rotate in the clockwise direction as viewed in FIGS. 6–10.

The trolley 78 is mechanically connected through any of a variety of known fastening means including, but not limited to, an interference fit, a slide and groove and fasteners, to the drive link 70. In a preferred embodiment, the trolley 78 has a post (not shown) running between its upper and lower surfaces and an opening at its axial end closest to the drive link 70. The longitudinal end of the drive link 70 closest to the trolley 78 also has a means for attaching to the trolley 78. In a preferred embodiment, the means is a circular shaped opening can be press fit around the post of the trolley 78. In addition to being attached to the drive link 70, the trolley 78 is slidably connected to the groove 67 of the retainer 65. In particular, the other axial end of the trolley 78 is generally circular in shape and has a circumferential opening 77 running between the top surface and the bottom surface of the trolley 78. The retainer 65 extends into this opening 77 and the top and the bottom surfaces extend over the retainer 65 so that the trolley 78 is mounted on the groove 67, but is free to translate within the groove 67.

The trolley 78 has freedom of movement in two degrees. In particular, the axial end of the trolley 78 connected to the drive link 70 is free to rotate about the center of the circular section of the other axial end. In addition, the circular shaped axial end is free to translate linearly in the groove 67 of the retainer 65. Thus, the trolley 78 can translate within the groove 67 and rotate about the center of one of its axial ends while translating.

As can be seen in FIGS. 7–10, the drive link 70 and the trolley 78 are mounted so that they can move in an angular relationship with respect to each other. This occurs because the trolley 78 and the drive link 70 are rotatably mounted at one end and are fixed to each other at their respective opposing ends. Upon inspection of FIG. 7, it can be seen that if the carriage assembly traverses the entire length of the groove, the head crank will only rotate about 180.

Through operation of the components described above, the disk drive heads 38 and the carriage assembly 32 can be held in a retracted position in the back of the disk drive 12. In an initial position depicted in FIGS. 6 and 7, the drive link 70 and the head crank 54 are spring biased by the head spring 74. Consequently, the drive link 70 and the trolley 78 are disposed at an angular relationship of about 180°. In this position, the heads 38 are in a retracted position because they are in the back of the disk drive 12.

As alluded to above, in a preferred embodiment the trolley 78 is not fixed to the carriage assembly 32. Rather, they are both free to translate in the groove 67. Additionally, the trolley 78 is preferably mounted forward of the carriage assembly 32. Thus, if the trolley 78 translates towards the back of the disk drive 12 it will push the carriage assembly 32, and forward movement of the trolley 78 will not effect the placement of the carriage 32 in the groove 67. In contrast, backward movement of the carriage assembly 32 will not effect the position of the trolley 78. When a cartridge is inserted into the disk drive 12, the head retraction system 42 is operated as described below to move the trolley 78 to the forward part of the groove so that the carriage assembly 32 is free to translate in the forward direction.

The head retract system 42 may also include a contact 84 disposed forward of the carriage assembly 32, as is depicted in FIGS. 7–10. This contact 84 interacts with a protrusion 86 extending from the drive link 70 to control operation of the head crank 54. In particular, when the drive link 70 is in the position illustrated in FIGS. 9 and 10, the protrusion 86 closes the contacts 84 and thereby causes an electrical signal to be sent to the microprocessor 202 indicating that the drive link 70 has been rotated to its most forward position. Upon receipt of this signal, the microprocessor 202 causes the power from the motor 51 to be removed from the head crank 54.

Figure 8:
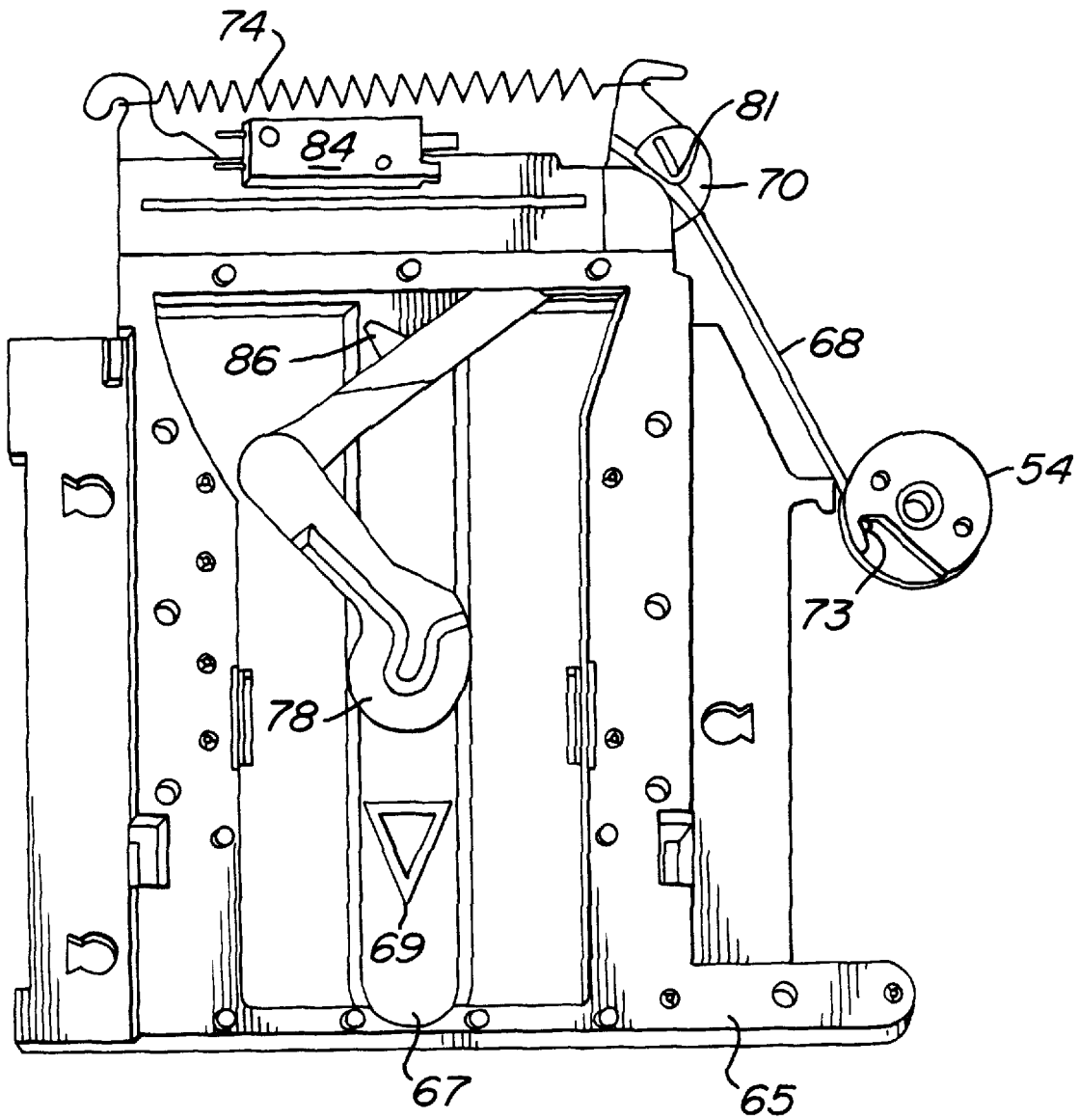
FIG. 8 is an isometric view of the head retraction system of FIG. 7 in a second position.

The heads are moved to a retracted position by a microprocessor 202. In order to hold the heads 38 in a secured position in the back of the disk drive 12 from the position illustrated in FIG. 8, the head crank 54 is rotated by the operating system 46 as described above in response to the depression of the eject button 13. Although FIG. 8, depicts the carriage assembly 32 disposed in a particular location along the groove 67, the carriage assembly 32 and the heads 38 can be moved to a retracted position from any position along the groove 67 and the starting point of FIG. 8 is used for exemplary purposes. As the head crank 54 rotates counter clockwise as viewed in FIGS. 8–10, the wire 68 acts as a cam. In particular, the hook shaped end 88 of the wire 68 rotates along the periphery of the head crank 54, and the profiled shaped end 90 of the wire 68 causes the drive link 70 to rotate in a clockwise direction against the pressure of the head spring 74. While being rotated, the head crank 54 is exerting a torque on the drive link 70 that is greater than the torque exerted by the head spring 54. Rotation of the drive link 70 causes the trolley 78 to translate forward and to rotate in the counter clockwise direction. As the drive link 70 and the trolley 78 rotate, they move into a more acute angular relationship with each other. The position of the head crank 54, the wire 68, the drive link 70 and the trolley 78 as the head crank 54 begins to rotate is shown in FIG. 8.

Each of these components will continue to move in the directions indicated above, until the drive link 70 is about perpendicular to the axis of the groove, as is shown in FIGS. 9 and 10. In this position, the trolley 78 and the drive link 70 are in their most acute angular relationship, and the head spring 74 has been extended and is exerting a torque on the drive link 70 and the trolley 78 against the torque exerted by the head crank 54. In addition, the protrusion 86 extending from the drive link 70 engages the contacts 84. Upon engaging the contacts 84, an electrical signal is sent to the microprocessor 202, which then removes power from the head crank 54.

When power has been removed from the head crank 54, it no longer exerts a torque on the drive link 70 and the trolley 78. Consequently, the torque exerted by the head spring 74 causes the drive link 70 to rotate in a counter clockwise direction. As the drive link 70 rotates, the attached trolley 78 moves rotates in a clockwise direction and moves into a more obtuse angular relationship with the drive link 70. This is shown in FIGS. 6 and 7. As the trolley 78 translates, it moves to the rear of the groove 67. Since power to the head crank 54 has been removed, the rotation of the drive link 70 also causes the head crank 54 to rotate in the clockwise direction as the wire 68 attached to the drive link 70 rotates.

As mentioned above, the heads 38 and the carriage assembly 32 can be moved to the retracted position by the microprocessor 202 and held in a secured position by operation of the head crank 54 and the head spring 74 from any position along the groove 67. In an alternative embodiment, the head retraction system 42, does not employ a contact that is engageable with the drive link 70. This embodiment operates similarly to the preferred embodiment described above. However, when the drive link 70 has been rotated to a position that is about perpendicular to the axis of the groove 67, there are no contacts for the drive link 70 to engage and remove power from the head crank 54 in this embodiment. Rather, the head crank 54 is driven to a stall where it can no longer rotate because the trolley 78 attached to the drive link 70 has been translated to the forward most position of the groove 67. Since in this position the trolley 78 can not translate forward and it is mechanically linked to the head crank 54, the head crank 54 cannot rotate any further. In this stalled position, the microprocessor 202 through either a timer or a sensor or the like will sense the head crank 54 being in a stalled position and remove power to the head crank 54. As with the preferred embodiment described above, when the power is removed from the head crank 54, the drive link 70 and the trolley 78 will move in response to the torque exerted by the head spring 74. As these components move, they again move to the back of the retainer and hold the carriage assembly 32 in the retracted position.

Figure 11:
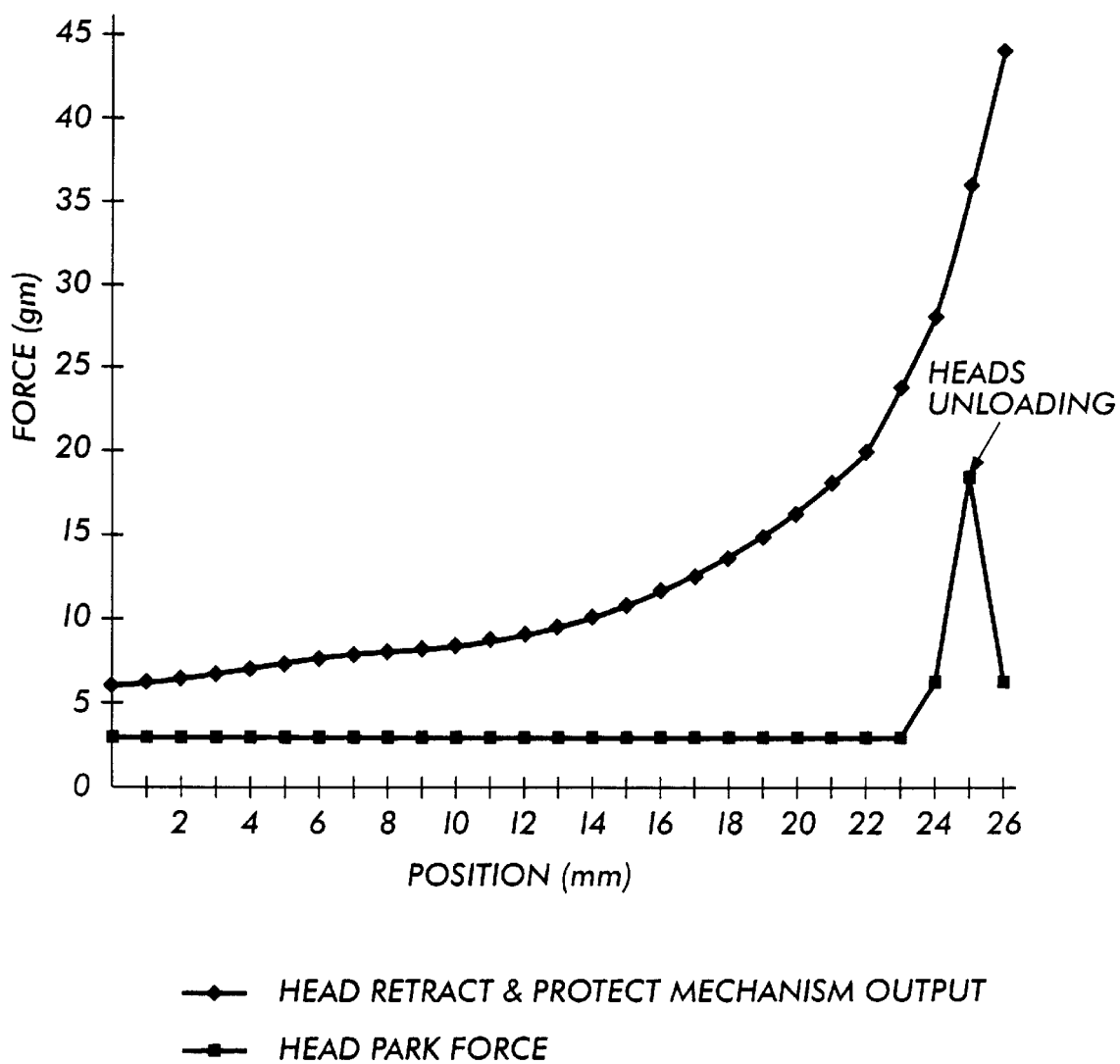
FIG. 11 is a graph depicting the force provided by the head retraction system compared with the force needed to move the heads to a retracted position.
Figure 12:
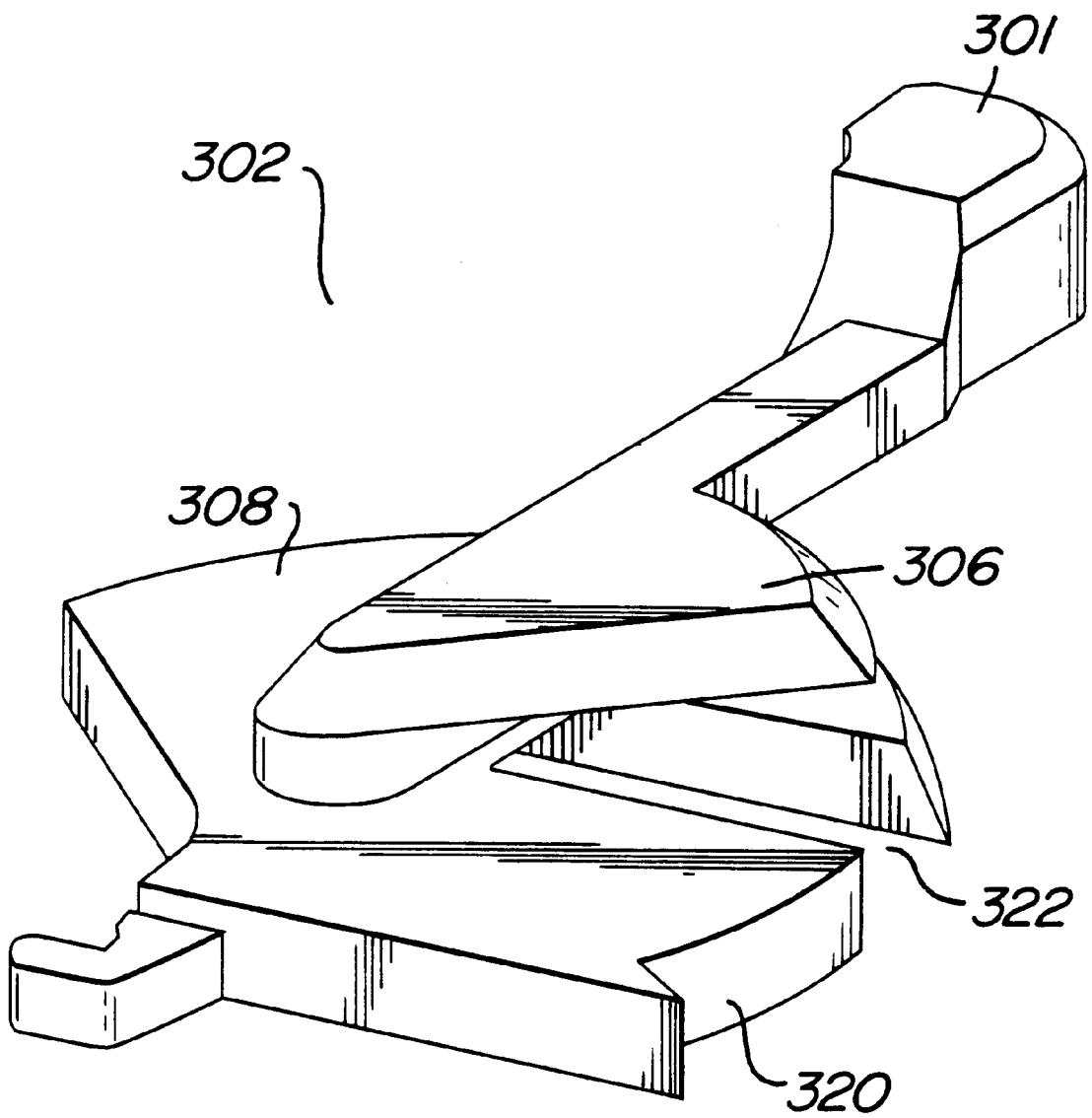
FIG. 12 is an isometric view of an eject lever according to a preferred embodiment of this invention.

The trolley 78 can also drive the carriage assembly 32 to the parked position upon loss of electrical power. If electrical power is lost, the head crank 54 is rotated upon loss of power and the trolley 78 engages the carriage assembly due to spring force from the head spring to drive the assembly to the retracted position. FIG. 11 is a graph depicting the force provided by the trolley 78 and the head retraction system 42 to move the heads to a retracted position as a function of its position along the retainer groove 67 and the force needed to move the heads to a retracted position as a function of their position from the rear of the retainer groove 67. As can be seen, the force provided by the retainer system 42 is always greater than the force needed to move the heads 38 to a retracted position. The force provided by the head retraction system 42 is mainly a function of the force exerted by the head spring 74 on the trolley 78. The force needed to move the heads does not vary much with position with the exception of the force needed to unload the heads 38 from the disk cartridge. In particular, at the 26 mm. position the heads are in a disk cartridge. As the heads are unloaded from the disk cartridge, the frictional force between the heads 38 and the cartridge is at a maximum at about the 25 mm. position and therefore, the force needed to retract the heads 38 is the highest at this point. After the heads 38 have been unloaded, the force needed to retract them quickly drops off and is mainly a function of the frictional force between the carriage assembly 32 and the retainer groove 67.

In summary, an improved head retract system 42 for retracting the heads 38 of a disk drive 12 includes a head crank 54, a drive link 70, a trolley 78, a head spring 74 and a carriage assembly 32. These components operate in conjunction to drive the heads 38 mounted to the carriage assembly 32 to the rear of the disk drive 12 upon removing a disk cartridge 10 from the disk drive 12.

AN IMPROVED EJECTING SYSTEM FOR EJECTING A DISK CARTRIDGE FROM A DISK DRIVE

Illustrated in FIGS. 12–20 is a preferred embodiment of an eject system 44 of this invention. According to this preferred embodiment, an improved eject system 44 includes an eject lever 302, an eject crank 56, an eject spring 303, a drag link 304 and a drag spring 305. This system operates in conjunction with the motor 51 and the gear train 52 of the operating system 46 to eject a disk cartridge 10 from a disk drive 12.

The eject crank 56 illustrated in FIGS. 19 and 20 has an eject finger 55 for interacted with the drag link 304 described below. The function of the eject crank 56 is to rotate in response to the operating system 56 and interact with other components of the eject system 44 to eject a disk cartridge 10 from the disk drive 12. The eject crank 56 also includes an eject gear 57 mounted about a central axis and a cylindrical member 59 mounted about the same axis.

Figure 13:
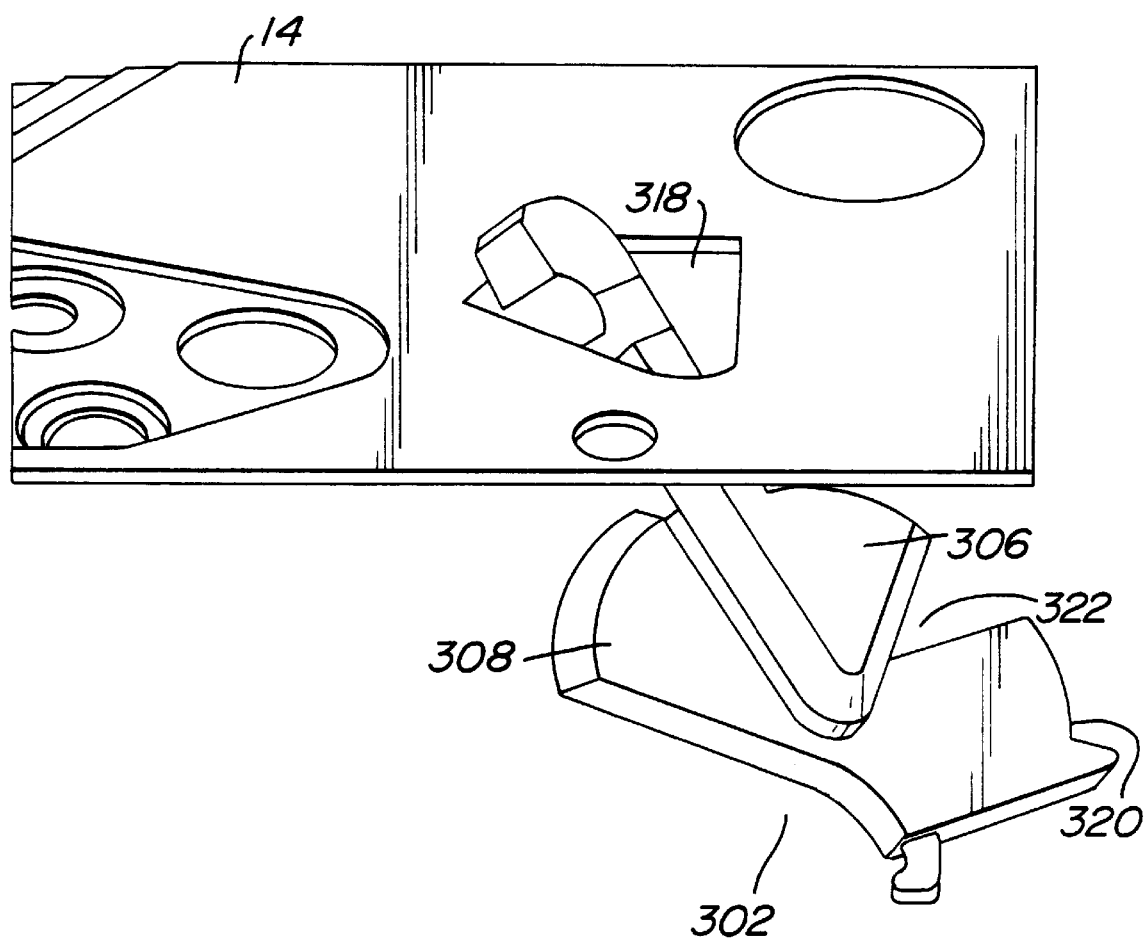
FIG. 13 is an isometric view of the eject lever of FIG. 12 being installed into the disk drive of FIG. 1.

As illustrated in FIGS. 12, 13 and 16–18, the eject lever 302 in a preferred embodiment of this invention may be an integral piece. In a preferred embodiment, the eject lever 302 is rotatably mounted to the bottom of the chassis 14. The eject lever 302 may have an arm 301 for engaging a disk cartridge 10 upon insertion of and removal of the disk cartridge 10. In this embodiment, the eject lever 302 may also have an upper and a lower portion. The upper portion extends through an aperture 318 in the chassis 14. FIG. 13 displays the upper portion of the eject lever 302 extending through the aperture 318. In comparison, the lower portion 316 remains below the aperture 318. After insertion through the aperture 318, the eject lever 302 rests in the chassis 14 as illustrated in FIGS. 1, 3, 6, 14 and 15.

In this embodiment, the eject lever 302 has a first sealing flange 306 and a second sealing flange 308. The first sealing flange 306 is preferably disposed on the upper portion, while the second sealing flange 308 is preferably disposed on the lower portion. As is explained in further detail below, the first and the second sealing flanges 306, 308 operate in conjunction with the chassis 14 of the disk drive 12 to seal the top of the disk drive 12 from the bottom of the disk drive 12.

As is illustrated in FIGS. 13 and 16–18, the lower portion of the eject lever 302 also includes a tab 320 and a slot 322. The tab 320 and the slot 322 operate in conjunction with the drag link 304 to eject a disk cartridge 10 from a disk drive 12.

As pictured in FIGS. 3 and 6, the eject spring 303 is preferably connected at one end to the chassis 14 and at its other end to an eject finger 312 disposed on the periphery of the eject lever 302. The eject spring 303 biases the eject lever 302 to rotate in a counter clockwise direction as viewed in FIGS. 14–18.

The drag link 304 is preferably slidably mounted on the chassis 14, as is shown in FIGS. 3 and 6. In a preferred embodiment, the drag link 304 has a plurality of channels 325 that slide in the motor stops 326 mounted on the bottom of the chassis. These motor stops 326 are preferably rigidly mounted to the chassis 14. When the drag link 304 is actuated, it slides axially along the chassis 14. More particularly, the channels 325 slide along the motor stops 326 as the drag link 304 translates.

Attached to the drag link 304 is a drag spring 305, as is depicted in FIGS. 3 and 6. The drag spring 305 is also attached to the chassis 14 to spring bias the drag link 304 to translate toward the front of the disk drive. When activated by the drag spring 305, the drag link 304 slides along the motor stops 326.

Extending from the drag link 304 is an arm 307. In a preferred embodiment, the arm 307 is approximately perpendicular to the main body of the drag link. The arm 307 is engageable and disengageable with the eject crank 56. In particular, the finger 55 of the eject crank 56 rotates in response to the operating system 46 described above. When rotated in a counter clockwise direction as viewed in FIGS. 3 and 6, this finger 55 can engage the arm 307 to drive the arm 307 towards the back of the disk drive 12. Because the drag link 304 is connected to the arm 307, the entire drag link 304 will translate toward the back of the disk drive 12 when driven by the finger 55 of the eject crank 54.

Figure 16:
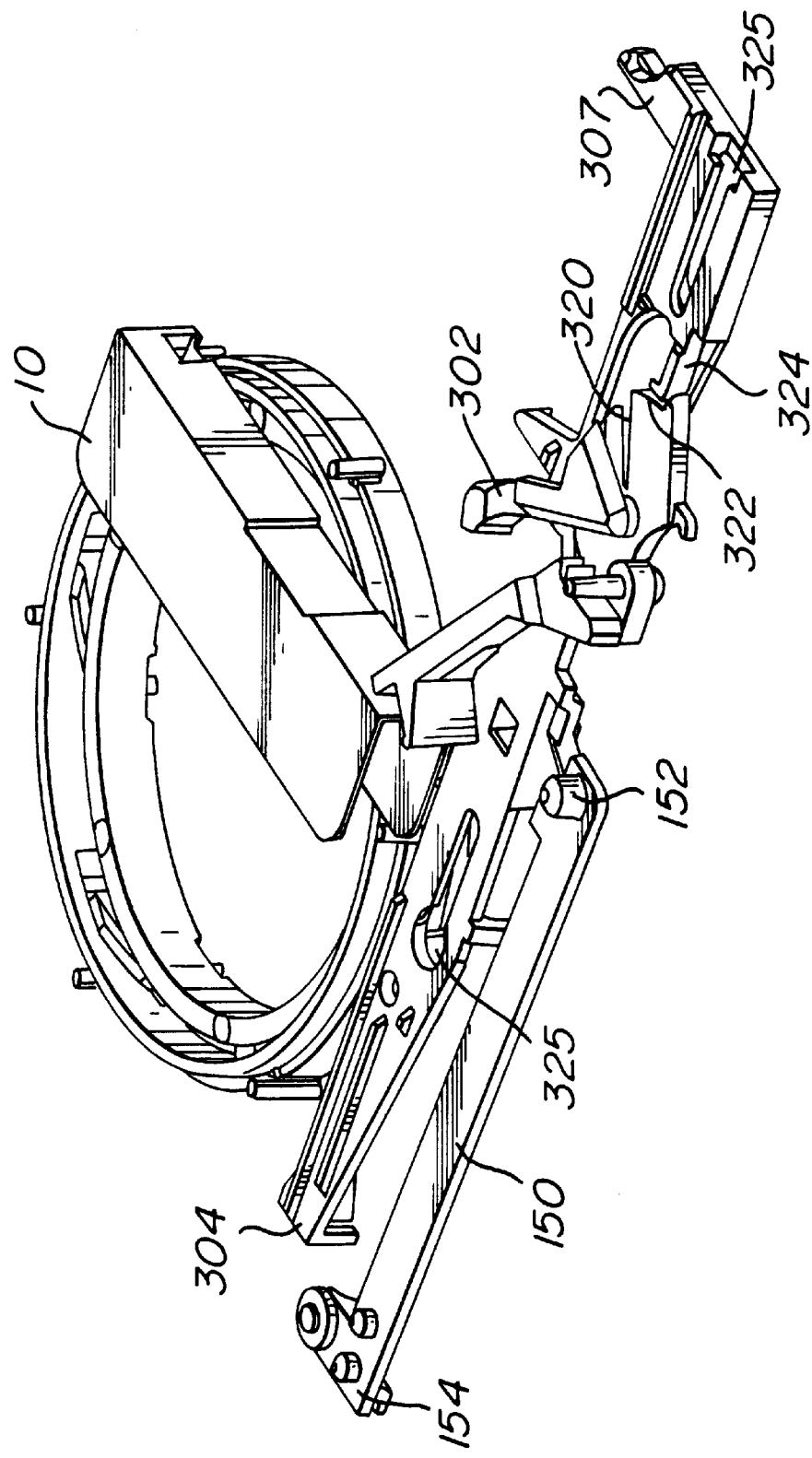
FIG. 16 is an isometric view of a portion of the eject system of the disk drive of FIG. 1 in a first position.
Figure 17:
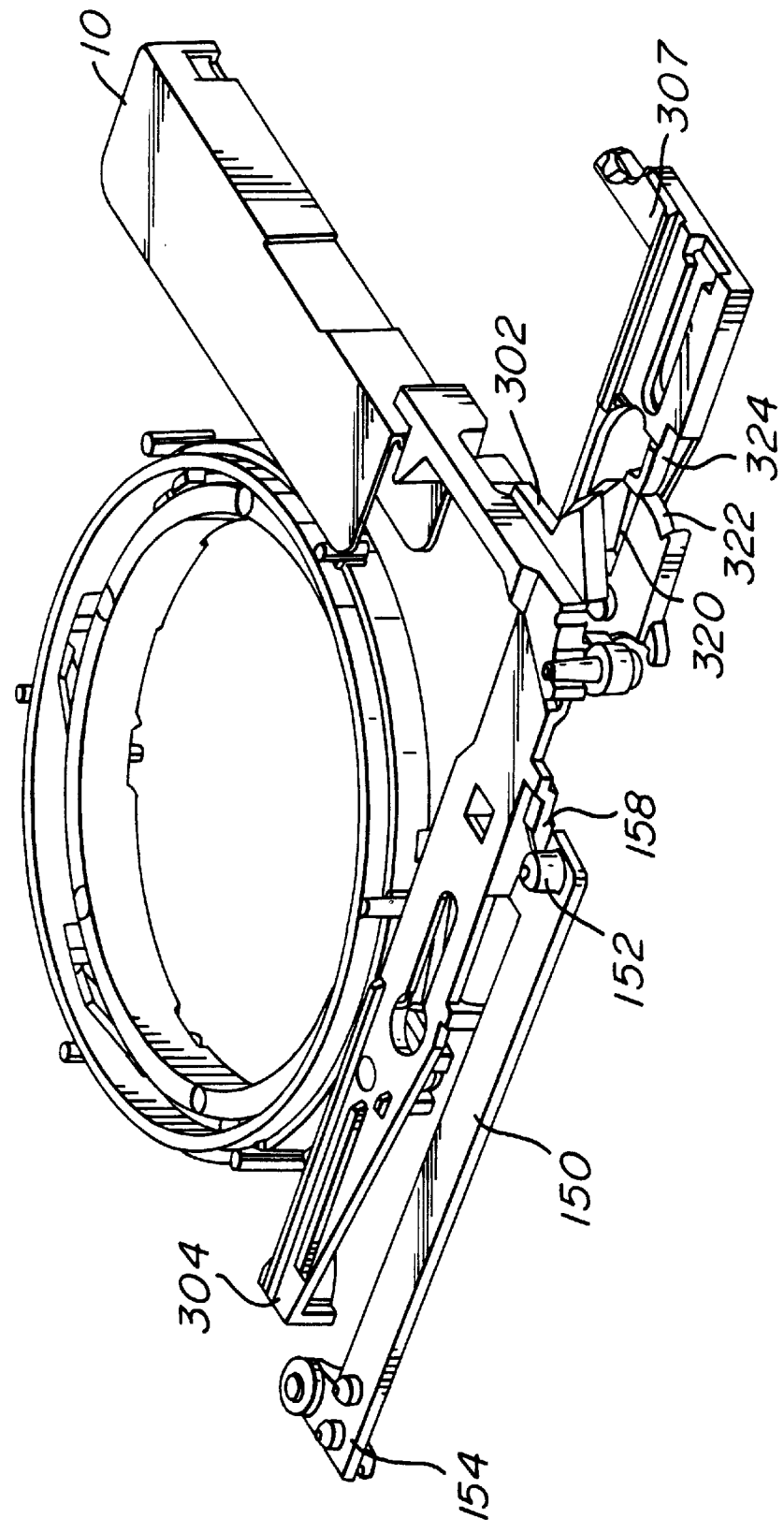
FIG. 17 is an isometric view of the eject system of FIG. 16 in a second position.
Figure 18:
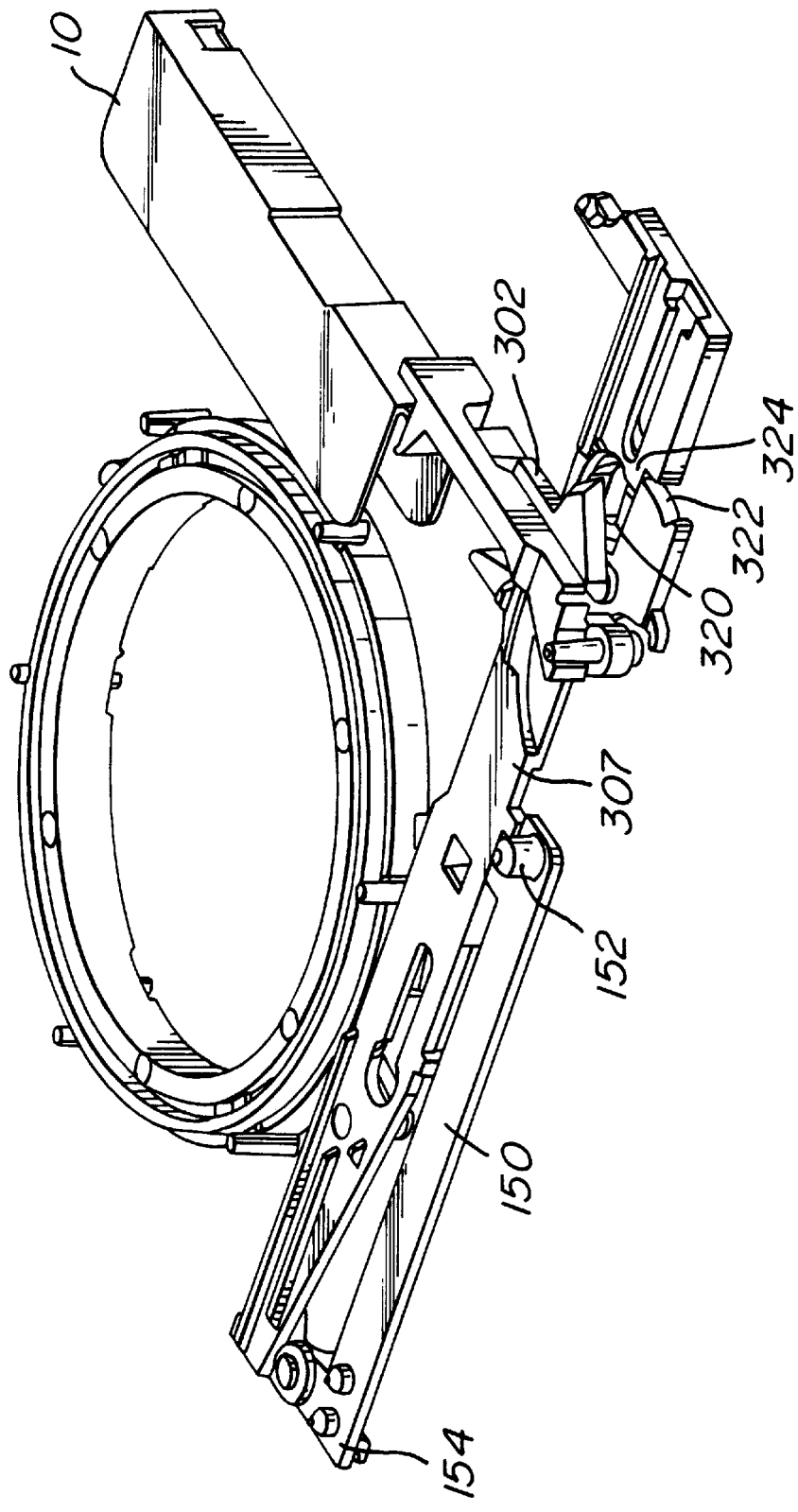
FIG. 18 is an isometric view of the eject system of FIG. 16 in a third position.

As mentioned above, the eject lever 302 has a slot 320 and a tab 322 disposed on its lower portion. This slot 320 and tab 322 are adaptable to mate with the drag link 304. More particularly, the drag link 304 has a tongue 324 that is engageable with the slot 320 and tab 322, as is best seen in FIGS. 16–18. When the eject lever 302 is in its spring biased position as depicted in FIG. 16, (with a disk cartridge removed from the disk drive) the tongue 324 of the drag link 304 rests against the tab 322. The drag spring 305 is biasing the drag link 304 to translate toward the front of the disk drive 12, but because the tongue 324 is resting against the tab 322, the drag link 304 cannot translate. Thus, with a disk cartridge 12 removed, the drag link 304 is held in the back of the disk drive 12 by the eject lever 302 against the pressure of the drag spring 305.

Figure 14:
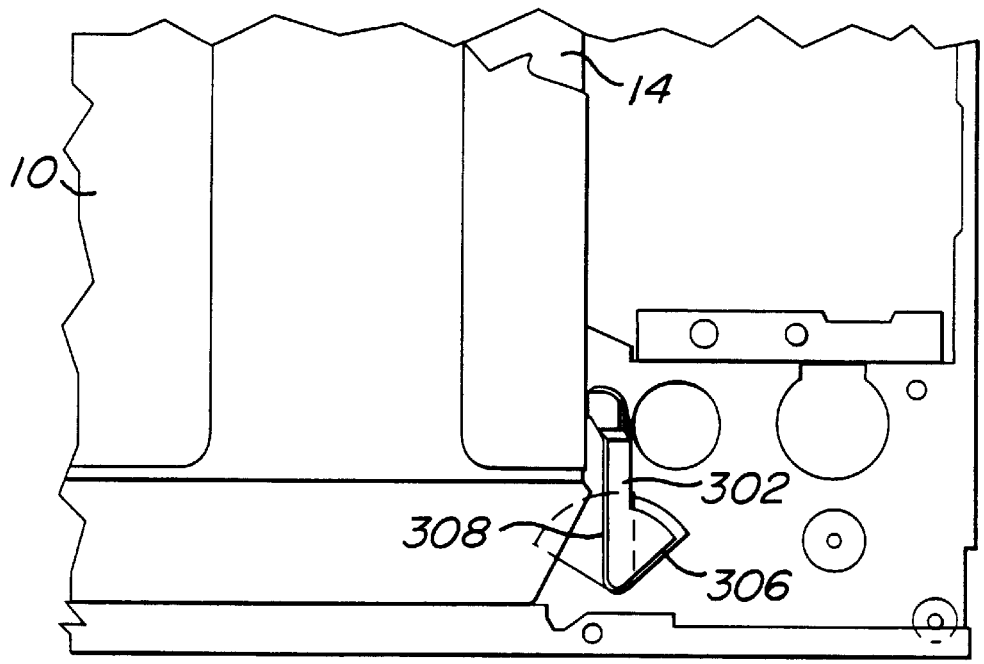
FIG. 14 is a cross-sectional view of a portion of the disk drive of FIG. 1 with a disk cartridge installed in the disk drive.

Upon inserting a disk cartridge 10 into the disk drive 12, as shown in FIG. 16, the disk cartridge 10 engages the eject lever 302. When engaged with the eject lever 302, the disk cartridge 10 rotates the eject lever 302 in a clockwise direction about its axis, as illustrated in FIG. 17. (FIGS. 16–18 depict only a portion of a disk cartridge 10 in order to enhance the description of the eject system 44). As the eject lever 302 is rotated, it rotates against the pressure of the eject spring 303. Eventually, the tongue 324 of the drag link 304 no longer rests against the tab 322, and it becomes aligned with the slot 320 of the eject lever 302, as depicted in FIG. 17. When aligned, the drag link 304 translates toward the front of the disk drive 12 due to the tension exerted by the drag spring 305. As the drag link 304 translates, the tongue 324 is inserted into the slot 320, as shown in FIG. 18. Further movement of the drag link 304 is prevented when the tongue 324 is fully inserted into the slot 320. Additionally, the eject lever 302 is prevented from rotating further in the clockwise direction because of the engagement of the slot 320 and the tongue 324. Thus, with a disk cartridge 10 loaded into the drive 12, as depicted in FIGS. 14 and 18, the drag link 304 has translated towards the front of the drive 12 and the eject lever 302 has been rotated against spring pressure. In its rotated position shown in FIGS. 3 and 6, the drag link 304 holds the eject lever 302 against the torque exerted by the eject spring 303.

Figure 15:
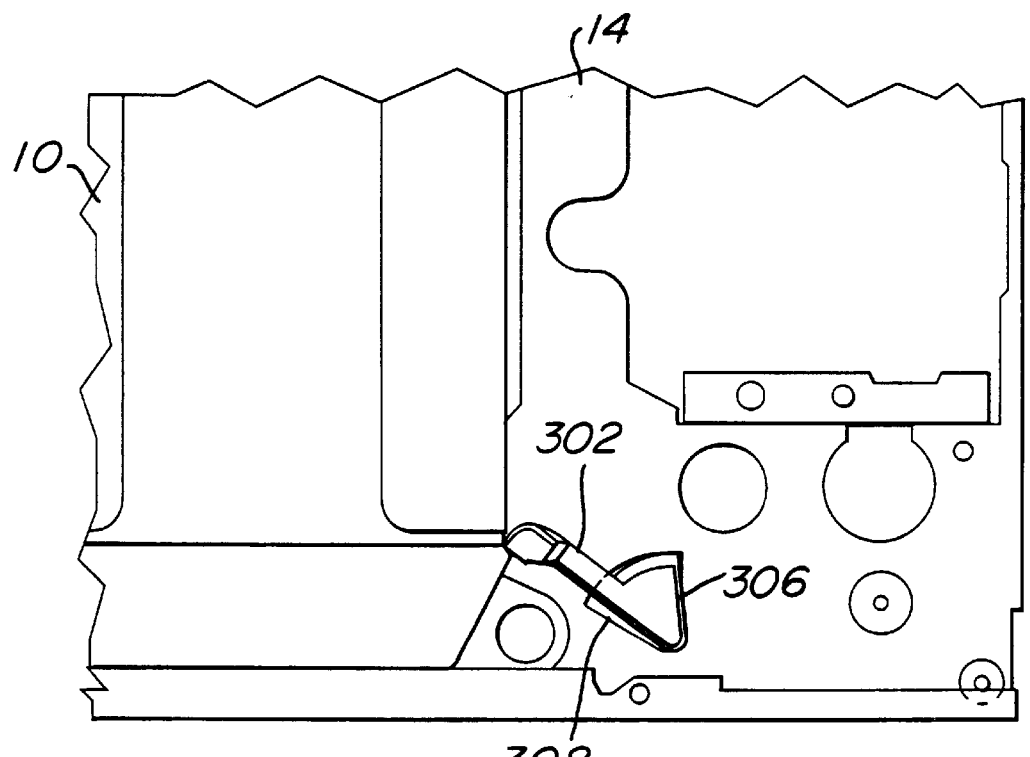
FIG. 15 is a cross-sectional view of a portion of the disk drive of FIG. 1 with a disk cartridge being ejected from the disk drive.

After a disk cartridge 10 has been inserted into the disk drive 12, the relative positions of the eject lever 302, the drag link 304 and the eject crank 56 are illustrated in FIGS. 3 and 18. In order to eject a loaded disk cartridge 12 from the disk drive 10, an eject button 13 disposed on the disk drive 12 is depressed. Activation of the eject button 13 will cause as is discussed in detail below, the microprocessor to power the operating system 46. When the operating system 46 is powered as described above, it causes the eject crank 56 to rotate in a counter clockwise direction as viewed in FIG. 3. Upon rotating, the finger 55 of the eject crank 54 contacts the arm 307 of the drag link 304 and pushes the arm 307 as it rotates against the pressure of the drag spring 305. As the eject finger 55 rotates and the arm 307 is pushed, the drag link 304 moves towards the back of the disk drive 12. When the drag link 304 translates, the tongue 324 of the drag link 304 disengages from the slot 320 of the eject lever 302. Upon disengagement from the drag link 304, the eject lever 302 is free to rotate, and the eject spring 303 biases the eject lever 302 to rotate in a counter clockwise direction, as viewed in FIGS. 16 and 18. When the eject lever 302 rotates, it ejects a disk cartridge 10 from the disk drive 12, as depicted in FIGS. 15 and 16. After the eject lever 302 rotates, the tab 322 of the eject lever 302 contacts the tongue 324 of the drag link 304 to hold the drag link 304 in its spring loaded position.

It is important to keep dust, dirt and other contaminants from being transported from the top of the chassis 14 to the bottom of the chassis 14. Potentially, this can occur through openings in the chassis such as the aperture 318. In order to prevent this, the eject lever 302 has the two sealing flanges 306, 308 as described above. As can be seen in FIG. 15, when the eject lever 302 is in the unloaded position, that is when a disk cartridge 10 has not been loaded into a disk drive 12, the first sealing flange 306 covers the majority of the aperture 318. This prevents any dusk or contaminants from being transported through the aperture 318.

When the eject lever 302 has been rotated to the loaded position, that is when the disk cartridge 10 is fully inserted into the disk drive 12, the first sealing flange 306 rotates clockwise and no longer covers the majority of the aperture 318. However, as the eject lever 302 rotates, the second sealing flange 308 prevents dusk or contaminants from traveling through the aperture 318 as it covers the bottom of the aperture 318 shown in FIG. 14.

One advantage, although certainly not the only advantage of the eject lever 302 of this invention is that it allows the transfer of a relatively large torque from the top surface of the chassis 14 to the bottom of the chassis. For instance, the eject lever 302 is a single integral piece and it transfers the torque generated by its rotation to the drag link 304. Having one integral piece to transfer the torque from above the chassis 14 to below the chassis 14 is advantageous because a single piece can efficiently transfer a relatively high torque between surfaces of the chassis. Moreover, a single integral may be simpler to assemble than a multiple piece apparatus. Although in a preferred embodiment the eject lever 302 is a single integral piece, it may include multiple pieces which are disposed above and below the chassis 14.

As shown in FIGS. 2, 3, 6 and 16–18 the ejecting system 42 may employ a cartridge retainer 150 that has a projection 152 extending from an end of the retainer 150. The cartridge retainer 150 is pivotally mounted at an axial end 154 and free at the other axial end having the projection 152. The cartridge retainer 150 is preferably flexible so that it can pivot up and down about its axial end 154. As the cartridge retainer 150 pivots, the projection 152 can be inserted through an aperture 156 in the chassis 14. As depicted in FIG. 5, the cartridge 10 may have a hole 158 into which the projection 152 can be inserted. When inserted into the hole 158, the projection 152 holds the disk cartridge 10 in the disk drive 12.

The drag spring 305 is connected to the cartridge retainer 150, and it spring biases the cartridge retainer 150 to a position where the projection 152 does not extend through the aperture 156. The cartridge retainer also has two channel surfaces 162 that extend perpendicular from the retainer 152 to form a channel. These channel surfaces 162 interact with a riding surface 160 extending from the drag link 304. This riding surface 160 is preferably ramped as seen in FIGS. 16 and 17. When the drag link 304 translates as described above, it rides in between the channel surfaces 162 to push the cartridge retainer towards the chassis 14 and cause the projection 152 to extend through the aperture 156 and into the hole in the cartridge to hold a loaded a cartridge firmly in place.

In particular, before a cartridge is inserted the cartridge retainer 150 is in the position shown in FIGS. 2 and 16. In this position the projection 152 does not extend through the aperture 156. As the drag link 304 translates as described above, the riding surface 160 rides between the channel surfaces 162 and due to its ramped surface pushes the cartridge retainer 150 towards the chassis 14. As it pushes on the cartridge retainer 150, the projection is inserted though the aperture 156 and into the hole in the disk cartridge 10. This position is illustrated in FIGS. 3 (with the drag spring 305 removed) and 17.

When a disk cartridge is to be ejected, the drag link 304 is operated as described above. As the drag link 304 translates to the rear of the disk drive 12, the riding surface 160 exits the channel formed by the channel surfaces 162. With the riding surface 160 out of this channel, drag spring 305 pulls the cartridge retainer 150 and the projection 152 out of the hole of the disk cartridge and the aperture in the chassis 14 to the position shown in FIGS. 2 and 16.

MOTOR LOADING SYSTEM FOR A DISK DRIVE

The disk drive 12 of this invention may also have a motor loading system 45 that includes an inner motor ring 401 disposed on a disk drive motor 400 and an outer motor ring 404 disposed on the chassis 14. The primary function of these rings are to engage the disk drive motor 400 with a disk cartridge 10 when loaded into the disk drive 12, and to disengage the disk drive motor 400 from a disk cartridge 10 so that the cartridge 10 can be ejected from the disk drive 12.

This disk drive motor 400 may be a spindle motor that interacts with the hub 16 of a disk cartridge depicted in FIG. 5. This motor 400 may be circular in shape, as shown in FIG. 1 to facilitate engagement with the hub 16. The disk drive motor 400 is preferably mounted on a rotatable shaft 409. In a preferred embodiment, the disk drive motor 400 is attached to the shaft 409 with an interference fit, but other known methods of attachment may be used. A bushing 420 may be placed on the shaft above the motor 400 for engaging the hub 16 of a disk cartridge 10. Washers 422 may be disposed on the shaft above and below the motor 400 to retain the motor 400 on the shaft 409. These washers 422 may also be attached to the shaft 409 with an interference fit. A cover plate 424 may be affixed to the lower portion of the disk drive motor 400, as shown in FIGS. 2, 6 and 36–39.

In a preferred embodiment, the disk drive motor 400 has an inner motor ring 401 with threads 402 running around the circumference. This inner motor ring 401 is preferably constructed from plastic or another suitable material. The inner motor ring 401 may be connected to the cover plate 424 with heat stakes 426 as shown in FIGS. 2, 6 and 36–39. Alternatively, fasteners, adhesives or a variety of other fastening techniques may be employed.

The threads 402 of the inner motor ring 401 are adaptable to mate with a threaded outer motor ring 404 disposed in a cavity 406 in the chassis 14. The outer motor ring 404 is also preferably constructed from plastic or another suitable material. The outer motor ring 404 may have a plurality of detents 408 extending radially from an outer surface. These detents 408 can be mated with an interference fit to a plurality of indentations 410 in the chassis 14. Other known methods of fastening may be employed.

Extending from the inner motor ring 401 may be a slotted member 412. In the preferred embodiment shown in FIGS. 2, 3 and 34–39, the slotted member 412 extends approximately parallel to the chassis 14. The slot member 412 functions to interact with a drag link post 414 extending from the drag link 304 to load and unload the disk drive motor 400. The slotted member 412 may be molded to the inner motor ring 401 or attached with other known fastening methods.

Affixed to the outer motor ring 404 is a motor snap 416. In the preferred embodiment shown in FIGS. 2, 3, 6 and 34–39, the motor snap 416 is a cantilever beam that functions as a spring when inserting the disk drive motor 400. When a disk drive motor 400 is inserted, the motor snap 416 functions to prevent rotation of the disk drive motor clockwise as viewed in FIGS. 2, 3, and 34–39. This prevents the disk drive motor 400 form becoming disconnected from the chassis 14 in the event the disk drive motor 400 is forced to rotate in the clockwise direction. Because the motor snap 416 prevents the disk drive motor 400 from becoming dislodged from the chassis 14, it permits the disk drive motor 400 to remain assembled to the chassis 11 as it moves between an unloaded and a loaded position. Without the motor snap 416, either a more complex attachment mechanism requiring a relatively more complex assembling process would be required or the disk drive motor 400 would not have a means for preventing it from becoming dislodged.

FIGS. 34–39 depict the motor assembling sequence. By way of overview, during the assembling sequence the disk drive motor 400 is inserted into and connected to the disk drive 12 where it rests in an unloaded position. In the unloaded position, the disk drive motor 400 is not coupled to a disk cartridge 10. When a disk cartridge 10 is inserted into the disk drive 12, the disk drive motor 400 can then be moved to its loaded position. In the loaded position, the disk drive motor 400 engages the disk cartridge 10 to rotate its storage medium. When the disk cartridge 10 is ejected from the disk drive 12, the disk drive motor 400 is moved back to its unloaded position.

Figure 36:
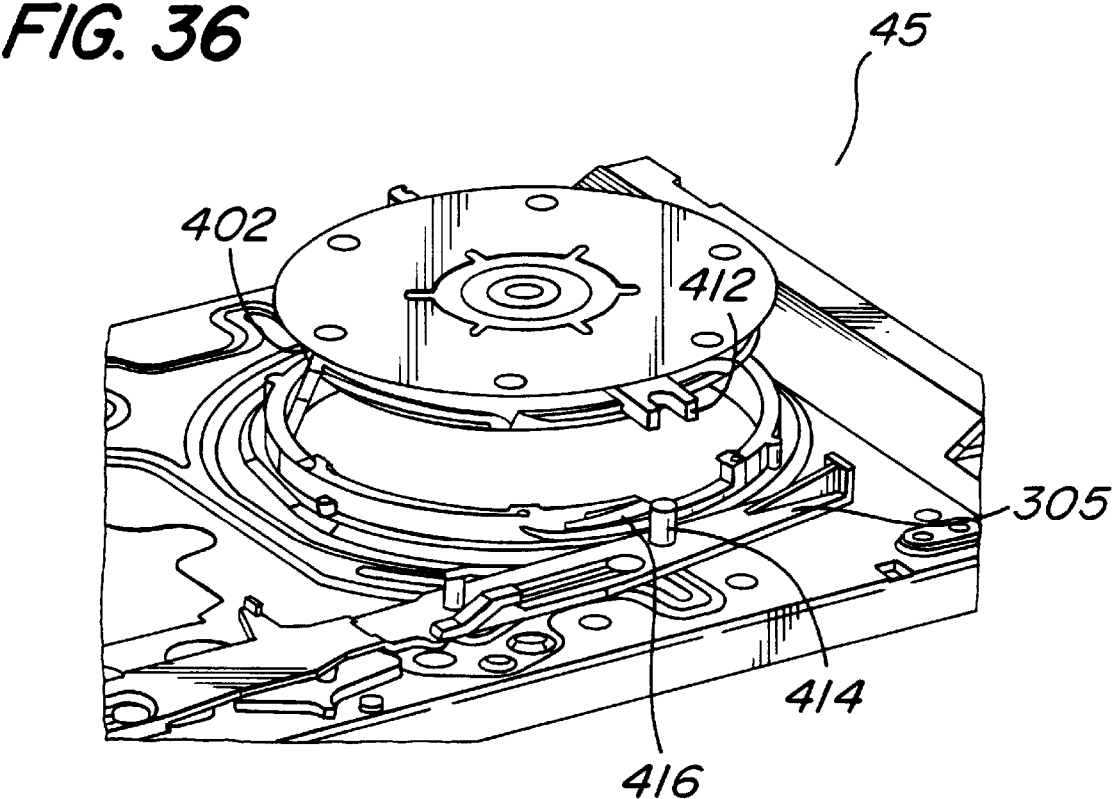
FIG. 36 is an isometric view of a portion of the motor loading system of FIG. 1 in a third position.
Figure 37:
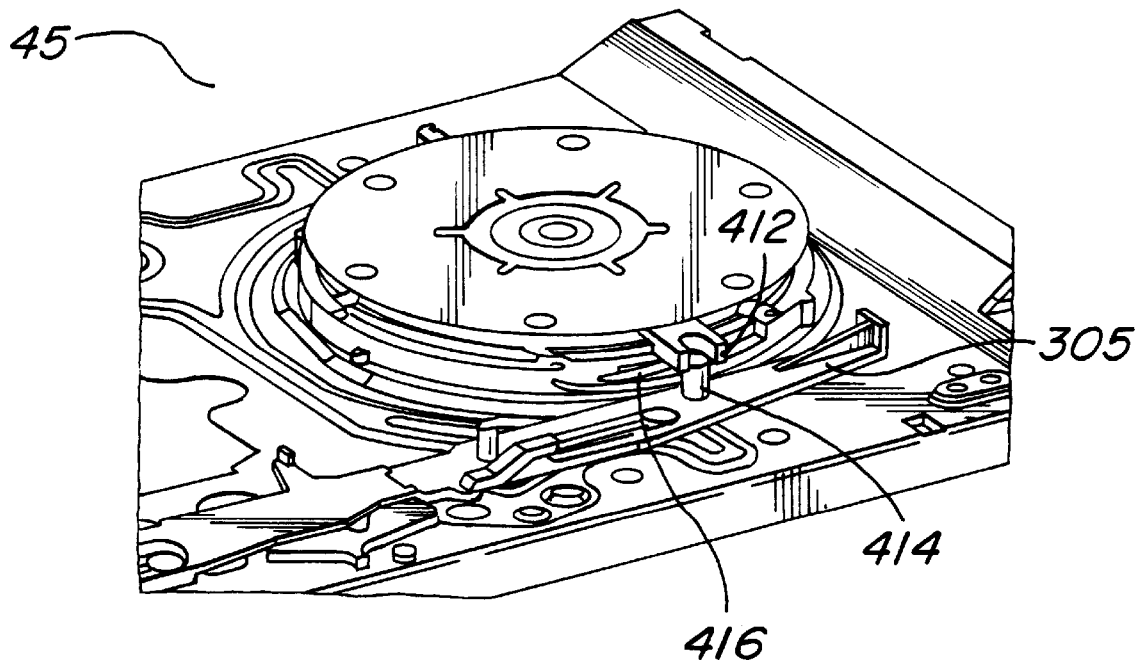
FIG. 37 is an isometric view of a portion of the motor loading system of FIG. 1 in a fourth position.

FIG. 36 illustrates the disk drive motor 400 being inserted into the disk drive 12. As the disk drive motor 400 is inserted, the threads of the inner motor ring 401 are engaged to the threads disposed on the outer motor ring 404, as shown in FIG. 37. Additionally, the slotted member 412 is fit over the drag link post 414 and over the motor snap 416. Upon engaging the motor snap 416, the slotted member 412 deflects the motor snap 416 towards the chassis 14.

Figure 38:
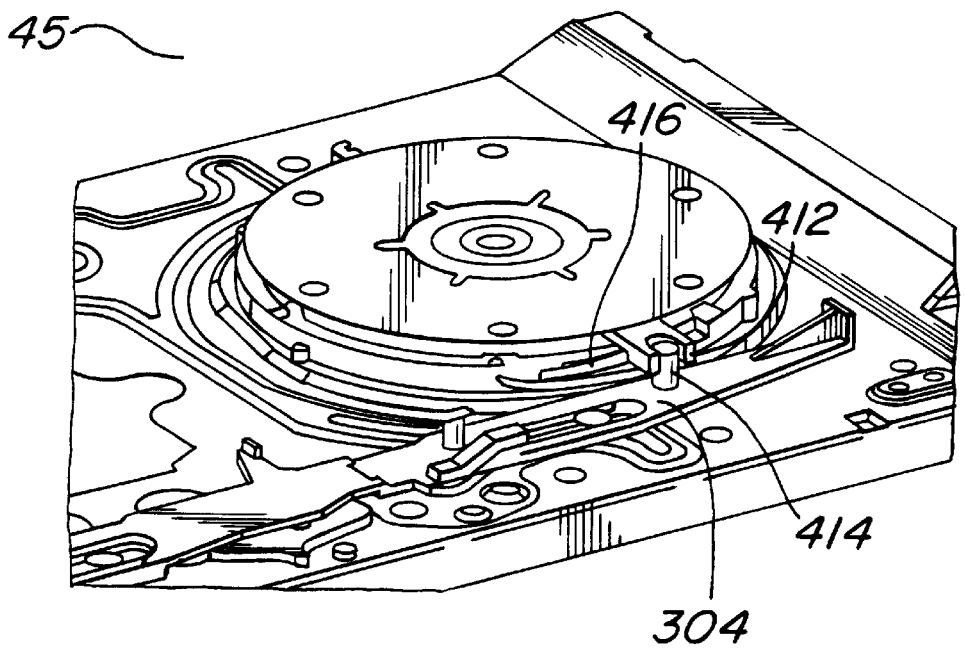
FIG. 38 is an isometric view of a portion of the motor loading system of FIG. 1 in the position of FIG. 34.

As shown in FIG. 38, the disk drive motor 400 is then rotated counter clockwise to mate the threads of the inner motor ring 401 with the threads of the outer motor ring 404. As the rings are mated, the disk drive motor 400 moves towards the top of the disk drive 12. During rotation of the disk drive motor 400, the slotted member 412 pulls the drag link 304 because of its engagement with the drag link post 414. The motor snap 416 becomes uncovered by the slotted member 412 as the disk drive motor 400 is rotated, as shown in FIG. 38. When uncovered, the motor snap 416 springs from its deflected position to its undeflected position. In its undeflected position, the motor snap 416 rests near the slotted member 412. Since the motor snap 416 is affixed to the outer motor ring 401, it cannot rotate. Thus, the slotted member 412 cannot rotate in the counter clockwise direction past the motor snap 416 as viewed in FIGS. 36–39 because it will engage the fixed motor snap 416. Furthermore, since the inner motor ring 401 is attached to the slotted member 412 it cannot rotate in this direction either.

Figure 34:
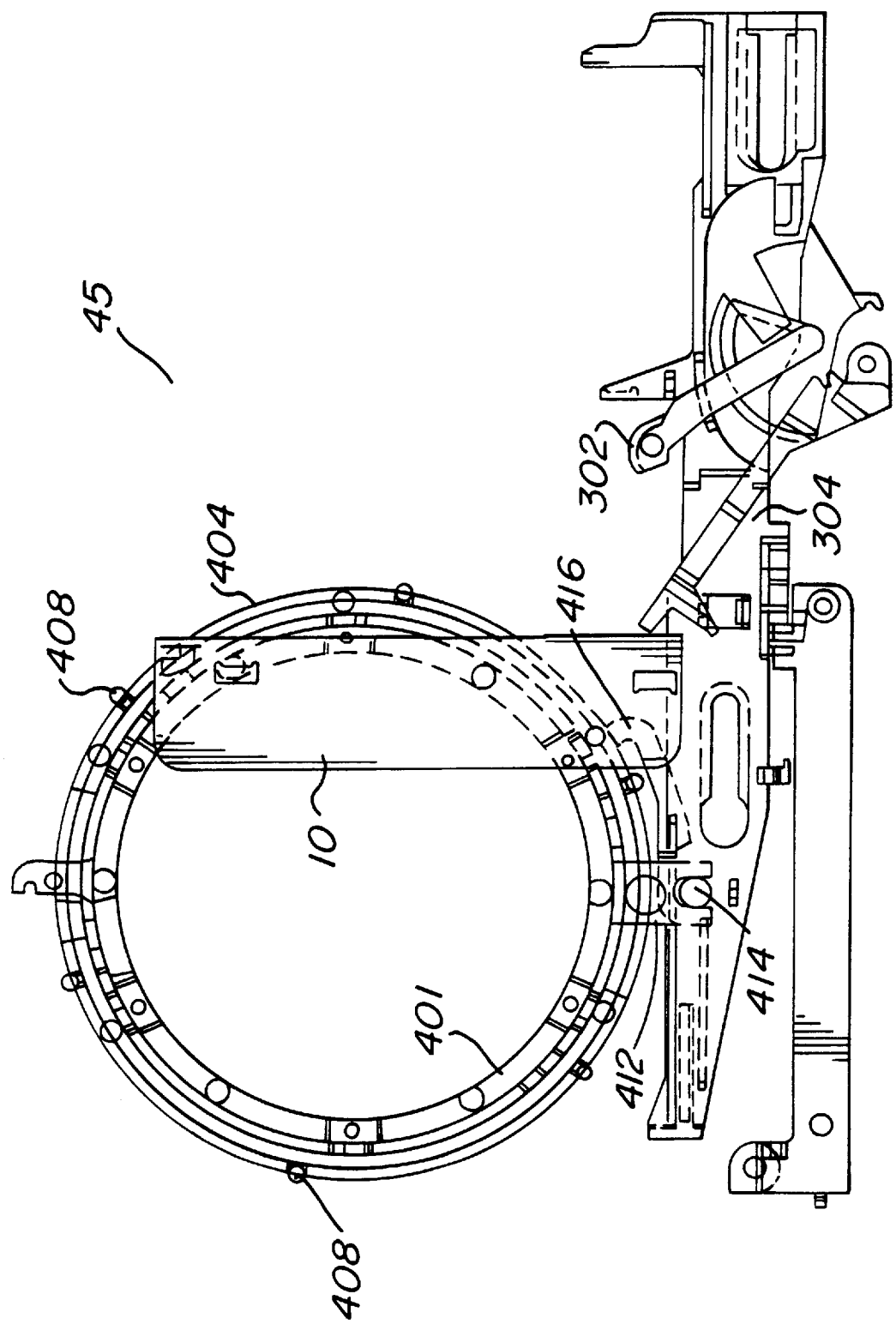
FIG. 34 is a diagrammatical view of a portion of a motor loading system according to a preferred embodiment of this invention in a first position.
Figure 35:
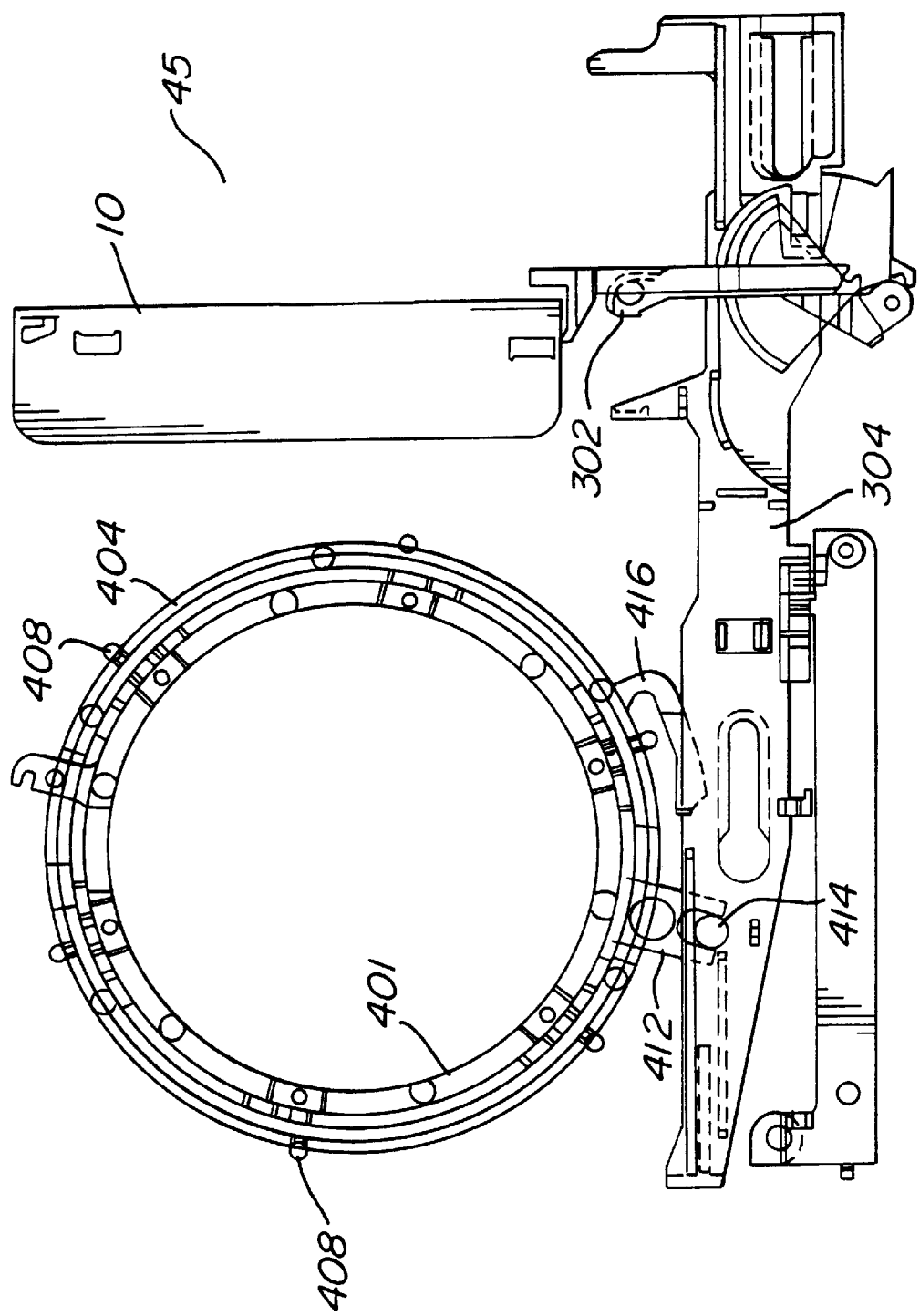
FIG. 35 is a diagrammatical view of the portion of the motor loading system of FIG. 34 in a second position.

After insertion, the disk drive motor 400 is not in a position to engage a loaded disk cartridge. This position is referred to as the unloaded position. The unloaded position of the inner motor ring 401, the outer motor ring 404, the slotted member 412 and the motor snap 416 are depicted in FIG. 34. The threads of the disk drive motor 400 can be rotated further in the clockwise direction as viewed in FIG. 34 to move the disk drive motor 400 to a loaded position where it can engage a loaded disk cartridge.

Figure 39:
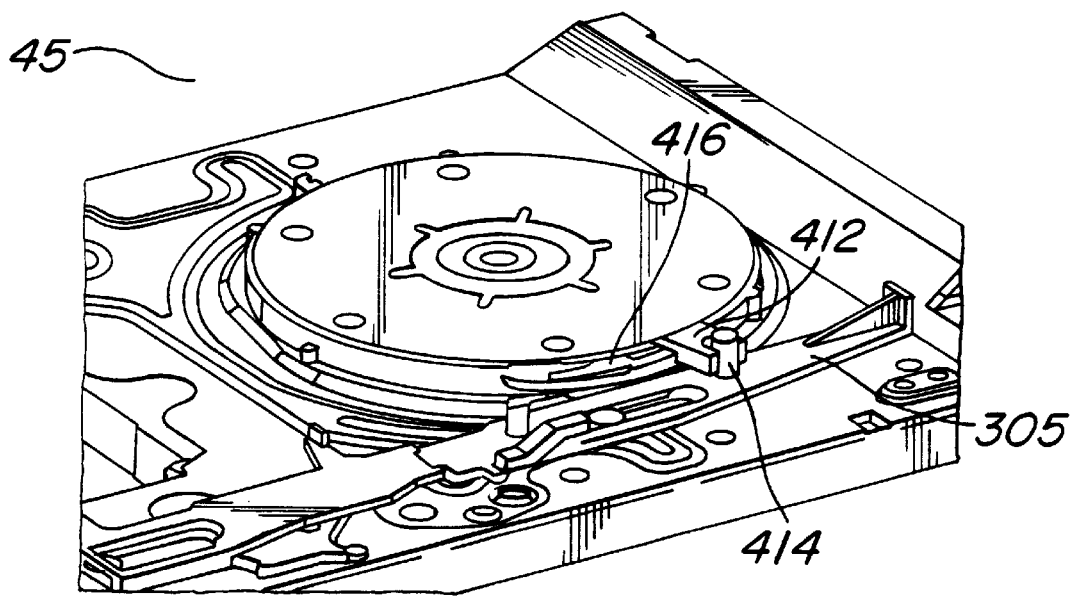
FIG. 39 is an isometric view of a portion of the motor loading system of FIG. 1 in the position of FIG. 35.

The disk drive motor 400 can be moved from the unloaded position to the loaded position as follows. As discussed in detail above, when a disk cartridge 10 is inserted into a disk drive 12, the drag link 304 translates towards the front of the disk drive 12 in response to rotation of the eject lever 302. As the drag link 304 translates, the drag link post 414 pushes the slotted member 412 and drive the inner motor ring 401 to rotate in a clockwise direction, as depicted in FIGS. 39 and a counter clockwise direction as viewed in FIGS. 34 and 35. Upon rotating with the inner motor ring 401, the disk drive motor 400 is driven towards the top of the disk drive 12 into its loaded position where it enters the opening 21 of the disk cartridge 10 and engages the hub 16 of the disk cartridge 10. In this position the disk drive motor 400 can rotate the hub 16 to operate the disk cartridge 10 for storage and retrieval of information.

In order to unload the disk drive motor 400, the operating system 46 described above operates in conjunction with the eject system 44 to translate the drag link 304. As the drag link 304 translates, the drag link post 414 interfaces with the slotted member 412 to drive the disk drive motor 400 to rotate about the outer ring 404 in a clockwise direction as viewed in FIG. 39. As the disk drive motor 400 rotates it moves to the unloaded position, shown in FIGS. 34 and 38 and disengages from the opening 21 and the hub 16 of the disk cartridge 10.

If the disk drive 12 is subject to a dynamic force, such as mechanical shock, the disk drive motor 400 has the potential to rotate and become dislodged from the chassis 14. This could happen if the disk drive motor 400 rotates past the point where the threads of the inner motor ring are mated with the threads of the outer motor ring. In order to prevent this, the motor snap 416 prevents the disk drive motor 400 from rotating to the point where it becomes dislodged from the chassis 14. The motor snap 416 also facilitates loading the disk drive motor 400 because it is flexible. It is preferably flexible because it interferes with the insertion of the disk drive motor 400. The motor snap 416 interferes with the insertion of the disk drive motor 400 because it must be located at a certain point along the outer motor ring to prevent rotation of the motor 400 past this certain point. Additionally, the slotted member 412 must be disposed along the inner motor ring at a certain point so that it can interface with the drive link post 414. Because of the required location of these components, the motor snap 416 interferes with the slotted member 412 upon inserting the disk drive motor 400 into the chassis 14. In order to facilitate the insertion of the disk drive motor 400, the motor snap 416 is flexible so that it can deflect upon insertion of the disk drive motor 400. After the disk drive motor 400 has been inserted and has been rotated, the motor snap 416 can then deflect back to its original position and prevent rotation of the disk drive motor 400 past a certain point where it would become dislodged from the chassis 14.

Because the motor snap 416 may be integral with the outer motor ring, it can be manufactured relatively easily through a molding or similar process. Additionally, a motor snap 416 that is integral with the outer motor ring facilitates insertion of the disk drive motor 400.

The preferred embodiments described herein are illustrative only and, although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

What is claimed is:

1. A disk drive of the type that can receive a removable disk cartridge and that has a chassis with an aperture, comprising:

a rotatable disk drive motor, disposed within the aperture, the disk drive motor being moveable between an unloaded position when a disk cartridge is not inserted into the disk drive and a loaded position in which the disk drive motor is engaged with the disk cartridge to rotate a storage medium of the disk cartridge;

an inner motor ring disposed around a circumference of the disk drive motor and having threads running around a periphery of the inner motor ring and a member extending outward from the inner motor ring;

an outer motor ring disposed in the aperture of the chassis and having threads, disposed about a periphery of the outer motor ring, the disk drive motor being assembled with the chassis by the mating of the threads of the inner motor ring with the threads of the outer motor ring, the threads of the inner motor ring being moveable with respect to the threads of the outer moving ring as the disk drive motor rotates between the loaded position and the unloaded position; and a flexible stop extending from the outer motor ring, the member contacting the flexible stop when the inner motor ring rotates with respect to the outer motor ring in a direction that the disk drive motor rotates with respect to the outer motor ring to move to the unloaded position and thereby preventing the inner motor ring from becoming disengaged with the outer motor ring, which prevents the disk drive motor from becoming disassembled from the chassis.

2. The disk drive of claim 1, wherein the disk drive further comprises an eject system, disposed within the disk drive, that is adaptable to eject a disk cartridge from the disk drive.

3. The disk drive of claim 2, wherein the eject system further comprises a linkage, that is coupled to the member by a post extending from the linkage, and that is coupled to an eject lever, that is rotatable mounted within the disk drive, so that when the cartridge is inserted into the disk drive, the cartridge contacts the eject lever to push the elect lever and thereby move the linkage, the member being pulled by the movement of the linkage to drive the motor from an unloaded position to a loaded position.

4. The disk drive of claim 3, wherein the member extends approximately parallel to a surface of the chassis and has a slot that is engageable with the post of the linkage.

5. The disk drive of claim 1, further comprising an eject button disposed on a periphery of the disk drive that is coupled to the disk drive motor, the disk drive motor rotating from the loaded position to the unloaded position in response to operation of the eject button.

6. The disk drive of claim 1, further comprising an operating motor, disposed within the disk drive, and a linkage that couples the operating motor to the first threaded ring, the operating motor being responsive to insertion of the disk cartridge into the disk drive to drive the linkage and thereby rotate the disk drive motor.

7. A method of assembling a disk drive motor into a disk drive, comprising the steps of:

providing a disk drive having an aperture that has a threaded ring running around a circumference of the aperture and a spring extending from the threaded ring;

providing a disk drive motor having a threaded periphery and a member extending from the periphery, the member being disposed on a periphery of the disk drive motor so that the member contacts the spring when the disk drive motor is assembled to the disk drive and when the disk drive motor is rotated with respect to the threaded ring in a direction that disassembles the disk drive motor from the disk drive and thereby prevents the disk drive motor from becoming disassembled from the disk drive;

aligning the threaded periphery of the disk drive motor with the threaded ring, so that the disk drive motor can be assembled to the disk drive and aligning the member with the flexible stop as the threaded periphery of the disk drive motor is aligned with the threaded ring;

depressing the spring with the member, and mating the threaded periphery of the disk drive motor with the threaded ring; and rotating the disk drive motor with respect to the threaded ring and thereby rotating the member, that extends from the periphery of the disk drive motor, with respect to the spring and releasing the spring so that the member will contact the spring if the disk drive motor is rotated with respect to the disk drive in a direction that disassembles the disk drive motor from the disk drive and thereby preventing further rotation of the disk drive motor to prevent the disk drive motor from being disassembled from the disk drive.

8. The method of claim 7, wherein the disk drive further comprises a linkage that couples the disk drive motor to an eject system of the disk drive when the disk drive motor is assembled to the disk drive and wherein the step of depressing further comprises engaging the member extending from the periphery of the disk drive motor with a post extending from the linkage.

9. The method of claim 7, wherein the step of depressing further comprises the step of sliding a slot in the member over a post extending from a linkage of a cartridge ejection system of the disk drive system.

10. A method of operating a disk drive motor of a disk drive of the type that has a chassis, comprising the steps of:

providing a disk drive having a rotatable disk drive motor that has a first threaded ring and that is rotatably assembled to the chassis by mating the first threaded ring with a second threaded ring that is mounted to the chassis, so that when the data storage cartridge is inserted into the disk drive, the disk drive motor rotates from an unloaded position to a loaded position in which the disk drive rotates with respect to the threads of the second ring to engage a data storage cartridge, the second threaded ring having a stop extending therefrom and the first threaded ring having a member extending therefrom, the member contacting the stop to prevent rotation of the disk drive motor past a point at which the threads of the first threaded ring are engaged with the threads of the second threaded ring, and thereby preventing the motor from becoming dislodged from the chassis; and rotating the disk drive motor and the first threaded ring relative to the second threaded ring from the unloaded position to the loaded position.

11. The method of claim 10, further comprising the step of rotating the disk drive motor and the first threaded ring relative to the second threaded ring from the loaded position to the unloaded position in response to ejection of the disk cartridge from the disk drive.

12. The method of claim 10, wherein the disk drive further comprises a linkage coupled to the first threaded ring and an eject lever, rotatable mounted within the disk drive, so that the first threaded ring and the disk drive motor rotate in response to rotation of the eject lever.

13. An outer motor ring that can be assembled to a periphery of an annular surface of a disk drive that defines an aperture in a disk drive and that can be mated with a disk drive motor that has an inner motor ring with threads running around a periphery of the ring and a member extending from the inner motor ring, comprising:

an outer surface that can be attached to the annular surface to assemble the outer motor ring to the disk drive;

an inner surface having threads running around the inner surface, the threads of the inner surface being mateable with the threads of the disk drive motor to assemble the disk drive motor to the disk drive when the outer motor ring is assembled to the annular surface; and a flexible stop extending from an exterior of the outer motor ring so that the member of the disk drive will contact the flexible stop as the threads of the disk drive motor move with respect to the threads of the inner surface to prevent further rotation of the disk drive motor when the outer motor ring is attached to the annular surface and thereby prevent the disk drive motor from rotating until it is disassembled from the outer motor ring and the disk drive.

14. The outer motor ring of claim 13, further comprising a connector extending from the exterior surface of the outer motor ring that is adaptable to connect the outer motor ring to the disk drive.

15. The outer motor ring of claim 13, wherein the flexible stop comprises a spring that has a surface that extends approximately parallel to a surface of a chassis of the disk drive when the outer motor ring is assembled to the disk drive.

16. A disk drive of the type that can receive a removable disk cartridge and that has a chassis with an aperture, comprising:

an outer motor ring, disposed in the aperture of the chassis, and having threads running around a periphery of the outer motor ring, the outer motor ring being rigidly mounted to the chassis and having a stop extending from the outer motor ring; and a rotatable disk drive motor that has an inner motor ring that has a threaded periphery, the threads of the inner motor ring being mated with the threads of the outer motor ring to rotatably mount the disk drive motor to the disk drive, the threads of the inner motor ring being moveable with respect to the threads of the outer motor ring to rotate the disk drive motor between an unloaded position when the disk cartridge is not inserted into the disk drive and a loaded position, when the disk cartridge is inserted into the disk drive, the disk drive motor being engaged with the disk cartridge in the loaded position; and a member extending from the inner motor ring, the member contacting the stop, if the disk drive motor rotates sufficiently with respect to the threads of the outer motor ring, to prevent the inner motor ring from rotating past a point at which the threads of the inner motor ring are engaged with the threads of the outer motor ring and thereby preventing the disk drive motor from becoming disengaged from the disk drive.

17. The disk drive of claim 16, further comprising an eject lever, rotatably mounted to the disk drive, and a moveable linkage, that is coupled to the inner motor ring and the eject lever, the eject lever rotating in response to the disk cartridge contacting the eject lever when the disk cartridge is inserted into the disk drive, the rotation of the eject lever releasing the moveable linkage to move and thereby pull the inner motor ring to rotate with respect to the outer motor ring and move the disk drive motor from the unloaded position to the loaded position.

18. A disk drive of the type that can receive a removable disk cartridge and that has a chassis with an aperture, comprising:

an outer motor ring, disposed in the aperture of the chassis, and having threads running around a periphery of the outer motor ring, the outer motor ring being rigidly mounted to the chassis and having a stop extending from the outer motor ring;

an eject lever, rotatably mounted to the chassis, and rotating in response to insertion of the cartridge into the disk drive;

a moveable linkage, mounted to the chassis, and coupled to the eject lever, the linkage being moveable in response to movement of the eject lever;

a spring, coupled to the chassis and the linkage, to spring bias the linkage to move, the eject lever holding the linkage against the bias of the spring when the disk cartridge is not inserted into the disk drive and rotating to release the linkage to move due to the bias of the spring in response to insertion of the disk cartridge; and a rotatable disk drive motor that has an inner motor ring that has a threaded periphery, the threads of the inner motor ring being mated with the threads of the outer motor ring to rotatably mount the disk drive motor to the disk drive, so that the disk drive motor can rotate between an unloaded position in which the disk drive motor is not engaged with a disk cartridge and a loaded position in which the disk drive motor is engaged with the disk cartridge, the inner motor ring being coupled to the linkage, so that the inner motor ring and the disk drive motor can rotate from the unloaded position to the loaded position in response to movement of the linkage which moves in response to the disk cartridge pushing the eject lever upon insertion of the disk cartridge into the disk drive; and a member extending from the inner motor ring, the member contacting the stop, if the disk drive motor rotates sufficiently with respect to the threads of the outer motor, to prevent the inner motor ring from rotating past a point at which the threads of the inner motor ring are engaged with threads of the outer motor ring and thereby preventing the disk drive motor from becoming disengaged from the disk drive.

19. The disk drive of claim 18, further comprising a post extending from the linkage and a slotted member extending from the inner motor ring that is engaged with the post, so that movement of the linkage causes rotational movement of the inner motor ring and the disk drive motor.

20. The disk drive of claim 18, further comprising an eject motor, disposed within the disk drive and coupled to the linkage, the eject motor being operative to move the linkage against the bias of the spring and thereby rotate the eject lever to push on the disk cartridge to eject the disk cartridge from the disk drive after the disk cartridge has been inserted into the disk drive and the movement of the linkage in response to operation of the eject motor also driving the inner motor ring and the disk drive motor to rotate relative to the outer motor ring and move from the loaded position to the unloaded position.

* * * * *